(12) United States Patent
Makeev et al.

(10) Patent No.: US 12,407,844 B2
(45) Date of Patent: Sep. 2, 2025

(54) METHODS AND APPARATUSES FOR ENCODING AND DECODING A BYTESTREAM

(71) Applicant: V-NOVA INTERNATIONAL LIMITED, London (GB)

(72) Inventors: Ivan Makeev, London (GB); Balázs Keszthelyi, London (GB); Stergios Poularakis, London (GB); Michele Sanna, London (GB); Robert Ettinger, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 218 days.

(21) Appl. No.: 18/362,814

(22) Filed: Jul. 31, 2023

(65) Prior Publication Data

US 2024/0048741 A1   Feb. 8, 2024

Related U.S. Application Data

(63) Continuation of application No. 16/770,226, filed as application No. PCT/GB2018/053546 on Dec. 6, 2018, now Pat. No. 11,743,479.

(30) Foreign Application Priority Data

Dec. 6, 2017   (EP) ..................................... 17386046
Feb. 8, 2018   (EP) ..................................... 18386002
(Continued)

(51) Int. Cl.
*H04N 19/436*   (2014.01)
*H04N 19/119*   (2014.01)
(Continued)

(52) U.S. Cl.
CPC ......... *H04N 19/436* (2014.11); *H04N 19/119* (2014.11); *H04N 19/129* (2014.11);
(Continued)

(58) Field of Classification Search
CPC .. H04N 19/436; H04N 19/119; H04N 19/129; H04N 19/167; H04N 19/176;
(Continued)

(56) References Cited

U.S. PATENT DOCUMENTS 5,228,098 A   7/1993   Crinon et al.
5,446,806 A   8/1995   Ran et al.
(Continued)

FOREIGN PATENT DOCUMENTS

CN   103313046   6/2019

OTHER PUBLICATIONS

"Introduction to Arithmetic Coding—Theory and Practice," Said 2004 (Year: 2004).*
(Continued)

*Primary Examiner* — Shadan E Haghani
(74) *Attorney, Agent, or Firm* — Workman Nydegger

(57) ABSTRACT

There may be provided a method of decoding a received set of encoded data, the method comprising: receiving the encoded data set representing information that has been compressed; identifying from the encoded data set an ordered set of interspersed node symbols and data symbols; processing an ordered tree having a predetermined number of layers from the ordered set of identified node symbols and data symbols, wherein each node symbol comprises a set of indicator elements which indicate if a further symbol is expected later in the dataset for a branch in the tree, such that the ordered set of identified node symbols determine the tree and such that data symbols are arranged in data locations in the tree based on the indicator elements, and wherein each
(Continued)

data symbol represents one or more values associated with the information that has been compressed; and, reconstructing the information that has been compressed using the values represented by the data symbols based on location of the data symbols in the ordered tree and using a predetermined value when the node symbols indicate that no data symbol is included in the data set corresponding to a location in the ordered tree.

20 Claims, 20 Drawing Sheets

(30) Foreign Application Priority Data

| | | | |
|---|---|---|---|
| Jul. 30, 2018 | (GB) | ...................................... | 1812407 |
| Sep. 21, 2018 | (GB) | ...................................... | 1815437 |

(51) Int. Cl.
| | |
|---|---|
| *H04N 19/129* | (2014.01) |
| *H04N 19/167* | (2014.01) |
| *H04N 19/176* | (2014.01) |
| *H04N 19/182* | (2014.01) |
| *H04N 19/30* | (2014.01) |
| *H04N 19/44* | (2014.01) |
| *H04N 19/46* | (2014.01) |
| *H04N 19/91* | (2014.01) |
| *H04N 19/96* | (2014.01) |

(52) U.S. Cl.
CPC ......... *H04N 19/167* (2014.11); *H04N 19/176* (2014.11); *H04N 19/182* (2014.11); *H04N 19/30* (2014.11); *H04N 19/44* (2014.11); *H04N 19/46* (2014.11); *H04N 19/91* (2014.11); *H04N 19/96* (2014.11)

(58) Field of Classification Search
CPC ...... H04N 19/182; H04N 19/30; H04N 19/44; H04N 19/46; H04N 19/91; H04N 19/96
See application file for complete search history.

(56) References Cited

U.S. PATENT DOCUMENTS

| | | | |
|---|---|---|---|
| 5,768,434 A | 6/1998 | Ran | |
| 6,278,715 B1 | 8/2001 | Hansquine | |
| 2002/0044695 A1 | 4/2002 | Bostrom | |
| 2003/0061227 A1 | 3/2003 | Baskins et al. | |
| 2011/0274162 A1 | 11/2011 | Zhou et al. | |
| 2014/0092965 A1 | 4/2014 | Joshi et al. | |

OTHER PUBLICATIONS

"Arithmetic coding for data compression," Witten 1987 (Year: 1987).*
"An Introduction to Arithmetic Coding," Langdon 1984 (Year: 1984).*
"Efficient Coding of Quadtree Notes," Perez 2006 (Year: 2006).*
"An efficient way to represent quadtrees," Gargantini 1982 (Year: 1982).*
"Tree compression and optimization with applications," Katajainen 1990 (Year: 1990).*
Hanan, "The Quadtree and Related Hierarchical Data Structures", ACM Computing Surveys, ACM, New York, NY, US, vol. 16, No. 2, Jun. 1, 1984, pp. 187-260, XP058287271, ISSN: 0360-0300, DOI: 10.1145/356924.356930.
International Search Report and Written Opinion for PCT/GB2018/053546 mailed Apr. 12, 2019.
Kotra et al., "CE5: Results on Modified Inter Mode Coding and Joint Coding of Split Flags for CAVLC", 6. JCT-VC Meeting; 97, MPEG Meeting; Jul. 14, 2011 through Jul. 22, 2011; Torino; (Joint Collaborative Team on Video Coding of ISO/IEC JTC1/SC29/WG11 and ITU-T SG.16); URL: http://WFTP3.ITU.INT/AV-ARCHUCTVC-SITE/, No. JCTVC-F524, Jul. 1, 2011, XP030009547.
International Preliminary Report on Patentability received for PCT Patent Application No. PCT/GB18/053546, mailed on Jun. 18, 2020, 16 pages.
Non-Final Office Action received for U.S. Appl. No. 16/770,226, mailed Feb. 7, 2022.
Non-Final Office Action received for U.S. Appl. No. 16/770,226, mailed on Aug. 12, 2022, 21 pages.
Non-Final Office Action received for U.S. Appl. No. 16/770,226, mailed on Sep. 2, 2021, 15 pages.
Non-Final Office Action received for U.S. Appl. No. 16/770,226, mailed on Feb. 7, 2022, 14 pages.
Notice of Allowance received for U.S. Appl. No. 16/770,226, mailed on Mar. 8, 2023, 5 pages.
Final Office Action received for U.S. Appl. No. 16/770,226, mailed Feb. 22, 2022.

* cited by examiner

METHODS AND APPARATUSES FOR ENCODING AND DECODING A BYTESTREAM

CROSS-REFERENCE TO RELATED APPLICATIONS

The present application is a continuation of U.S. patent application Ser. No. 16/770,226, filed Jun. 5, 2020, which is a 371 US National Stage Entry of PCT/GB2018/053546, filed Dec. 6, 2018, which claims priority to UK Patent Application No. 1812407.3, filed Jul. 30, 2018, EP Patent Application No. 18386002.2, filed Feb. 8, 2018, EP Patent Application No. 17386046.1, filed Dec. 6, 2017, UK Patent Application No. 1815437.7, filed Sep. 21, 2018, the entire disclosures of which are incorporated herein by reference.

BACKGROUND TO THE INVENTION

The present invention relates to methods, apparatuses, computer programs and computer-readable media for encoding and/or decoding a sequence of data streams such as a bytestream.

BACKGROUND

When transmitting, or storing, image and video data it is particularly advantageous to reduce the size of the data. Techniques for encoding and decoding such data are varied and well known. Contemporary techniques provide a compromise between processing efficiency, data quality and data compression.

Images are typically represented digitally by representing the colours of an image by a set of components each having a value. For example, the colours of an image can be represented using an RGB colour model or the YCbCr colour space where each pixel of an image is represented by three different values.

To compress the data, planes of the image are usually first split into blocks of data elements, such as blocks of 8×8 pixels, and each block undergoes a domain transformation. Examples include discrete cosine transform and wavelet transform. As is well known in the art, transformation coding is used to capture correlation structures in the data.

The transformed data is then quantized to represent the large set of values using a smaller set of values and then typically undergoes a further compression step, such as entropy coding. Entropy coding utilises frequently occurring values or sequences of values within a data set in order to reduce the volume of data. For example, an entropy coding technique compresses the digital data by representing frequently occurring patterns with few bits and rarely occurring patterns with many bits.

The efficacy of each step depends on the outcome of the previous step. That is, the transformation and quantisation processes are designed to make the next step in the process more effective. For example, overall compression can be made more effective if the transform and quantisation processes represent the values of the image with frequently occurring symbols or groups of symbols so that the entropy coding step is more effectual. In order to make the entropy encoding step more effectual, some contemporary transformation processes (which occur prior to entropy encoding) produce a large number of zero value data elements. Such a data set having a large number of zero value elements, either grouped together or otherwise, can be referred to as a sparse data set.

It has been previously proposed to encode data in a hierarchical manner so as to reduce the overall data size of a signal. In such encoding techniques, residual data (i.e. the data required to correct low quality information present in a base layer) is used in progressively higher levels of quality. Such a hierarchical technique is described in WO 2013/171173 which proposes a tiered hierarchy of renditions of a signal. In this proposed technique, a base layer of quality represents the image at a first resolution and subsequent layers in the tiered hierarchy are residual data or adjustment layers necessary for the decoding side to reconstruct the image at a higher resolution. Techniques are proposed in this WO 2013/171173 which structure the data in each layer to exploit correlation in the residual layers to reduce information entropy by transforming a block of values into a set of directional components. Each layer in this hierarchical technique, particularly each residual layer, is often a comparatively sparse data set having many zero value elements.

The concept of a hierarchical, tiered data structure is also disclosed in earlier filed patent application GB1812407.3. Both of GB1812407.3 and WO2013/171173 are incorporated by reference in their entirety.

Other techniques which produce sparse data sets include delta or difference encoding.

It has previously been proposed to store sparse matrices using quadtrees to divide the matrices into quadrants. For example, writing in the International Journal of Computer Applications (0975-8887) Volume 105—No. 13, November 2014, Nidhal K. El Abbadi and Elaf J. Al Taee proposed a technique which stores two vectors—a first vector being a series of values of data in a matrix and a second vector being an encoded representation of the location of data in the matrix. While the authors showed compression gains, similar techniques have not been practically realised due to implementation and integration difficulties.

Further, the authors specifically state: "To compress this matrix we suggested to make the matrix square with equal dimensions size (dimension as power of two), this will simplified the work, and adding zero in row or column to make dimensions equal and power of two, will not effect on the matrix and it is easy to eliminate later after decompression." Such compression may be inefficient.

A similar format referred to as a minimal quadtree format has also been proposed for storing the spatial structure of a sparse matrix, for example in the paper"Minimal Quadtree Format for Compression of Sparse Matrices Storage", I. Simecek, D. Langr, P. Tvrdik, 2012 14th International Symposium on Symbolic and Numeric Algorithms for Scientific Computing, DOI 10.1109/SYNASC.2012.30. In this format, all nodes of a quadtree are stored in one array. Each node contains only four flags (i.e. four bits) indicating whether given subtrees are nonempty. A breadth-first traversal is used without discussion.

This format was reviewed in 2017 in the paper "Analysis of Using Sparse Matrix Storage Formats in Image Compression Techniques", J. Saira Banu, M. Raj asekhara Babu, I. Sumaiya Thaseen and P. Balamurugan, International Journal of Pure and Applied Mathematics, Volume 117 No. 15 2017, 513-526. In this paper, it was stated "[t]he current authors, in a recent paper, used benchmark matrices to analyse the spatial efficiency of various formats and found that the Minimal Quadtree format is the best. However, since this is just a string of bits, reconstruction of the matrix is not possible." In further analysing the format, they state "[t] his storage format is used for efficient storage. One bit is produced for each quadrant of the matrix that is divided using the Quadtree method. We output a 0 if the quadrant is empty and 1 otherwise. This format can be used in cases where only the arrangement of the non-zero elements is necessary, as we do not store the value of the non-zero elements themselves." In concluding the authors note that "tjhough Minimal Quadtree [Format] gives a certain level of compression, as mentioned earlier, it will not be possible to reconstruct the image using this technique."

When considering any possible implementation of the known formats for reconstructing images using sparse matrices, each requires intensive memory usage. Each of the known formats that demonstrate efficiency gains require a large amount of data to be stored in memory to properly reconstruct the locations and values of the data in a matrix.

It remains a goal of industry to reduce the size of data stored or transmitted and to reduce the processing time and memory utilisation of encoding or decoding sparse data sets in image reconstruction.

SUMMARY

According to a first aspect of the present invention there is provided a method of decoding a received set of encoded data. The method comprises: receiving the encoded data set representing information that has been compressed; identifying from the encoded data set an ordered set of interspersed node symbols and data symbols; processing an ordered tree having a predetermined number of layers from the ordered set of identified node symbols and data symbols, wherein each node symbol comprises a set of indicator elements which indicate if a further symbol is expected later in the dataset for a branch in the tree, such that the ordered set of identified node symbols determine the tree and such that data symbols are arranged in data locations in the tree based on the indicator elements, and wherein each data symbol represents one or more values associated with the information that has been compressed; and, reconstructing the information that has been compressed using the values represented by the data symbols based on location of the data symbols in the ordered tree and using a predetermined value when the node symbols indicate that no data symbol is included in the data set corresponding to a location in the ordered tree.

In this way, the method is able to implicitly identify the location of a recurring predetermined value in digital information without that information having been included in an encoded dataset. That information may have been fixed by the decoder as constant or as the result of an algorithm, some of whose inputs may be given in a different part of the bytestream to the encoded dataset (e.g. a header) and some of whose inputs are hard-wired.

It becomes possible to reconstruct information which has been compressed with only a small number of bits needed to represent the information, where one value in the original information is repeated often and grouped or clustered together. The interspersal of structural and data information provides for improved reconstruction and memory usage. The invention has significant compression gains in compressing residual information and image information where the information is frequently clustered and is commonly sparse.

Additionally, according to the invention it is possible to selectively include data symbols within the data set and signal those data symbols even if those data symbols correspond to the predetermined value. This may enable onward more effective encoding in subsequent encoding stages. In certain embodiments, once the tree has been completed the node symbols can be deleted or otherwise ignored.

Preferably, the step of processing the ordered tree comprises traversing the tree according to the indicator elements of each node symbol and associating a node symbol or data symbol with each visited node based on a location in the tree of the visited node. An ordered tree structure is accordingly used to locate symbols retrieved from the data set so as to utilise the spatial information in the tree.

A data symbol may be associated to the tree if a visited node is in a final layer of the tree, no symbol may be associated to the tree if a visited node is in a penultimate layer of the tree and node symbols may be associated to the tree for other layers of the tree. Thus the tree structure itself informs the ordering of the symbols within the data set. Such technique provides optimal balance between metadata and data by reducing metadata. In certain uses the balance could be different. The quantity of code-less layers may be alterable.

The step of processing the ordered tree may comprise: associating a first node symbol with a root node of the ordered tree; and, traversing the tree according to the indicator elements of the first node symbol associated with the root node.

If an indicator element indicates no data symbol is expected later in the data set for a branch in the tree, the method may comprise terminating traversal of the tree for the branch such that traversal continues to a subsequent branch. Thus that branch of the tree is left empty when there is no data to populate in the tree. It should be noted that the traversal of the tree is not terminated in this example rather the next part of the traversal is elsewhere. In other words, the traversal arrives at the stage in the traversal where a branch has ended on a leaf.

Optionally, the method further comprises simulating a sub-tree for the branch after terminating the traversal, wherein the sub-tree comprises data symbols having a predetermined value. As the branch is left empty and populated with predetermined values, the value need not be included in the data set and so the information can be compressed significantly compared to alternative compression techniques.

Preferably traversing the tree is a depth-first pre-order traversal. The encoding and decoding processes preferably use the same traversal to maintain the spatial information of the original information. The depth-first pre-order traversal allows for improved memory handling in decoder implementations, allows decoder implementations to quickly reconstruct the compressed information, allows for parallelism in implementations (for example by saving the tree and then re-starting a subsequent entropy encoding stage every time a certain depth is reached) and provides beneficial processing when decoding residual data. In an example, a subsequent entropy encoding stage may be bypassed but with a spawned process not taking the bypass.

The ordered tree is preferably a quadtree and each node symbol preferably comprises four indicator elements. In this way each branch of the tree represents a quadrant of a grid and the spatial information of the information which has been compressed can be maintained.

Preferably reconstructing the information comprises: mapping at least a portion of the ordered tree to an array such that each data symbol represents an element in the array. Any array of information can be compressed and reconstructed using the proposed techniques, for example a two-dimensional grid can be reconstructed by mapping the data symbols of the tree to the grid and using the spatial information inherent to the ordered tree structure. In certain examples the array is an array of values representing a channel of a digital image where each value represents a component of a pixel of the digital image.

The mapping may preferably be a z-order mapping or a Morton order mapping so as to effectively map the values stored in the tree into appropriate locations in the grid. Much like the traversal, preferably the mapping order is the same used in the encoding and decoding processes.

The mapping may comprise inserting a predetermined value where no data symbol has been associated with a data location of the ordered tree. Thus the insertion of implicitly signalled values, i.e. values not included in the encoded data set, can be performed at the point of reconstruction rather than at the point of processing the tree.

Each node symbol may be associated with a node which shall have a grandchild node in the tree. Thus a node symbol is not associated with the layer of the tree pointing to the data symbols. The step of processing the tree may comprise arranging data symbols to all sibling nodes of an arranged data symbol and thus efficiency savings can be achieved where the data symbols in the array to be constructed are clustered together. For example, the node symbol pointing to the data symbol layer may be replaced by explicit signalling of the data symbols in a block which provides an efficiency saving across an entire plane.

After arranging a data symbol at a data location in tree, the method may further comprise deleting the node symbols associated with that branch of tree. Thus the implementation provides for increased memory utilisation as the entire structure of the tree need not be known in order to accurately place data within an array and restore spatial information for a particular piece of data.

Optionally the method further comprises decoding each data symbol using a difference coding operation such that every data symbol received after a first data symbol is a value relative to a previous data symbol. Difference encoding in this way will increase the amount of sparse values in the data set, that is, where the difference is zero. In other words the sparsity of the data set may be increased in certain circumstances. By increasing the sparsity, the compression gains can be improved where the predetermined value assumed when no data symbol is included in the data set is a zero. In certain circumstances the zero value does not need to be explicitly signalled. Similarly the difference encoding will increase the frequency of small values which will improve any entropy or other encoding operation used in conjunction with the compression technique of the invention.

It is contemplated that the predetermined value may be explicitly signalled or a combination of the sparse encoding and explicit signalling of information may be employed depending on the nature of the information which is to be compressed. For example, in certain circumstances, one may save by transmitting fewer symbols, but may have made a subsequent entropy coding operation less efficient for the remaining symbols and so a combined approach will lead to efficient results.

Further, the method may comprise receiving an indication of the dimensions of the data to be reconstructed, wherein no data symbols are received which would be outside of these dimensions when the data set is reconstructed. In this way different dimensioned data can be encoded. Optionally, a partial node symbol may be sent where indicator elements are not sent corresponding to locations outside of the dimensions.

Further the method may comprise receiving an indication of the dimensions of the data to be reconstructed; and, ignoring any data symbols received which would be outside of these dimensions when the data set is reconstructed. In this way different dimensioned data can be encoded. Data outside the original data may be sent in order to improve subsequent encoding stages.

Optionally the method further comprises decoding the encoded data set using an entropy coding operation (i.e. entropy decoding) before constructing the ordered tree. In this embodiment, preferably the entropy decoding operation is a range decoding operation. The operation may either be an operation starting out from a freshly initialized range decoder state/instance, or an operation continuing from the last state of an existing instance. In a preferred implementation initialisation is once per ordered tree, at its start.

According to a further aspect of the invention there may be provided a method of decoding a retrieved set of entropy encoded data representing information that has been compressed, the method comprising: retrieving a plurality of entropy decoding parameters associated with a respective type of symbol; applying an entropy decoding operation to the encoded data set to decode a symbol of a first type of symbol using parameters associated with the first type of symbol, wherein the first type of symbol comprises a set of indicator elements which indicate a type of symbol expected in a different location in the data set; determining an expected type of symbol by analysing at least one previously decoded symbol of the first type of symbol to identify the type of symbol expected in the encoded data set; and, updating the entropy decoding operation to use parameters associated with the expected type of symbol.

In this way, the invention provides for improved entropy coding. Rather than use one set of parameters for a whole dataset, different parameters may be used to decode different types of symbol. Thus significant compression gains can be provided over the entire data set. Such compression gains can be provided even though there may be no regular pattern to the interspersal of symbols within the dataset. By analysing the first type of symbol, the location of the subsequent symbols can be accurately spatially located within the data set so as to decode the symbols using different parameters.

The entropy decoding operation may be performed by one entropy encoding module or by a plurality of different modules for each type of symbol. The entropy encoding operation may use fixed-length or variable-length codewords. Preferably the encoded data set comprises the first type of symbol and a second type of symbol representing one or more values associated with the information that has been compressed. Thus the first type of symbol indicates the spatial information of the data symbols later in the data set.

The method may comprise iteratively determining the expected type of symbol by analysing at least one previously decoded symbol of the first type of symbol and updating the entropy decoding operation to use parameters associated with the expected type of symbol. Preferably the entropy encoding operation is a range decoding operation and the entropy decoding parameters include probability information, for example a cumulative distribution function. Alternative entropy encoding operations include arithmetic or Huffman encoding operations. Updating the entropy decoding operation comprises deleting from memory a portion of the encoded data no longer needed to decode the expected type of symbol, the portion of encoded data previously read into memory for the entropy decoding operation. Thus the invention provides for improved memory utilisation at the decoder while still being able to accurately locate the second type of symbols in the data set so that parameters can be used for that symbol.

According to an implementation of the invention, the first type of symbol is the node symbol and the second type of symbol is the data symbol, wherein the step of identifying an ordered set of interspersed node symbols and data symbols comprises the steps of applying and updating the entropy decoding operation and the step of determining an expected type of symbol comprises the step of processing the ordered tree, such that the expected type of symbol is determined based on a visited node of the tree during tree traversal. Thus the benefits of each aspect of the invention are provided together. That is, the node symbols can accurately locate the data symbols spatially and also within the data set such that not only can the data symbols be located in the reconstructed array without explicitly signalling location data, not only can the predetermined values by implicitly signalled but further the entropy encoding operation can be performed using different parameters for each signal so that the data set can be significantly compressed as the different symbols can be accurately located within the encoded data set. Accordingly, according to an aspect of the invention there may be provided a method of decoding a retrieved set of entropy encoded data representing information that has been compressed, the method comprising: retrieving a plurality of entropy decoding parameters associated with a respective type of symbol; applying an entropy decoding operation to the encoded data set to decode a plurality of symbols using parameters associated with the respective type of symbol, wherein the encoded data set includes an ordered set of interspersed node symbols and data symbols each being a different, respective type of symbol; processing an ordered tree having a predetermined number of layers from the decoded symbols and determining an expected type of symbol from the ordered tree; updating the entropy decoding operation to use parameters associated with the expected type of symbol, wherein each node symbol comprises a set of indicator elements which indicate if a further symbol is expected later in the dataset for a branch in the tree, such that the ordered set of identified node symbols determine the tree and data symbols are arranged in data locations in the tree based on the indicator elements, and wherein each data symbol represents one or more values associated with the information that has been compressed; and, reconstructing the information that has been compressed using the values represented by the data symbols based on location of the data symbols in the ordered tree and using a predetermined value when the node symbols indicate that no data symbol is included in the data set corresponding to a location in the ordered tree.

According to a further aspect of the invention there may be provided an apparatus for decoding a received set of encoded data, comprising a processor configured to carry out the method of any of the above aspects of the invention.

According to an aspect of the invention there may be provided an apparatus for decoding a received set of encoded data, the apparatus comprising: a receiving module configured to receive an encoded data set representing information that has been compressed; a decoding module configured to identify from the encoded data set an ordered set of interspersed node symbols and data symbols; and, a de-sparsification module configured to: process an ordered tree having a predetermined number of layers from the ordered set of identified node symbols and data symbols, wherein each node symbol comprises a set of indicator elements which indicate if a further symbol is expected later in the dataset for a branch in the tree, such that the ordered set of identified node symbols determine the tree and data symbols are arranged in data locations in the tree based on the indicator elements, and wherein each data symbol represents one or more values associated with the information that has been compressed; and, reconstruct the information that has been compressed using the values represented by the data symbols based on location of the data symbols in the ordered tree and using a predetermined value when the node symbols indicate that no data symbol is included in the data set corresponding to a location in the ordered tree.

According to an aspect of the invention there may be provided an apparatus for decoding a retrieved set of entropy encoded data representing information that has been compressed, the apparatus comprising: a decoding module configured to: retrieve a plurality of entropy decoding parameters associated with a respective type of symbol; and, apply an entropy decoding operation to the encoded data set to decode a symbol of a first type of symbol using parameters associated with the first type of symbol, and a de-sparsification module configured to determine an expected type of symbol by analysing at least one previously decoded symbol of the first type of symbol to identify the type of symbol expected in the encoded data set; and, update the entropy decoding operation to use parameters associated with the expected type of symbol, wherein the first type of symbol comprises a set of indicator elements which indicate a type of symbol expected in a different location in the data set.

According to an aspect of the invention there may be provided a method of encoding an array of data representing information to be compressed, the method comprising: processing an ordered tree having a predetermined number of layers from the array of data, including arranging data symbols at data locations in the tree and not arranging data symbols at data locations in the tree where sections of the array correspond to a predetermined value; and, generating an ordered set of interspersed node symbols and data symbols, wherein each node symbol comprises a set of indicator elements which indicate if a further symbol is expected later in the dataset for a branch in the tree, such that the ordered set of identified node symbols determine the tree and data symbols are arranged in data locations in the tree based on the indicator elements, and wherein each data symbol represents one or more values associated with the information that has been compressed.

A method of encoding an array of data may be a substantially mirrored method of the method of decoding the encoded data set.

The step of processing the ordered tree may comprise analysing a section of the array to determine a node symbol for the section, wherein the node symbol indicates if the section comprises a value different from the predetermined value; and, traversing the tree according to the indicator elements of each node symbol and associating a node symbol or data symbol with each visited node based on a location in the tree of the visited node, wherein each node of the tree corresponds to a section of the array. A data symbol may be associated to the tree if a visited node is in a final layer of the tree, no symbol may be associated to the tree if a visited node is in a penultimate layer of the tree and node symbols may be associated to the tree for other layers of the tree. The step of processing the ordered tree may comprise: associating a first node symbol with a root node of the ordered tree; and, traversing the tree according to the indicator elements of the first node symbol associated with the root node. If an indicator element indicates no data symbol is expected later in the data set for a branch in the tree, terminating traversal of the tree for the branch such that traversal continues to a subsequent branch. Traversing the tree may be a depth-first pre-order traversal. The ordered tree may be a quadtree, each node symbol may comprise four indicator elements and each section of the array may be a quadrant.

The array may be an array of values representing a channel of a digital image where each value represents a component of a pixel of the digital image. The arranging may be a z-order mapping. Each node symbol may be associated with a node which shall have a grandchild node in the tree. The step of processing the tree may comprise arranging data symbols to all sibling nodes of an arranged data symbol.

After arranging a data symbol at a data location in tree, the method may further comprise outputting and deleting the node symbols associated with that branch of tree. The method may further comprise encoding each data symbol using a difference coding operation such that every data symbol output after a first data symbol is a value relative to a previous data symbol. The method may further comprise retrieve the dimensions of the data to be reconstructed; and, encoding a dummy data symbol which would be outside of the dimensions when the data set is reconstructed.

The method may further comprise encoding the output node symbols and data symbols using an entropy coding operation. The entropy coding operation may be a range coding operation.

According to a further aspect of the invention there may be provided a method of entropy encoding a set of data representing information to be compressed, the method comprising: retrieving a plurality of entropy encoding parameters associated with a respective type of symbol; applying an entropy encoding operation to the data set to encode a symbol of a first type of symbol using parameters associated with the first type of symbol; determining an expected type of symbol by analysing at least one previously encoded symbol of the first type of symbol to identify the type of symbol expected in the encoded data set; and, updating the entropy encoding operation to use parameters associated with the expected type of symbol, wherein the first type of symbol comprises a set of indicator elements which indicate a type of symbol expected in a different location in the data set.

The data set may comprise the first type of symbol and a second type of symbol representing one or more values associated with the information to be compressed. The method may comprise: iteratively determining the expected type of symbol by analysing at least one previously encoded symbol of the first type of symbol and updating the entropy encoding operation to use parameters associated with the expected type of symbol. The entropy encoding operation is a range decoding operation and the entropy decoding parameters include a cumulative distribution function.

According to an implementation of the invention in the methods of encoding, the first type of symbol may be the node symbol and the second type of symbol may be the data symbol, wherein the step of generating an ordered set of interspersed node symbols and data symbols may comprise the steps of applying and updating the entropy encoding operation and the step of determining an expected type of symbol may comprise the step of processing the ordered tree, such that the expected type of symbol is determined based on a visited node of the tree during tree traversal.

Accordingly, according to an aspect of the invention there is provided a method of entropy encoding an array of data representing information to be compressed, the method comprises: processing an ordered tree having a predetermined number of layers from the array of data, including arranging data symbols at data locations in the tree and not arranging data symbols at data locations in the tree where sections of the array correspond to a predetermined value; generating an ordered set of interspersed node symbols and data symbols each being a different, respective type of symbol; wherein each node symbol comprises a set of indicator elements which indicate if a further symbol is expected later in the dataset for a branch in the tree, such that the ordered set of identified node symbols determine the tree and data symbols are arranged in data locations in the tree based on the indicator elements, and wherein each data symbol represents one or more values associated with the information that has been compressed; retrieving a plurality of entropy decoding parameters associated with a respective type of symbol; applying an entropy decoding operation to the ordered set of interspersed node symbols and data symbols using parameters associated with a respective type of symbol.

According to a further aspect of the invention there may be provided an apparatus for encoding an array of data representing information to be compressed, comprising a processor configured to carry out the method of any of the encoding aspects of the invention above.

According to a further aspect of the invention there may be provided an apparatus for encoding an array of data representing information to be compressed, the apparatus comprising: a sparsification module configured to process an ordered tree having a predetermined number of layers from the array of data, including arranging data symbols at data locations in the tree and not arranging data symbols at data locations in the tree where sections of the array correspond to a predetermined value; and, an output module configured to generating an ordered set of interspersed node symbols and data symbols, wherein each node symbol comprises a set of indicator elements which indicate if a further symbol is expected later in the dataset for a branch in the tree, such that the ordered set of identified node symbols determine the tree and data symbols are arranged in data locations in the tree based on the indicator elements, and wherein each data symbol represents one or more values associated with the information that has been compressed.

According to a further aspect of the invention there may be provided an apparatus for entropy encoding a set of data representing information to be compressed, the apparatus comprising: an encoding module configured to: retrieve a plurality of entropy decoding parameters associated with a respective type of symbol; and, apply an entropy decoding operation to the data set to encode a symbol of a first type of symbol using parameters associated with the first type of symbol; and, a sparsification module configured to: determine an expected type of symbol by analysing at least one previously encoded symbol of the first type of symbol to identify the type of symbol expected in the encoded data set; and, update the entropy decoding operation to use parameters associated with the expected type of symbol, wherein the first type of symbol comprises a set of indicator elements which indicate a type of symbol expected in a different location in the data set. According to a further aspect of the invention there is provided a method of decoding symbols from an encoded data set using an arithmetic and/or range decoding operation, the symbols each being represented by a final integer within a defined range of integers. The method comprises: retrieving a sample of the encoded data set; retrieving an array of first statistics metadata, wherein the first statistics metadata represents a respective probability of each of a set of group indicators occurring in the encoded data set and wherein the size of the array is less the size of the defined range; performing an arithmetic decoding operation on the sample based on the array of statistics metadata to identify a group indicator; from the group indicator, identifying a set of possible integers from a predetermined mapping of sets of integers to possible group indicators; if multiple integers exist in the set of possible integers, performing a further stage of the arithmetic decoding operation on the sample using a predetermined set of second statistics metadata different from the array of first statistics metadata to identify an integer indicator; identify a final integer from the set of possible integers from a predetermined mapping of integers to possible integer indicators. The final integer and range of integers may not refer to the raw range-decoder input but to the range of input data to the range encoder.

The first statistics metadata may represent a respective probability of each of a set of group indicators occurring in the encoded data set, a probability of each of the integers in a group occurring in the information to be encoded or both of these options.

The method accordingly provides a technique for decoding an integer from an encoded data set by reducing the amount of symbols needed in the data set and also reducing the size of data needed to transmit the metadata. The invention has particular applicability to scenarios where there is a high usage of elements of a fixed size in the original information such that those symbols can be recreated from fewer steps. The invention provides that symbols can be decoded using either one or two (or multiple) arithmetic decoding stages to significantly reduce both the overall data size and also the computational efficiency of the decoding process.

The invention provides a plurality of bins which group together several integers. These integers in each group are given the same initial probability as the encoded data set comprises an indicator or pointer to the group rather than to the integer itself (from within the group of probability may be varied to have a different overall probability to ??? symbol). The dislocation of statistics from the integers themselves and the introduction of an information stage is particularly beneficial when utilised in combination with other aspects of the invention described herein for example, the ordered tree process provides a high likelihood of a clustering of similar metadata symbols and a high likelihood of a few symbols such as [1111] or 15 occuring with regularity. Thus, by reducing the data size and computation required to decode these symbols and take advantage of this clustering is highly advantageous when compared to known techniques.

Preferably, the arithmetic decoding operation is a range decoding operation. Thus the entropy decoding operation is space efficient and can operate with digits in any base.

In certain embodiments, the statistics metadata represents a probability distribution function. The group indicators are thus represented by the probability the integers in the group will occur in the information to be compressed.

Preferably, the probability distribution function is a piecewise linear function.

More preferably, the probability distribution function a cumulative distribution function.

Even more preferably, the cumulative distribution function is a non-decreasing function less than 1.0, such that 1.0 is implicit. This enables the statistics metadata to be identified for utilisation using only a few bits. Only the join points of a histogram may be signalled which significantly reduces the overhead while maintaining flexibility and facilitating decoding.

The size of the array may be one fewer than the number of sets of possible integers indicated by a corresponding number of possible group indicators and wherein the limits of the cumulative distribution function are implicit. The metadata overhead is therefore reduced.

In certain examples, the size of the array may be 6 and 0 and 1.0 of the cumulative distribution function may be implicit such that 7 sets of possible integers are indicated by 7 possible group indicators. Such a configuration has particular utility when used and in combination with other aspects of the invention to decode node symbols of the ordered tree.

In certain embodiments, the defined range may be 0 to 15 such that 16 possible integers are represented. Such configuration has particular utility when used in combination with other aspects of the invention to decode node symbols of the ordered tree. Each integer may represent or be equivalent to a base-2 value for signifying features of the data structure. The final integer may represent a bit unsigned number Implementation in different bases is possible.

Preferably, the bit unsigned number may be used as metadata in a data structure to indicate structure of the data structure or to indicate presence of data elements in the data structure or both. For example the number may be a node symbol as outlined in other aspects of the present disclosure.

The sets of possible integers may be grouped together as sets: [7, 11, 13, 14], [1, 2, 4, 8], [5, 10], [3, 12], [6, 9], [0] and [15], each set being mapped to a corresponding group indicator. This selection has particular utility to reduce the stages and computation for integers with a high likelihood of occurrence and a high likelihood of being clustered together.

In alternative embodiments, the groupings may be dynamically allocated so as to vary the groups. These may be signalled separately or predetermined.

The predetermined set of second statistics metadata may be selected based on the identified set of possible integers. That is, the group indicator may imply a particular set of statistics metadata is to be used to decode the integer of that group from the encoded data set. This allows flexibility, decoding efficiency and allows for groups to be of different compositions and sizes.

Preferably, the predetermined set of second statistics metadata comprises a corresponding number of values to the number of integers within the identified set of possible integers. For example 3 cumulative distribution values may be retrieved for groups of 4 integers (where 1.0 is implicit).

The predetermined set of second statistics metadata may comprise cumulative distribution values representing 0.25, 0.5, 0.75 and 1.0 where there are four integers in the set of possible integers and the predetermined set of second statistics metadata may comprise 0.5 and 1.0 where there are two integers in the set of possible integers. Such a configuration has particular utility to improve computational efficiency when used with other aspects of the disclosure. The method may further comprise performing a subsequent decoding operation based on the decoded final integer to derive a set of data elements and reconstructing information that has been compressed from the set of data elements. Thus for example a plane of data can be recreated from the information of the encoded data set.

In preferred embodiments, the method may further comprise, if multiple integers do not exist in the set of possible integers, selecting the integer in the set of possible integers as the final integer. Thus only one decoding stage may be needed for certain symbols, significantly reducing the data overhead while not hampering flexibility of the system.

Accordingly, there is provided with this aspect a flexible system which enables a reduction of data size and an improvement in computational efficiency to decode symbols of a certain type and likelihood of transmittal and clustering. The technique provides for an implementation to be configured so as to take advantage of the particular way symbols may occur in clusters or with a likely frequency so that the proposed two-stage process can be tailored to a particular set of information to be compressed and utilise that likely occurrence and spread of symbols in the original data set before encoding using the arithmetic or range coding operation.

According to a further aspect of the invention there may be provided an apparatus for decoding symbols from an encoded data set using an arithmetic decoding operation, comprising a processor configured to carry out the method of the above aspect.

According to a further aspect of the invention there may be provided a method of encoding symbols into an encoded data set using an arithmetic decoding operation, the symbols each representing by an initial integer from a defined range of integers, the method comprising: retrieving an initial integer to be encoded; identifying a group indicator corresponding to a set of possible integers which contains the initial integer from a plurality of sets of possible integers; retrieving an array of first statistics metadata, wherein the first statistics metadata represents a respective probability of each of the sets of possible integers having an integer being retrieved to be encoded in the encoded data set and wherein the size of the array is less the size of the defined range; performing an arithmetic encoding operation on the group indicator based on the array of statistics metadata to create the encoded data set; if multiple integers exist in the set of possible integers, identifying an integer indicator which indicates a location of the initial integer in the set of possible integers and performing a further stage of the arithmetic decoding operation based on the integer indicator using predetermined set of second statistics metadata different from the array of first statistics metadata.

The step of retrieving an array of statistics metadata comprises identifying a probability of integers occurring in a data set to be encoded and assigning a probability to the set of possible integers based on the probability of each integer in the set occurring in the data set to be encoded. The arithmetic decoding operation is a range decoding operation. The statistics metadata may represent a probability distribution function. The probability distribution function may be a piecewise linear function. The probability distribution function may be a cumulative distribution function. The cumulative distribution function is a non-decreasing function less than 1.0, such that 1.0 is implicit. The size of the array may be one fewer than the number of sets of possible integers indicated by a corresponding number of possible group indicators and wherein the limits of the cumulative distribution function are implicit. The size of the array may be 6 and 0 and 1.0 of the cumulative distribution function are implicit such that 7 sets of possible integers are indicated by 7 possible group indicators. The defined range may be 0 to 15 such that 16 possible integers are represented. The initial integer may represent a bit unsigned number. The bit unsigned number may be used as metadata in a data structure to indicate structure of the data structure or to indicate presence of data elements in the data structure or both. The sets of possible integers may be grouped together as sets:

[7, 11, 13, 14], [1, 2, 4, 8], [5, 10], [3, 12], [6, 9], [0] and [15], each set being mapped to a corresponding group indicator. The predetermined set of second statistics metadata may be selected based on the identified set of possible integers. The predetermined set of second statistics metadata may comprise a corresponding number of values to the number of integers within the identified set of possible integers. The predetermined set of second statistics metadata may comprise cumulative distribution values representing 0.25, 0.5, 0.75 and 1.0 where there are four integers in the set of possible integers and wherein the predetermined set of second statistics metadata may comprise 0.5 and 1.0 where there are two integers in the set of possible integers. The method may further comprise, if multiple integers do not exist in the set of possible integers, performing a new decoding operation.

According to a further aspect of the invention there may be provided an apparatus for encoding symbols into an encoded data set using an arithmetic decoding operation, comprising a processor configured to carry out the method of the above aspect. According to further aspects of the invention there may be provided computer readable media which when executed by a processor cause the processor to perform any of the methods of the above aspects.

DETAILED DESCRIPTION

Examples of systems and methods in accordance with the invention will now be described with reference to the accompanying drawings, in which:—

FIG. 1 shows a grid of values before decoding and after reconstruction;

FIG. 2*a* illustrates a logical representation of a bytestream and an intermediate stage of processing an ordered tree according to an embodiment of the present invention;

FIG. 2*b* illustrates a recreated grid at the stage of the process illustrated in FIG. 2*a*;

FIG. 3*a* illustrates a logical representation of a bytestream and an intermediate stage of processing an ordered tree according to an embodiment of the present invention;

FIG. 3*b* illustrates a recreated grid at the stage of the process illustrated in FIG. 3*a*;

FIG. 4*a* illustrates a logical representation of a bytestream and an intermediate stage of processing an ordered tree according to an embodiment of the present invention;

FIG. 4*b* illustrates a recreated grid at the stage of the process illustrated in FIG. 4*a*;

FIG. 5*a* illustrates a logical representation of a bytestream and an intermediate stage of processing an ordered tree according to an embodiment of the present invention;

FIG. 5*b* illustrates a recreated grid at the stage of the process illustrated in FIG. 5*a*;

FIG. 6 shows representation of a Morton order mapping of the ordered tree to a grid;

FIG. 7*a* illustrates a logical representation of a bytestream and an intermediate stage of processing an ordered tree according to an embodiment of the present invention;

FIG. 7*b* illustrates a recreated grid at the stage of the process illustrated in FIG. 7*a*;

FIG. 8*a* illustrates a logical representation of a bytestream and an intermediate stage of processing an ordered tree according to an embodiment of the present invention;

FIG. 8*b* illustrates a recreated grid at the stage of the process illustrated in FIG. 8*a*;

FIG. 9*a* illustrates a logical representation of a bytestream and an intermediate stage of processing an ordered tree according to an embodiment of the present invention;

FIG. 9b illustrates a recreated grid at the stage of the process illustrated in FIG. 9a;

FIG. 10b illustrates a recreated grid at the stage of the process illustrated in FIG. 10a.

FIG. 11b illustrates a recreated grid at the stage of the process illustrated in FIG. 11a.

FIG. 12b illustrates a recreated grid at the stage of the process illustrated in FIG. 12a;

The present invention provides a technique and apparatus for encoding, and decoding, data, in particular image and video data. The present invention particularly proposes a technique for encoding a sparse 2D array into a data stream and recreating a sparse 2D array from an encoded data stream.

The present technique takes advantage of the sparseness of a 2D array of data to be decoded and/or encoded. That is, the relative amount of zeros in the expected array and the way those zero values are grouped within the array. Similarly the techniques are beneficial where the frequently occurring values are of any predetermined value, instead of zero, but are identical and grouped together.

Typically the data can be of any nature as long as the values can be mapped into a 2D array, although the techniques are also applicable to linear data and most beneficial for image reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream. Residuals are further defined in the present application, but in general residuals refer to a difference between a value of a reference array and an actual array of data.

It should be noted that techniques described in the following description are agnostic as to the meaning or use of the decoded array. Rather the concept of decoding a sparse array from an encoded bytestream or bitstream is discussed, for example. Of course, the data set may be used to reconstruct a larger dataset by combining multiple decoded data sets. Once recreated the data may represent any information which has been compressed, such as an image or sonogram.

A plurality of individual datasets may combine to reconstruct a larger dataset and the dimensions of the individual data sets within the larger array may be chosen according to an optimal size for processing of each data set in parallel. For example, using OpenCL terminology, the work-item for each dataset may be made more efficient by limiting the dimensions of the sub-datasets.

The following description relates to an illustrative example of de-sparsifying and decoding a specific sparse array. In particular, the description shows how processes of de-sparsification and decoding can interact with each other. Although the description refers to a specific example, the skilled person would readily understand the general principles behind it and how the process can be applied more generally to de-sparsifying and decoding data.

Figure 1:
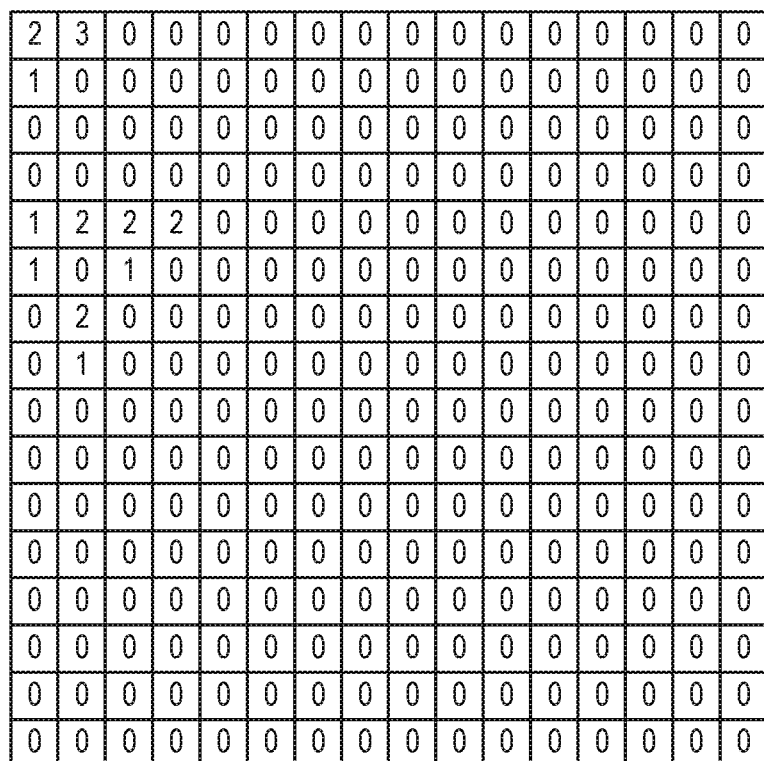

FIG. 1 illustrates an example of a recreated sparse 2D array 100 which will be used throughout the present description. This array is the recreated array which is encoded in an example bytestream. As can be seen, the array contains a large amount of zeros and small clusters of non-zero values, as symbols.

The present technique takes advantage of the sparseness or consistency of the data by not sending or implicitly signalling quadrants (or blocks) where the array is sparse (or consistent) and thus achieves compression gains. Moreover, since the decoder does not need to store significant data in memory or monitor for defined symbols, decoder efficiency can be improved.

If no data is sent for quadrants in the array, there are introduced of course significant challenges at the decoder. The following sets out a technique by which a decoder may recreate a 2D array of sparse data where much of the sparse data has not been received, while any non-zero values are accurately located within the array, efficiently. In particular, the specific structure used to encode and/or decode the data together with the order used to decode said structure enables the technique to minimise the amount of information needed to be received by the decoder, thus optimising decoding and reducing the amount of data to be transmitted. Moreover the data structure and implementation provides for efficient implementation in terms of both processing capability and speed and memory usage.

During the process of decoding, an ordered tree is built. Code symbols from the bytestream are converted to decoded symbols and attached to nodes of the tree. The invention introduces a special symbol which is used by the decoder to build the tree. We refer to this special symbol here as a node symbol. The node symbol indicates to the decoder how to build the tree. Within the node symbol is information which tells the decoder how to map the information from the bytestream to the tree and what it can expect in the bytestream. Using a specific traversal order, the decoder maps the nodes symbols to the tree and can subsequently map the data received in the bytestream to leaves of the tree in the correct locations. The spatial information or the order of the original information is then contained within the tree. The mapping of the node symbols and traversal leaves blank spaces in the tree which can be simulated or inferred to indicate that a predetermined value was in that location in the original information but was not sent in the byte stream.

Within the bytestream, the node symbols are interspersed. That is, the node symbols and data symbols occur between or amongst one another within the bytestream and the different symbols can also be thought of as distributed or dispersed among each other within the bytestream. A feature of the bytestream is that the decoder cannot know the order of node symbols and data symbols prior to the decoding process. Thus there is no set or predetermined ordering to the interspersal of the symbols. The location of the data symbols is deduced from the information contained within the node symbols. The node symbols and data symbols may not occur within the bytestream one by one or regularly but rather will be present within the bytestream irregularly, but not randomly.

Figure 2A:
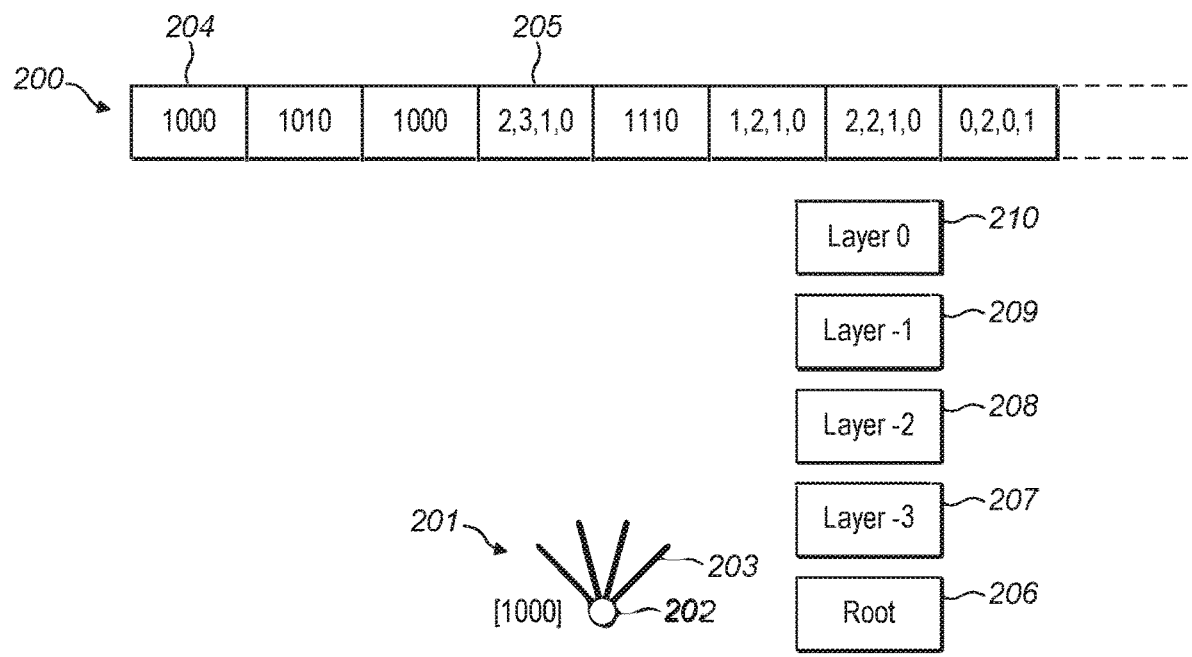

The following elaborates on the process in more detail. With reference to FIG. 2a, the technique first reads the stream 200 to identify a first symbol. The Figures in general, and FIG. 2a for example, show a representation of the received bytestream 200. As will be understood, the representation 200 is not truly a bytestream but rather a logical representation. For the purposes of this description, we assume the decoder knows or otherwise has identified the stream length from a wider bytestream along with other metadata and we consider only a specific, simple encoded dataset. The logical representation is separated into bytes or nibbles. The logical representation is a series of four-bit values or nibbles, each representing a T-Node Symbol 204 (node symbols), and a series of four symbols 205 (data symbols) each representing a value and a node in the Top Layer, or Layer 0. This will become clear from the below as the process of decoding the data is explained.

The decoder begins by building a tree 201. A tree is a well-known data structure in computer science. In particular the tree is an ordered tree, that is, the tree is a rooted tree in which the order of the subtrees is significant. The exemplary tree 201 is a quadtree composed of nodes and edges that connect the nodes 202, however binary trees, octrees and other trees may be utilised depending on the information to be compressed. A parent node is connected to a child node by an edge. In a quadtree, each parent node has exactly four child nodes. A quadtree can contain a number of leaf nodes. A leaf node is defined as a node containing no children and may alternatively be referred to as an outer-node, or terminal node. A root node is defined as a node without a parent. Nodes containing both parents and children are referred to as inner-nodes.

The present technique defines a data structure called a sparse quadtree. In the sparse quadtree, each parent node has either exactly four child nodes, or no children.

As mentioned above, once the tree is built, the Top Layer 210 of the tree, or the final layer, includes the data values of the array 100. The order in which the data values are included in the tree represents the spatial information of the array. In the present example, since we are illustrating the concepts using a quadtree to recreate a 16×16 grid of data, there are four layers and a root in the tree giving 256 possible leaves, each representing a value in the 16×16 grid. As mentioned, other sized grids may utilise different ordered trees.

During decoding, the tree 201 is traversed in a generally bottom to top definition; that is, the tree 201 is generally traversed from the lowest level to the highest level. The tree is generally traversed as greedily from low to high as possible interleaved with minimal backtracking to scan over the breadth. In an embodiment, the tree is traversed in a depth-first pre-order manner. This allows for spatial information to be utilised as part of the encoding and decoding process. It further ensures that the elements are decoded in the same order that they are encoded. In further embodiments, other traversal methods could be employed to utilise further aspects of the structure of the tile such as breadth-first, in-order or post-order. What is essential is that the same traversal is used in the decoding as the encoding to ensure that spatial information is retained. Thus, the sparse quadtree data structure defines the instances and location of data.

The data in the bytestream 200 may either be a node symbol 204 or a data symbol 205. The node symbol 204 is a series of binary values or flags that indicate to the decoder if a particular branch in the tree 201 has an expected child where the branch has an expected child if there is a data node included in the data set for the T op Layer descendants of that branch. That is, the bytestream contains information on the existence of a child node or not. If not, it can be assumed that all descendant leaves from that node are the same, predetermined value (in the example the value is zero). When the decoder traverses the tree to reach a leaf (a node in the Top Layer), the bytestream 200 contains a series of four data symbols 205, each representing a value of the leaf of the tree. The tree can be subsequently mapped to a grid using a defined order with each leaf on the tree corresponding to a location in the grid. In this way the spatial information of the grid is inherent or predetermined by the structure of the tree and is not signalled.

As indicated above, the node symbols and data symbols are interspersed within the bytestream. As the decoder parses the bytestream and builds the tree, it can assign the data symbols identified to a data location within the tree. By building the tree with a predetermined traversal, the decoder can anticipate whether the next symbol in the stream will be a data symbol or a node symbol.

If the surface was less than 16×16 (for a tree with 5 layers) the decoder could at some stages anticipate that "what would for a 16×16 surface be anticipated as the next symbol" has been omitted from the bytestream and hence anticipate a different next node or data symbol. For example, only node symbols and data symbols that are in the signalled area may be transmitted, thus preventing the sending and receiving of certain node symbols and data symbols. Similarly, certain bits of a node symbol may be set as any value but may not be treated as real values corresponding to areas of the array during decoding. The signalled region/volume may also include every node whose node symbol has a mixture of masked and non-masked bits, as will be described below. When reaching the Top Layer, the bytestream will preferably include all four data symbols for a branch, even if the data symbol corresponds to the predetermined value, i.e zero for a sparse tree. That is, the data symbols are explicitly encoded for all nodes in the outer layer or lowest level of abstraction. When this is considered in the grid representation, all values in the smallest blocks are sent when at least one of the values of the block is non-zero. Optionally, the node symbol that corresponds to the penultimate layer in the tree is not sent but rather is implicitly assumed by the decoder. Since in this scenario the data symbols are explicitly sent, it will be understood that the node symbols in this layer would be understood to include a set of positive flags (or as will become clear from the description below). Note that the value may not be positive but may be a masked value.

Another way of looking at this implicit signalling feature is that a node symbol is sent or included within the bytestream only if a grandchild node exists for the visited node of the tree. In other words, a node symbol shall have a grandchild node. The quantity of code-less layers (currently 1) could be alterable.

At the decoder, since it knows not to expect a node symbol for this layer, the decoder can assume the symbol to be retrieved is a data symbol when this node is visited in the traversal and can build the branches of the tree accordingly.

It has been identified that such a combination of implicit node symbols signalling and explicit data symbol signalling achieves optimal efficiency whilst minimising memory storage. Since the node symbol for the layer is not sent in the bytestream but rather all data symbols in the outer layer are sent, then overall this achieves efficiency gains in practice where it is statistically likely that non-zero values are clustered or grouped together within an overall data set.

In the art, there is no consideration of the effect on the subsequent stages of encoding after sparsification. According to the present disclosure, sparsity can be ignored where this makes sense to help the entropy encoder avoid encoding rare symbols. Also, the invention optionally allows a dense quadtree, by arrangement, if there is too little sparsity to justify the node symbols (which will become implicit s).

In the figures the stage of building the tree is illustrated in the Figures labelled a and the knowledge the process has of the grid is illustrated in the Figures labelled as b. Thus in FIG. 2a, the process knows that the tree 201 has a root 202 and since it is a quadtree is has four branches 203. The process cannot yet deduce any information to map to the grid 100 of 2b.

As shown in FIG. 2a, the reconstructed tree structure has a set of layers. A layer is considered to be the subset of nodes that have the same Distance from the root. The Distance is the minimum number of Branches (or edges) between two nodes. The number of layers is set by the size of the array which is to be reconstructed. This size may be either predetermined or may be signalled in the bytestream.

Where combining multiple datasets, the number of layers corresponds to the dimensions of the grid and so may be set to optimise parallel processing, that is, that each work-item is made optimally efficient.

The example considers a quadtree but the nodes may have any number of children. The tree may accordingly be referred to as an n-Tree, a tree where no node has more than n Children. That is, a quadtree is an n-Tree where n is 4. A quadtree is well known in the art and is a tree data structure in which each internal node has exactly four children except leaf nodes and all leaves are on the same level, the level corresponding to the locations in the grid. The data can be stored compactly in an array as an implicit data structure.

In the example described, the tree has four layers 207, 208, 209, 210 and a root 206 which reconstructs a tree for a 16×16 grid. That is, the Rise is 4. The Rise is the absolute value of the Altitude of the Root of an n-Tree. It corresponds to the number of Layers in the n-Tree excluding the Root. The Altitude is an index, −j, increasing with Distance from Root, reaching 0 at maximum Distance from Root. Note: −j is always <0. In other words, the Number of Layers in an n-Tree corresponds to Rise plus 1.

For completeness, a node at Altitude −j−1 is a Parent of a node at Altitude −j, where both nodes are linked together by only one Branch and a node at Altitude −j+1 is a Child of a node at Altitude −j, where both nodes are linked together by only one Branch (or edge). A node at Altitude −j+x is a Descendant of a node at Altitude −j, where x is the Distance between the two nodes and a node at Altitude −j−x is an Ancestor of a node at Altitude −j, where x is the Distance between the two nodes. The decoder begins to build the tree 201 once it has read the bytestream. At this stage, the grid 100 is empty as shown. The decoder knows that the tree 201 must have a root node 202 and simulates four branches 203 from that root node 202 as the decoder knows that the tree 201 is a quadtree (or 4-tree). Thus the root 202 and the first four branches 203 are known or assumed.

Where we describe the steps of simulation, it will be obvious to the skilled person that these steps are for illustration only and can be implemented by the skilled person in different ways or orders.

The tree can be traversed in any known manner. The example here utilises a depth-first approach, specifically a Depth-First Pre-Order Traversal. A Depth-First Pre-Order Traversal can be considered to be a strategy for traversing an Ordered Tree from least to greatest Altitude. If a Leaf is reached, the strategy backtracks through Ancestors of that Leaf, before traversing further sections of the same Tree.

In other words, the tree is deepened as much as possible on each child before going to the next sibling. In context, the decoder will start from the Root 206 of the tree and proceed towards Layer 0 210, the Top Layer, as far as possible before retreating to the next sibling in the previous Layer. The decoder will repeatedly retreat after all siblings in that layer have been visited until a Depth-First Pre-Order Traversal of that grid has been completed.

Returning to the example of FIG. 2a, the first 4-bit value 204 of the stream 200 is taken. In this example, the value is 1000. This value may be referred to as a T-node symbol. A Label is data attached to a node in a Tree other than what is implicit in the Tree's structure and order of nodes. The T-node symbol informs the decoder of the data in the stream and tells the decoder how to reconstruct the tree 201.

In the 4-bit value of the stream, the T-Node Symbol, a T" indicates that the Child of the node is an expected child, that is, there will be data sent in the stream representing the Children of that node—or, alternatively, a T" indicates that the Child node will have itself children, and therefore it will be present. On the other hand, a"0" indicates that the Child of the node is not expected, that is, no data will be sent in the stream for those nodes and no child is expected to be received for that branch—or, alternatively, a"0" indicates that the Child node will not have itself children, and therefore it will not be present. The decoder can assume that all the leaves from those latter branches are zero values. This will optionally be simulated and is described below.

At the end of the branches 203 of the root node 201, the decoder now knows that there is a node having further children for which data will be received in the stream and three nodes for which no further data was or will be sent.

Figure 3A:
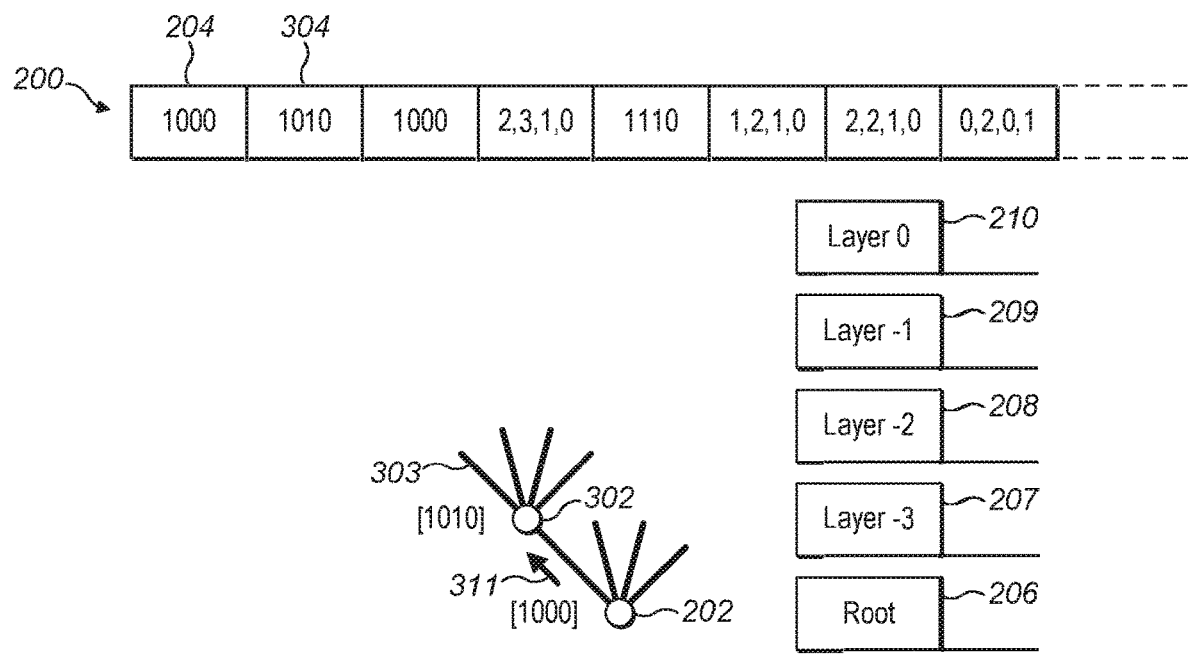
Figure 3B:
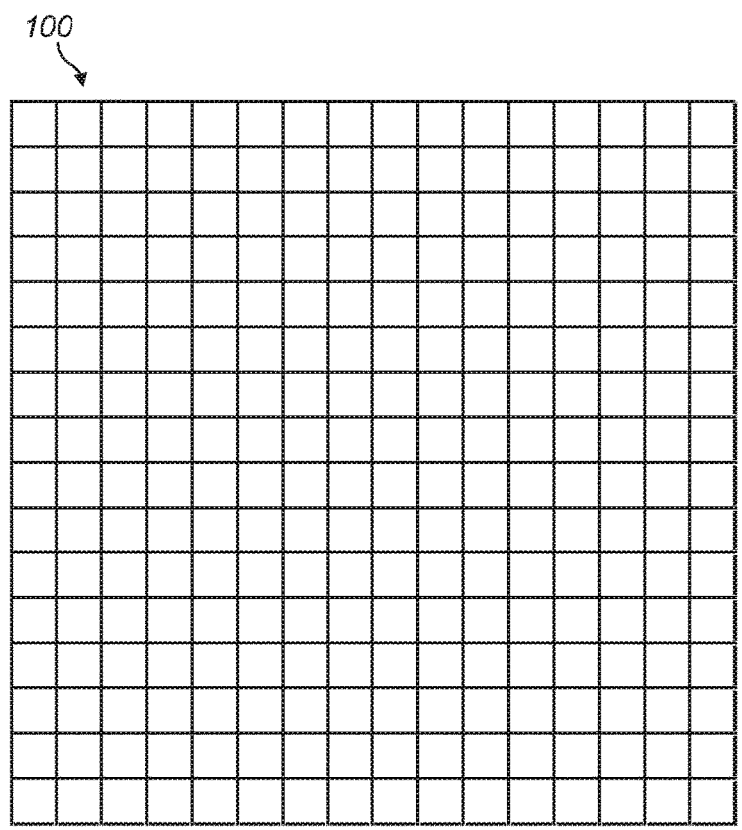

In the depth-first pre-order traversal order and referring to FIG. 3a, the process moves to the left-most node 302. There was a 1 received in the stream for this branch in the T-Node Symbol 204. It will be recalled that the T-node symbol 204 indicates that further data will be received, the next 4-bit value 304 of the stream is taken. In this example, the value is 1010. The decoder simulates the 4 branches of that node 302, as shown. Again, no information in the grid 100 of 3b can be deduced.

Figure 4A:
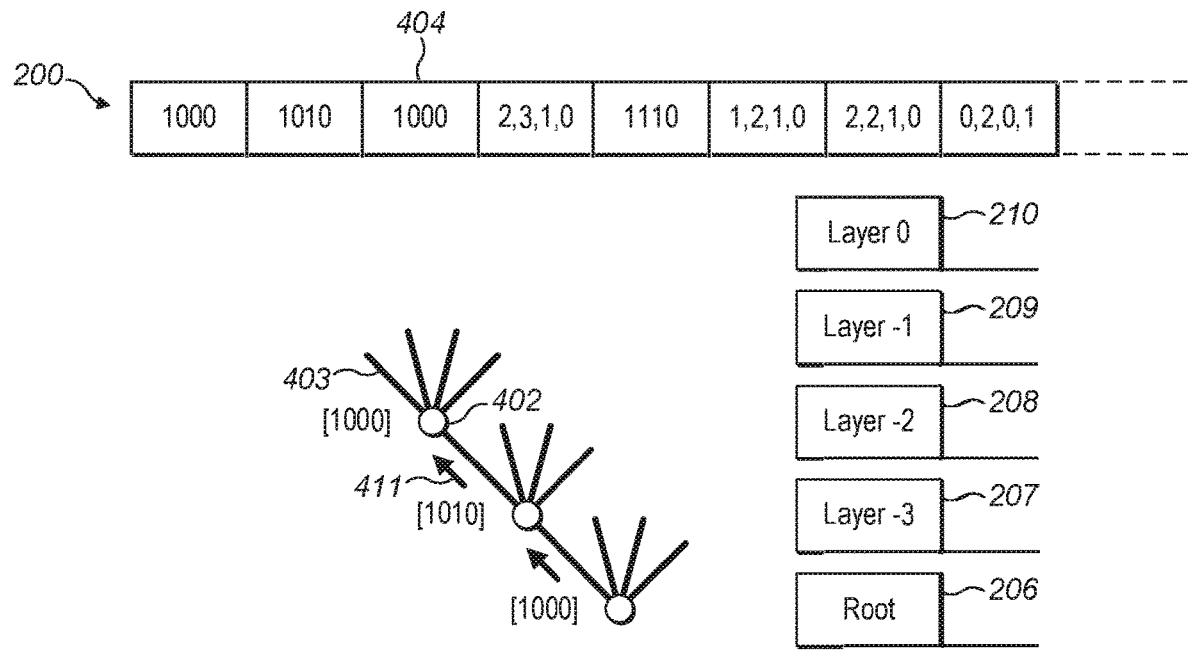
Figure 4B:
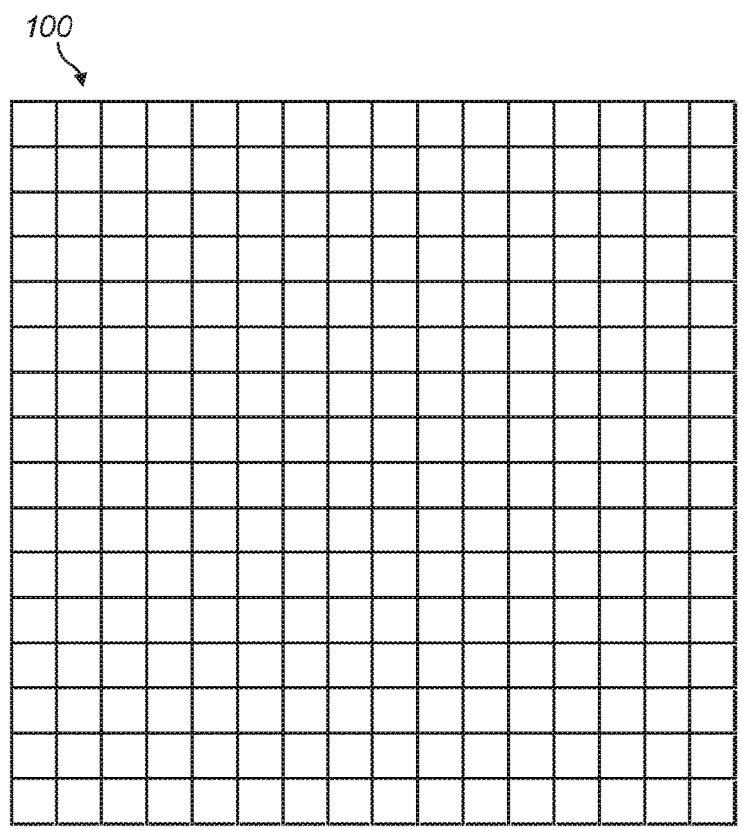

Arrow 311 shows the traversal as will be explained in more detail below. The left-most branch 303 is traversed and since the first value of the T-node symbol 302 is 'l' the decoder looks to the next 4-bit value. The decoder is now in Layer-2 208 as shown in FIG. 4a. As shown, the data retrieved next 404 is 1000 signifying that further data will be received for the leftmost branch 403 but no further data will be sent for the three remaining branches. Again, no information in the grid 100 of FIG. 4b can be deduced and arrow 411 illustrates the traversal.

The decoder has now populated the root and the left-most part of the Layers-3 207 and -2 208 from the left-most node of Layer-2 208, as shown in FIG. 4a. Moving to FIG. 5a, since the decoder has reached Layer-1, it now expects 4 data symbols. It is noted that all values in Layer 0 are sent if the decoder reaches that level even if the actual value is zero (for a sparse array or alternatively the same as the predetermined value) and thus no symbol is signalled for Layer-1 209 since this will always be known and no symbol is attached to the node 512 of this Layer.

The decoder now takes the data symbols from the stream to populate the tree in the nodes 513 of the Top Layer. In the example the symbols or values are '2','3', 'T' and 'O' and the decoder populates the tree as shown in the Figure. In the example traversal order, the tree is populated with the symbols from left to right and each Leaf in Layer 0 (the Top Layer) is known. The four data symbols can be considered as part of a Label recalling that a Label is data attached to a node of the tree. Again 511 shows the traversal order.

Rather than send the node symbol of Layer-1, which in this example would be (only if you chose to send the pre-determined value of the 4th symbol implicitly) since the fourth data symbol in this quadrant is a 0, the preferred implementation instead includes all data values for this quadrant in the bytestream directly, even if the value is a zero (or the predetermined value). In other words, all sibling data values are sent where at least one sibling is non-zero. In this way the Layer-1 node symbol need not be sent. It has been shown that the implicit signalling of the node symbol for Layer-1 and the explicit signalling of all values for each 2×2 block containing a non-zero value is more efficient than sending non-zero values only and signalling their location in the bytestream.

If for example the tree was a binary tree, instead of encoding and sending the penultimate layer, the bytestream instead would include both data values where at least one of two neighbouring data values is non-zero.

Once the data symbol has been retrieved, in a preferred implementation the tree beneath that data symbol can be trashed to the extent it is no longer needed. In this way, efficient use of memory resources can be achieved as the interspersed data symbols result in the entire structure of the grid not being needed in order to accurately identify or place the data values.

The following is a summary of the present example:
1. the first T-Node Symbol of the bytestream (1000) corresponds to the T-Node Symbol of the Root Layer;
2. the second T-Node Symbol of the bytestream (1010) corresponds to the T-Node Symbol of Layer-3;
3. the third T-Node Symbol of the bytestream (1000) corresponds to the T-Node Symbol of Layer-2;
4. there is no T-Node sent for Layer-1 because the T-Node of Layer-1 would always be (1111), and therefore it is implicitly present once the T-Node Symbol of Layer-2 has indicated there is a child node and data symbols for that branch;
5. The values in the Label correspond to Layer 0 and are "attached" to the branches of Layer-1. For further clarification, within a data structure there are five layers (wherein a layer is a set of nodes), from the Root Layer to Layer 0. Each Layer is associated with a set of data. In the case of the Root Layer, Layer-3, and Layer-2, this set of data is called a T-Node Symbol' or node symbol (these terms may be used interchangeably) and effectively indicates whether the four children node from a specific layer will have children (in which case it is a logical value of 'I') or no children (in which case it is a logical value of "0"). Where there are no children, this indicates that no data symbols exist in the T op Layer for that branch of the tree. Layer 0 is a special layer in that it contains leaves, i.e. nodes with no children, and in particular includes the data symbols in those leaves.

In the bytestream, there will be node symbols for the Root Layer, Layer-3 and Layer-2. Due to the way that node symbols work and their meaning (as described in this application), and the fact that Layer 0 is the "final" layer, node symbols for Layer-1 is implicitly sent, since the node symbols in Layer-2 would have already implicitly indicated whether or not the child node of Layer-2 (i.e., Layer-1) has children. Given that the children could only be the data symbols in Layer 0 (residuals or metadata for example), then the bytestream would only simply directly indicate Layer 0 data symbols. Note we have a maximum of 21 node symbols for each data structure (one for the root, up to four for Layer-3, and up to 16 for Layer-2).

From a nomenclature point of view, the term "Label" may refer to: (a) node symbols for Root Layer or Layer-3 (e.g., in the present figures these would be data blocks and [1010]);

(b) the "group" of Layer-2 and the data symbols of Layer 0 (e.g., in the present figures, these would be either the third and fourth data block in the bytestream, i.e. and {2, 3, 1, 0} or the last four data blocks in the bytestream, i.e., [1110], {1, 2, 1, 0}, {2, 2, 1, 0} and {0, 2, 0, 1}); and (c) each individual data symbol in Layer 0 (e.g., in the present figures, each one of data blocks {2, 3, 1, 0}, {1, 2, 1, 0}, {2, 2, 1, 0} and {0, 2, 0, 1}).

Figure 5A:
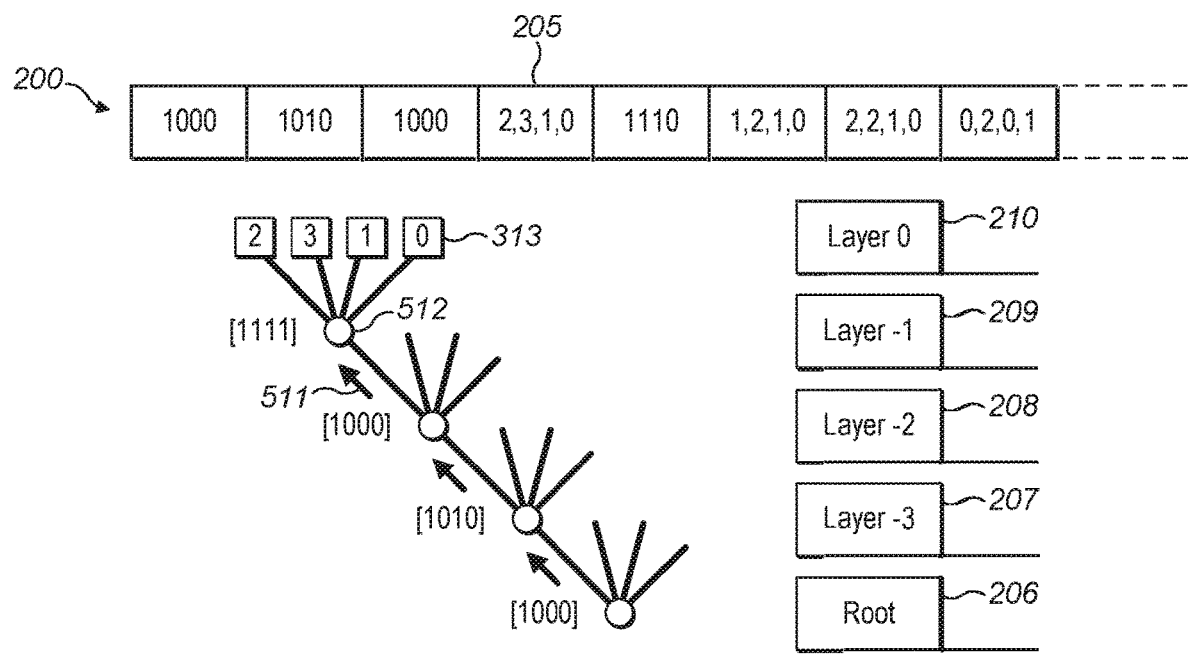
Figure 5B:
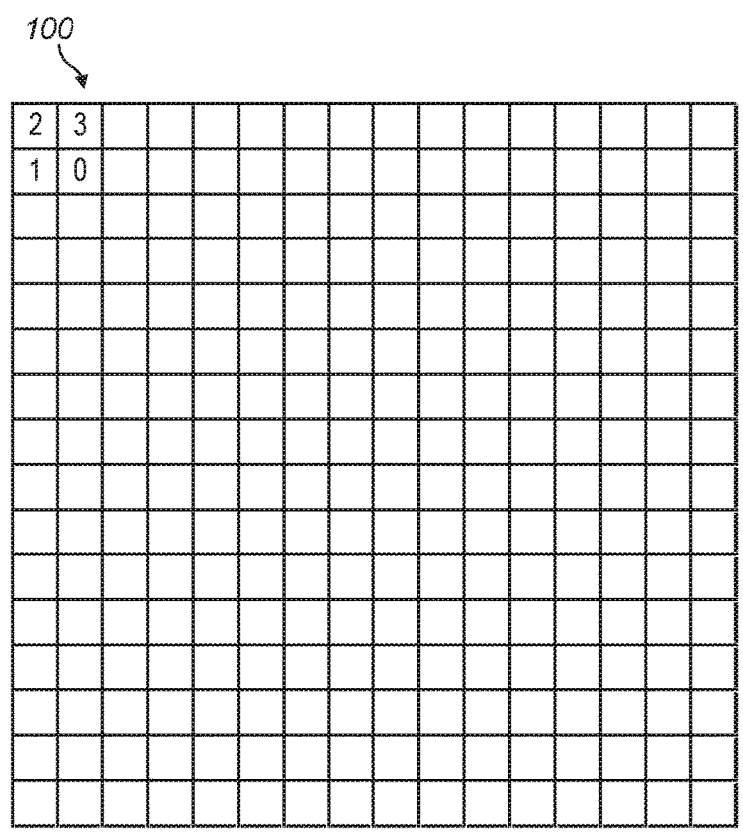

We now have values which can be mapped to the grid 100 as shown in FIG. 5b. Whether the grid is populated as the tree is populated or after is unimportant but we populate the grid here when the data is placed into the tree for illustrative purposes. As above, the tree can be mapped using spatial information inherent to the data structure. In practice, the process may wait until the entire tree is populated.

Each data symbol or value is referred to in the examples as a discrete value however in preferred embodiments the value in the array is a differentially encoded value which is relative to another symbol in the data set. In other words, differences may be relative to the values for the previous non-sparsified element, apart from values in the first non-sparsified element of a grid, which are absolute. For example, if the first value is 4 and the second value is 5, the first value retrieved will be a 4 and the second value will be a 1, which is the difference between the first value and the second value. As will be understood the difference values can be translated into real values before the mapping or as a part of the mapping.

As shown in FIG. 5b, the 16×16 grid 100 of decoded values can be populated by the symbols received. A grid is a fully populated, dense, rectangular 2D array. The four symbols represent a 2×2 block in the upper left of the grid.

In the example, the 2×2 block is ordered: top-left, top-right, bottom-left, bottom-right. As will be understood, in practice this order may be any order provided the encoder and decoder are in agreement.

The values in the stream shall be interleaved in the example in depth-first order, which corresponds to z-order in image space. The z-order is defined recursively in the examples but of course this may be any order, as will be understood. Z-order is an ordering of overlapping two-dimensional objects. In the example, the data of the tree is mapped to the grid in a Morton ordering. A Morton ordering maps multidimensional data to one dimension while preserving locality of the data points. It was introduced in 1966 by G. M. Morton. The Morton order for the example is sub-partitioned into 2×2 blocks. The terms Z-order, Lebesgue curve, Morton order or Morton code are used in the art. Morton ordering is well known in the art and will be understood. It will also be understood that any suitable mapping of the data from the tree into the grid may be utilised.

In practice Morton ordering using 2×2 blocks means that the symbols of the tree are mapped to the grid in the following example order for an 8×8 grid:

1 4 5 16 17 20 21
2 3 6 7 18 19 22 23
8 9 12 13 24 25 28 29
11 14 15 26 27 30 31
32 33 36 37 48 49 52 53 34 35 38 39 50 51 54 55
41 44 45 56 57 60 61
42 43 46 47 58 59 62 63

When considering the mapping of the tree to the grid, it can be considered that the z-order mapping results in each branch of the tree being a quadrant of the grid. The Layer-1 branches each being a 2×2 block, the Layer-2 branches each being a 4×4 block and the Layer-3 branches each being an 8×8 block (the Root representing the 16×16 grid). The Morton ordering and depth-first pre-order traversal are illustrated figuratively in FIG. 6.

While a Morton ordering is a preferred ordering, it is also contemplated that other orders such as a Hilbert space-filling curve, also known as a Hilbert pattern or Hilbert curve, may be used which may provide implementation or efficiency gains depending on the array to be compressed and the likely locations of non-zero elements in the array. In certain circumstances the Hilbert curve ordering will also have better locality preserving behaviour.

Figure 7A:
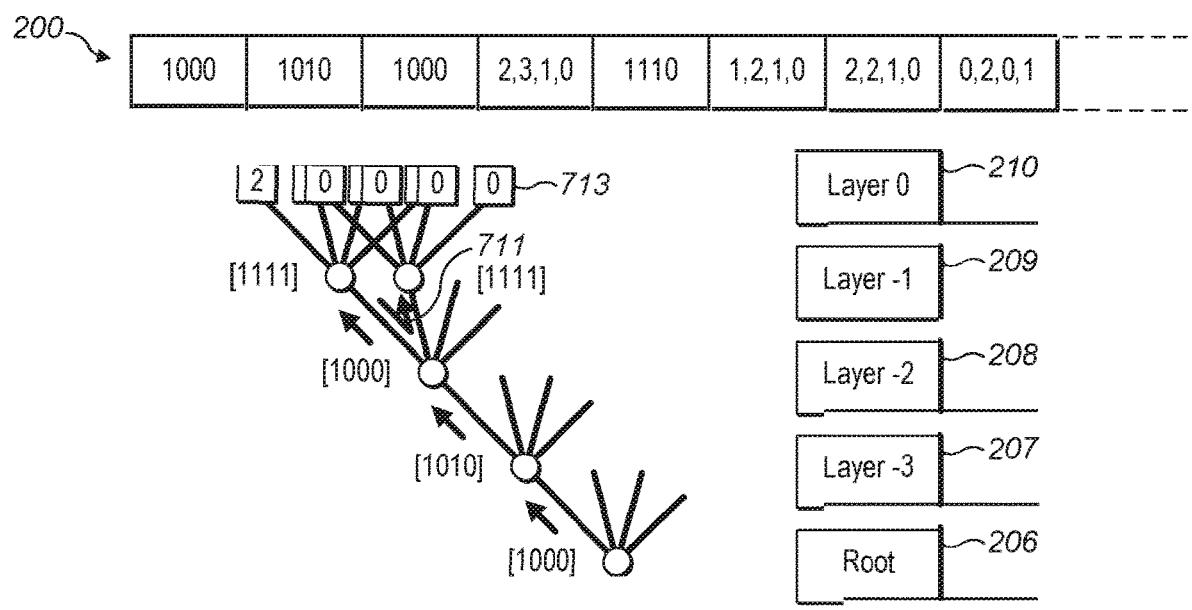

With reference to FIGS. 5a and 5b, it can be seen that the first four symbols have been decoded and mapped. Following the traversal order, the decoder decodes the tree, as shown in FIG. 7a. Arrow 711 shows the traversal order. Since the data previously received for Layer-2 indicated a 0 value for this node, the decoder is able to simulate or infer the sparse portion of the tree and map zero values to the grid. Where a 0 is received in the T-node symbol, the 0 indicates that no data will be sent for that node. If no data is to be sent, the decoder assumes the value is zero.

The present context assumes that the grid is sparse and so assumes a zero value where no data is sent. Of course it will be readily understood that any value could be used as the value that is not sent. For example, the value not sent could be any value or a 1.

Figure 7B:
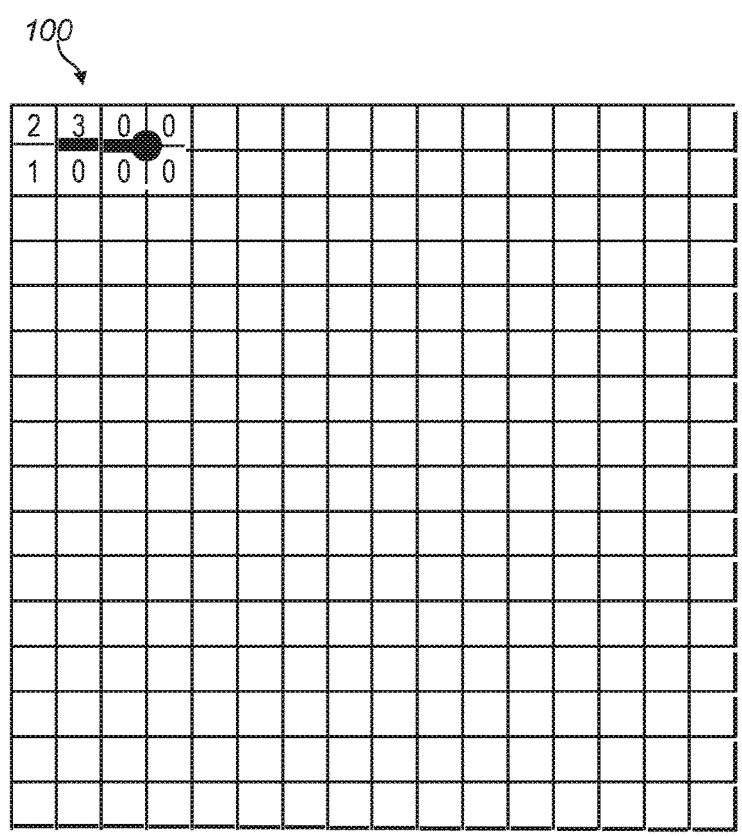

As shown in FIG. 7a, the process assumes that the values 713 in the Top Layer 210 are zero and simulates the tree. The zero values can then also be mapped onto the grid 100 following the z-order mapping as shown in FIG. 7b. The four zero values are mapped to the 2×2 block to the right of the 2×2 block previously mapped.

While we describe a process of simulation here it will be understood that the traversal can instead be terminated for that branch and the grid populated using the inferred values without having to simulate the tree as the values will be indicated by the termination of the traversal. However, we describe simulation here as an implementation option which allows for clearer presentation of the technical concepts.

Figure 8A:
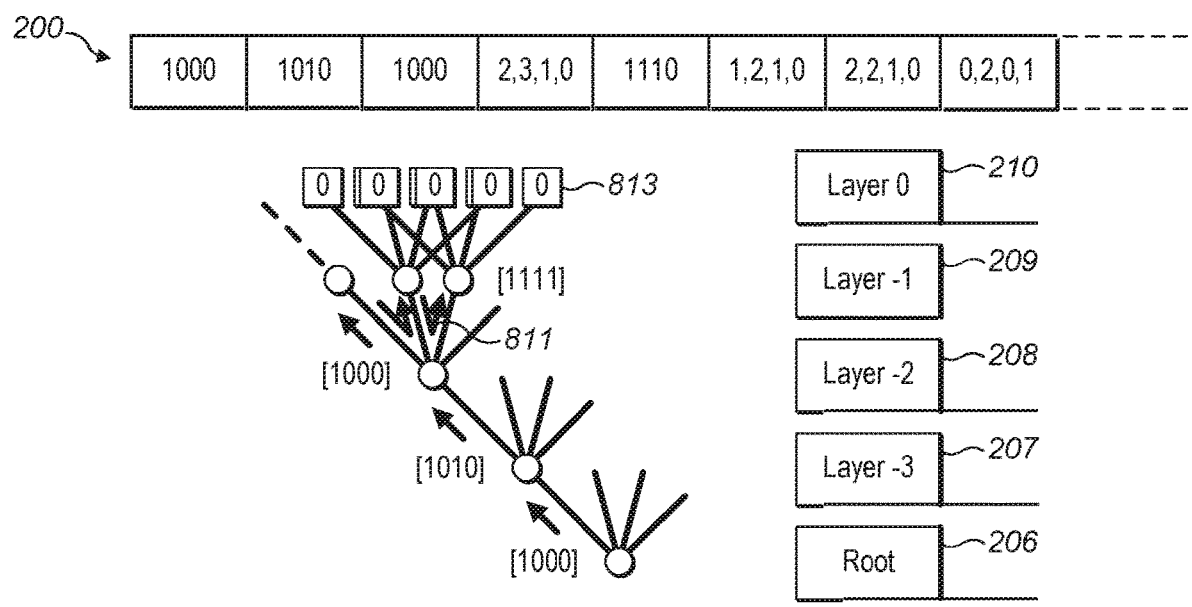
Figure 8B:
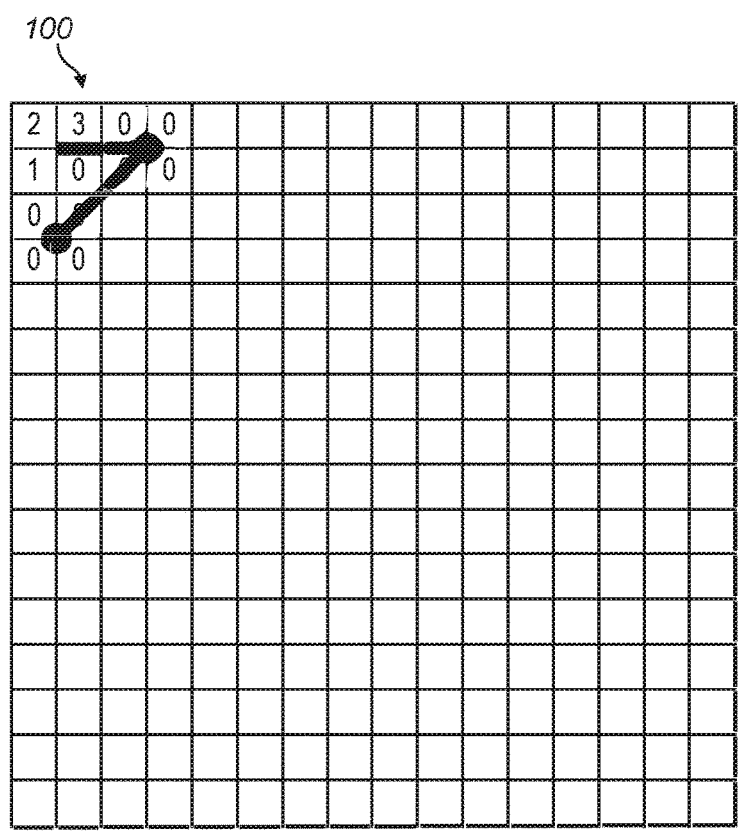

The simulation process continues as shown in FIG. 8a. In this figure the leftmost branch of the tree is redacted for clarity of presentation. The previously parsed node symbol indicated that the next node in the traversal 811 terminates. Therefore, the decoder can simulate that the leaves 813 of this node are sparse in Layer 0. The zero symbols can be mapped to the grid according to the z-order mapping. As shown in FIG. 8b, a block of 2×2 zero values are entered beneath the first block placed, that is, at the bottom-left of the 4×4 quadrant.

Figure 9A:
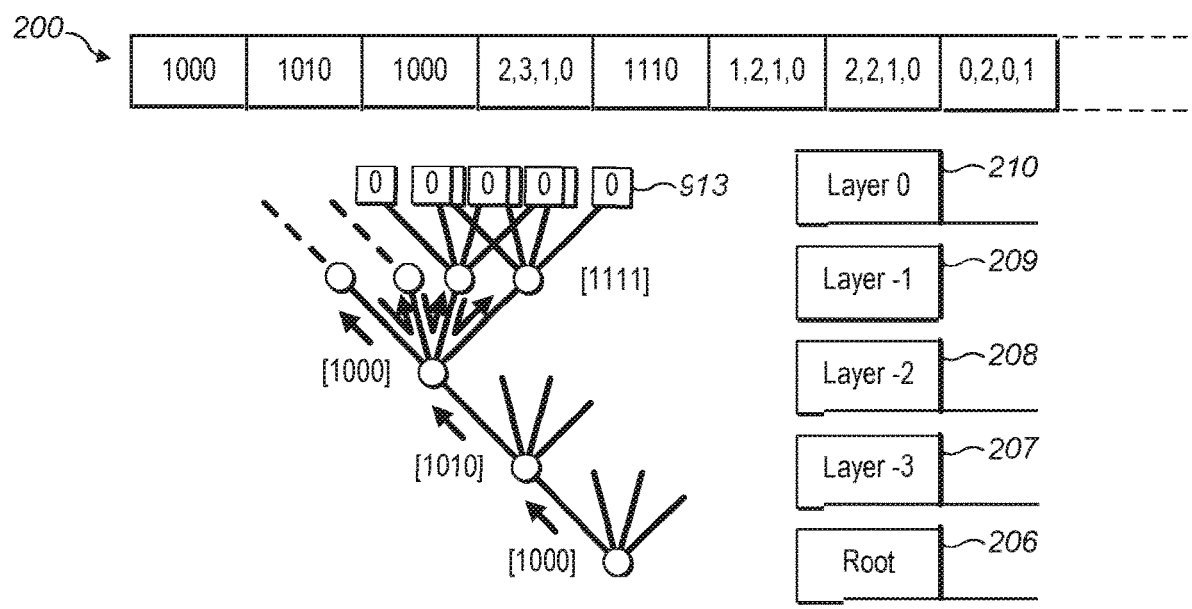
Figure 9B:
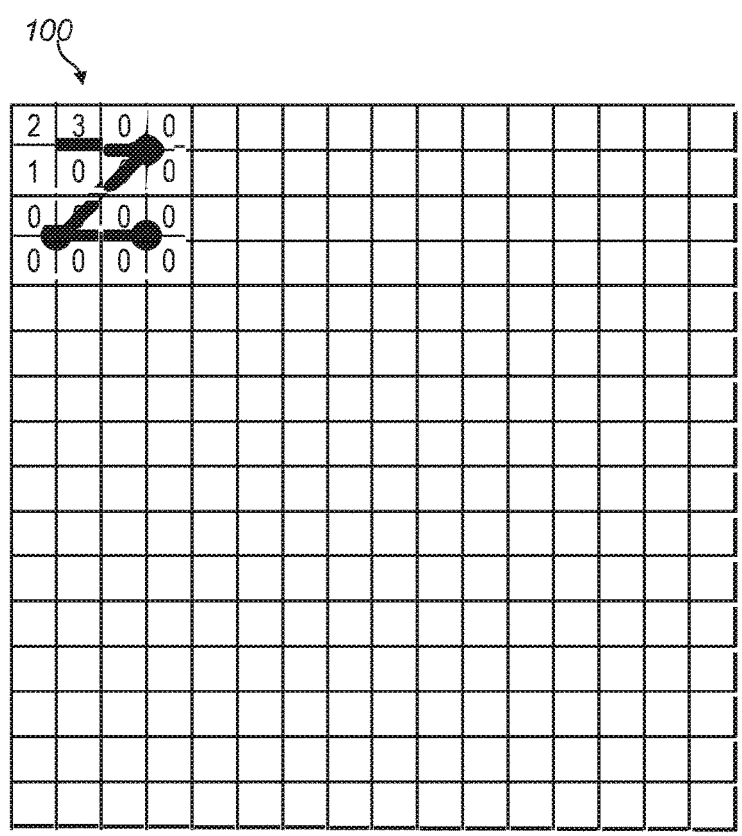

The quadrant in the grid 100 is completed by simulating the final leaves 913 of that node. As the node symbol for that node indicated 1000, the sparse values can be simulated as shown in FIG. 9a. The zero values are mapped to the final 2×2 block of the 4×4 quadrant according to the z-order, as illustrated in FIG. 9b. The 2×2 block of zero values is entered as the bottom-right block of the quadrant. The process now has a complete quadrant. In practice, the simulation may be done in one single step for each of the Layers (e.g., all the nodes associated with the zero node symbols in that Layer are simulated simultaneously and the corresponding zeros are mapped in the grid). The simulation can be a notional process, i.e. done implicitly rather than explicitly.

Figure 10A:
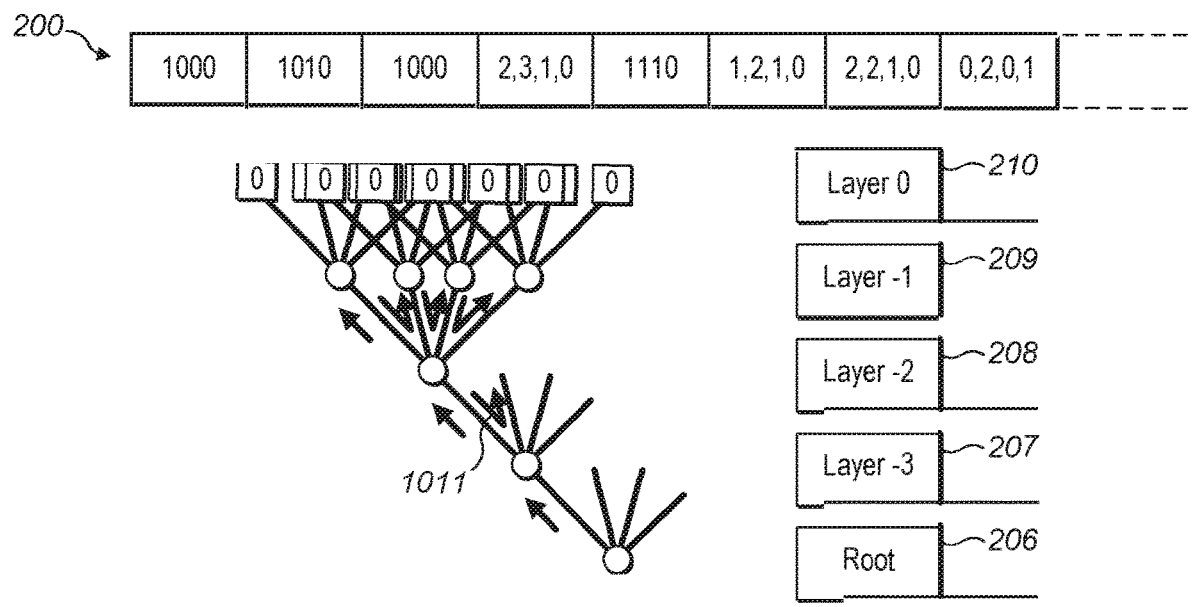
FIG. 10a illustrates a logical representation of a bytestream and an intermediate stage of processing an ordered tree according to an embodiment of the present invention.
Figure 10B:
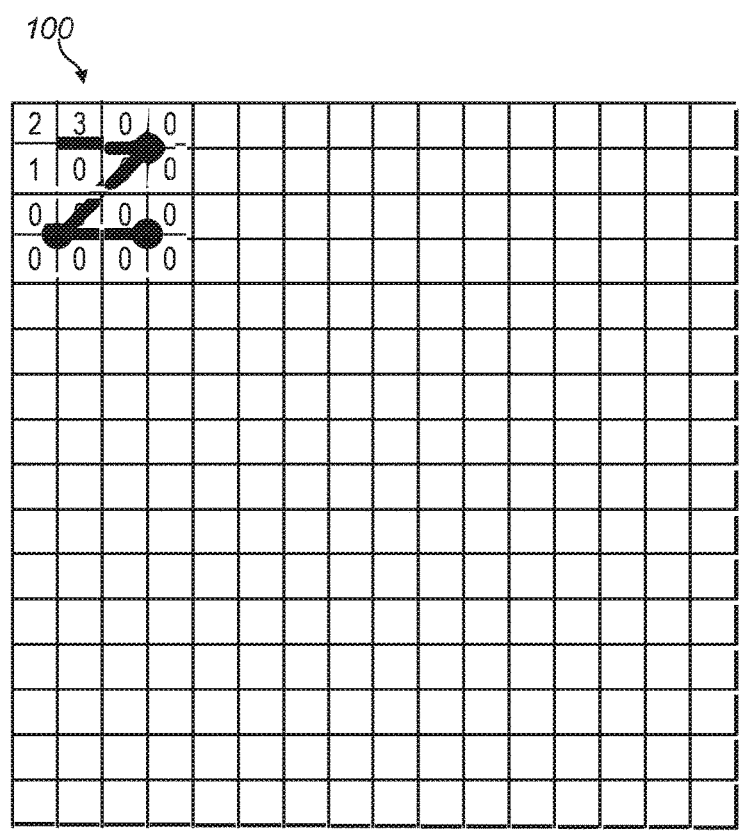

FIG. 10a illustrates the depth-first pre-order traversal. The arrows 1011 indicate how the process traverses the tree to consider the next node. The process descends the tree now it has populated all branches from the previous node. The process then continues to the sibling. Sibling Nodes are nodes having same Altitude and same Parent. As all the leaves have been populated, the next node to consider is the sibling in Layer-2.

Figure 11A:
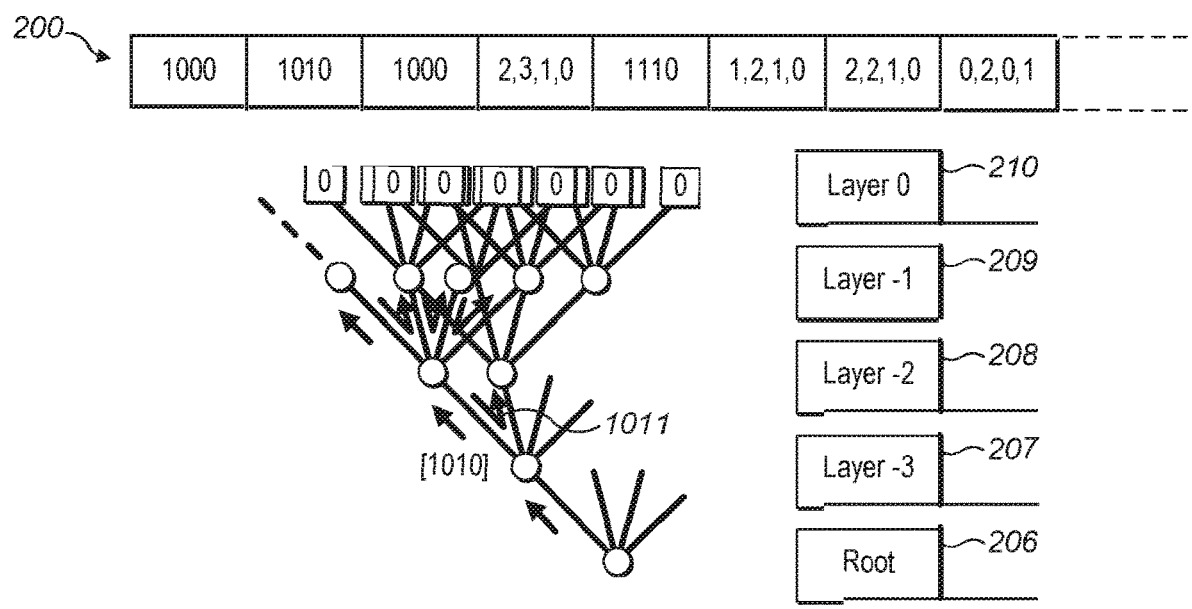
FIG. 11a illustrates a logical representation of a bytestream and an intermediate stage of processing an ordered tree according to an embodiment of the present invention.
Figure 11B:
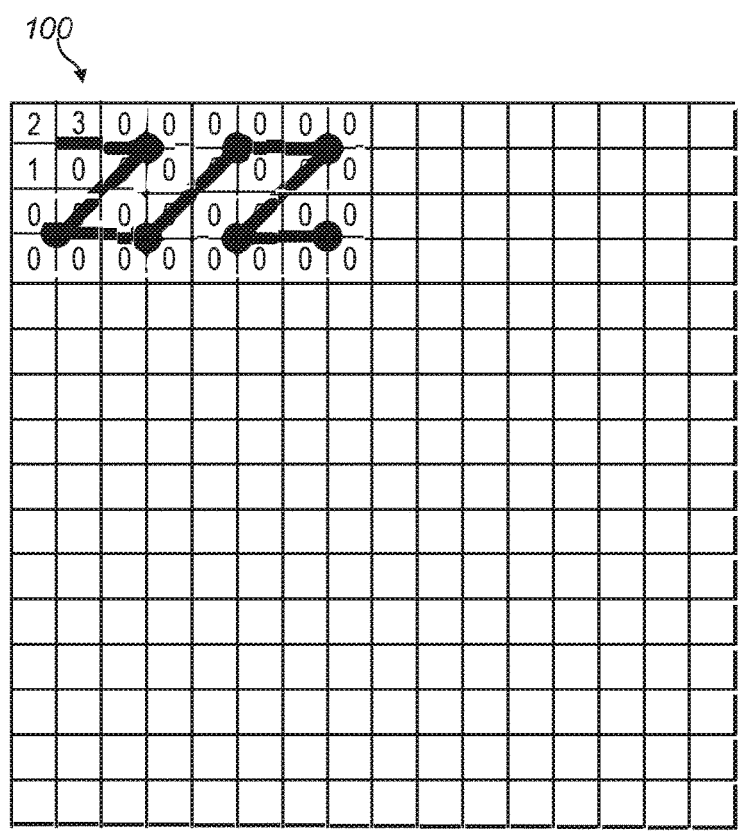
Figure 12A:
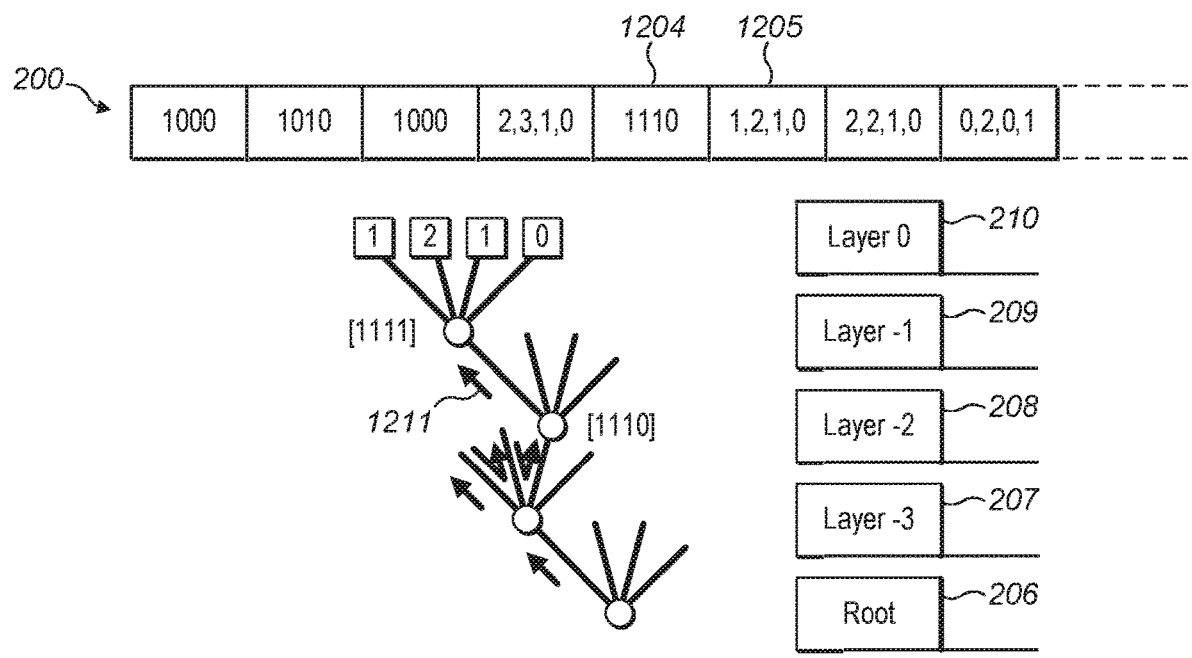
FIG. 12a illustrates a logical representation of a bytestream and an intermediate stage of processing an ordered tree according to an embodiment of the present invention.
Figure 12B:
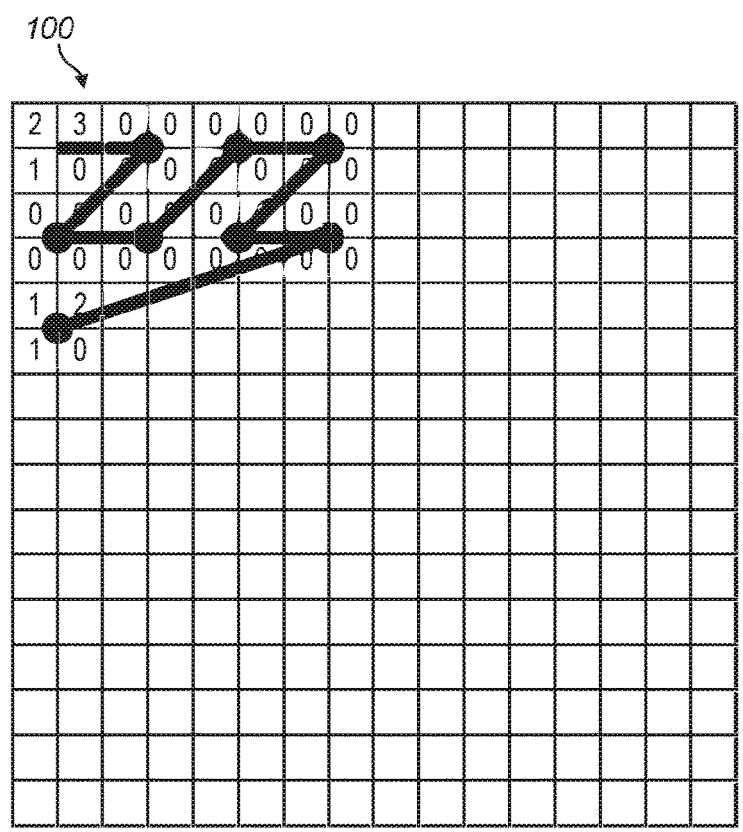

Referring to FIG. 11a, it will be recalled that the node symbol for the parent was 1010. Accordingly, since the node symbol associated with the second branch is zero, the process does not expect to receive any data in the stream for this branch, that is, the sibling. Accordingly, all leaves from this node can be simulated as zero values, that is all values in Layer 0 from this node are zero values. In other words, all values in this quadrant are zero. Once the tree is simulated, the values can be mapped on the grid. As shown in FIG. 11b, following the z-order, the 4×4 block in the top-right of the quadrant can all be mapped as zero values. Traversing the tree, the next sibling was indicated by the node symbol as having data in the stream (the corresponding Node Symbol was 1). Accordingly, the process retrieves the next node symbol 1204 from the stream. As shown in FIG. 12a and reconstructed in FIG. 12b, in this example the next node symbol is 1110. This node symbol indicates that three of the nodes in Layer-1, that is three of the Children from the node in Layer-2, have nodes which contain non-zero values. The final node contains only zero values. In FIG. 12a, certain nodes and branches have been redacted and arrow 1211 indicates the traversal.

The process continues in a similar manner and the symbols are retrieved from the bytestream, the tree is built using the symbols as the leaves in Layer 0 and the symbols are mapped to the grid according to the z-order mapping. For brevity, the next steps are not illustrated. For the final sibling of this node, no data is retrieved from the stream as a 0 was indicated in the T-node symbol. The process simulates the tree with zero values as the leaves in Layer 0 from this node. The zeros are mapped to the grid to complete the quadrant. The final sibling from the node in Layer-2 was indicated using the node symbol as being sparse and the process populates the tree with zero values for all leaves descended from that node. The zeros are mapped to the grid with zero values for that 4×4 block in the quadrant.

The traversal now ascends to the next parent node in Layer-3 following the traversal order. Since the first node symbol retrieved from the stream for the root node indicated that this branch does not have a node symbol in the stream, it can be inferred that all leaves in Layer 0 which are descended from this branch, the second branch from the root, are zero values. The process accordingly reconstructs a dense tree while simulating zero values for all leaves in this sub-tree. The zeros are mapped to the grid. The 8×8 quadrant is all represented by zeros. This 8×8 quadrant may be referred to as a sparsified area. A sparsified area is an area of a grid containing zeroes that are not encoded in the stream but are known to be zeroes by default. Zeroes outside the sparsified areas are decoded from node symbols in the same fashion as non-zeroes.

Each branch of the tree may be simulated and each leaf is populated with a zero in turn. However, the linear steps are not essential and the process may intelligently identify that all leaves are zero and map the zeros to the grid accordingly, in one step. The same process is followed for all siblings for the root as indicated by the original root node symbol. The grid is now completed with the final two 8×8 quadrants being mapped with the zero values from the tree.

Once the process is terminated and all the simulations are made, the decoding process has effectively reconstructed a dense counterpart of the sparse tree received. That is, a tree where every node above Root Layer of the original n-Tree has n children and every Layer is dense.

Figure 13:
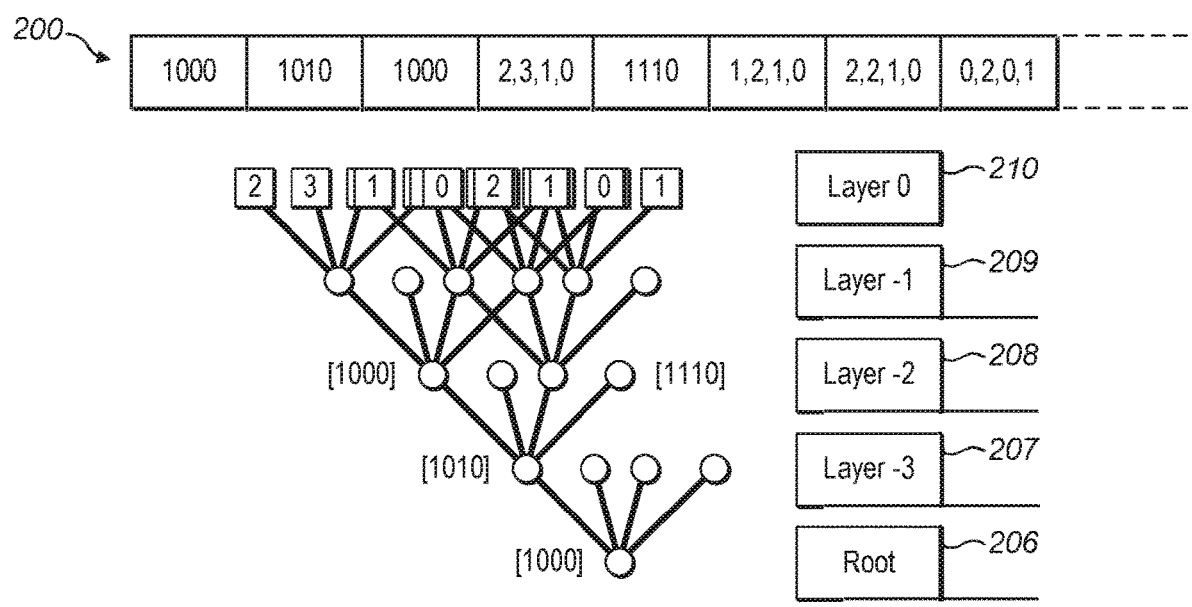
FIG. 13 illustrates a logical representation of a bytestream and summary of processing an ordered tree according to an embodiment of the present invention.

FIG. 13 illustrates a summary and it is recalled that FIG. 1 is the recreated array. 16 leaves are shown with corresponding T-node symbols. 16 symbols (or Labels) have been received in the bytestream. 240 zeros have been encoded "implicitly" as the T-node symbols for the nodes and the decoding and de-sparsification process resulted in an indication that the areas were sparsified. In the received tree derived from the bytestream, there are 7 nodes without descendant nodes. Children of these nodes are optionally simulated in the process to derive a dense tree. The tree is mapped to the grid where the 16 non-zero values are located accurately in the 2D array, while the sparse areas of zeros are placed within the grid without the data being sent in the byte stream.

By using the tree structure, the node symbols (which tell the process which branch will have children and which will have no children) and the depth traversal order, the process can reconstruct a fully sparsified grid by sending only a small set of information. As indicated above, the performance of the decoder is improved as it can be made more efficient. The process maps a constructed tree onto a grid. The grid may contain a sparsified area, that is, an area of a grid containing zeroes that are not encoded in the stream but are known to be zeroes by default. Zeroes outside the Sparsified Areas are decoded from node symbols in the same fashion as non-zeroes.

Figure 14:
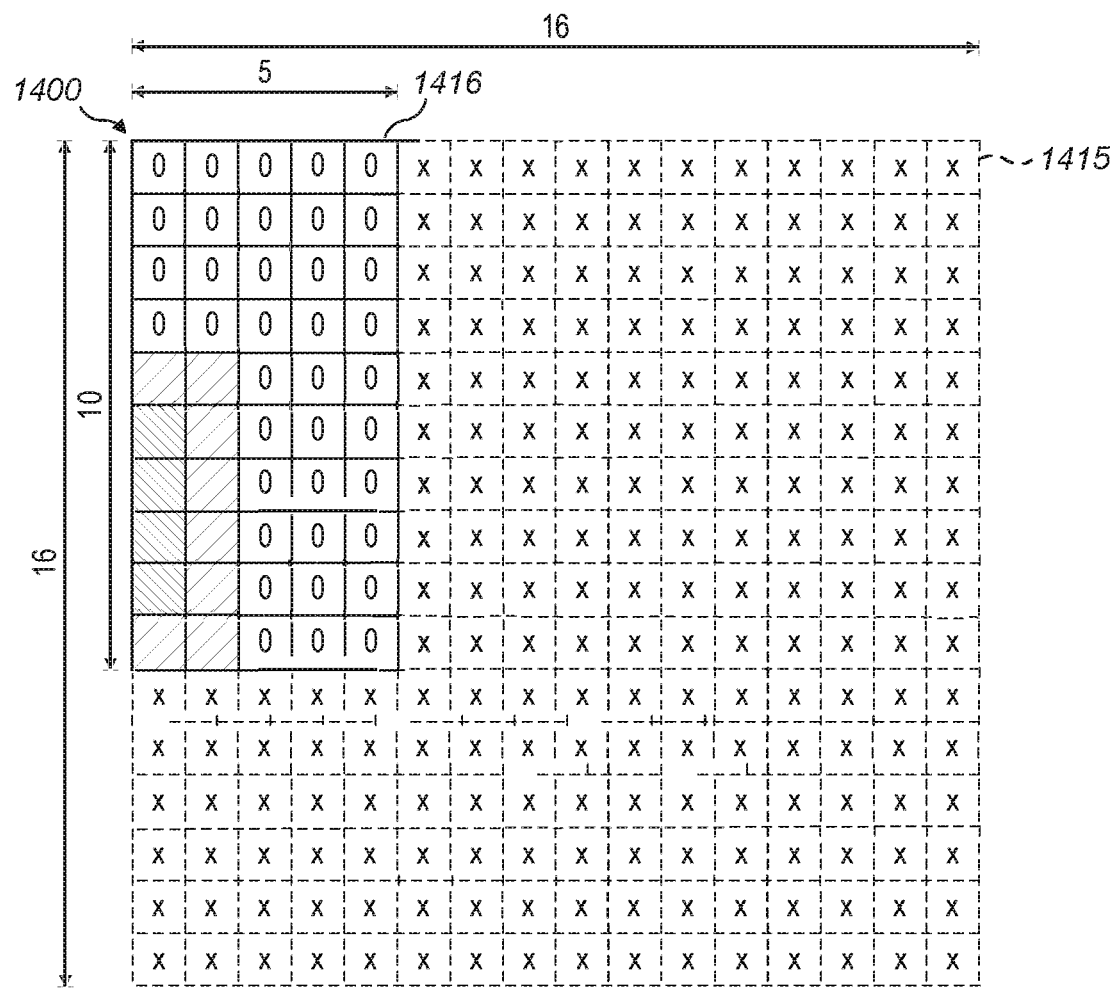
FIG. 14 illustrates a rectangular 2D grid with an inactive region.

The above example considers a square grid, in particular a 16×16 grid where there are 5 layers of the tree and therefore 256 nodes. In the case of a rectangular grid 1400 with a 16 by 16 square grid shown dotted, as illustrated in FIG. 14, there may be masked bits which indicate that sections of the tree are irrelevant and not considered. The tree is still ordered but may no longer be a full quadtree as part of the tree may not be completed. The signalled part of the tree is considered the active volume. If there are 0 or 4 children then the tree may be full, optionally the tree may not be full. If the signalled part of the tree was an annulus and the decoder was set up for decoding annular videos (e.g. from a spaceship that couldn't see anything in the direction of the sun) then the quadtree would have a particular and anticipatable active volume to determine masking. An implementation of the proposed techniques in a decoder could move the annulus around from frame to frame in line under the control of a pre-determined algorithm. Another example is still a rectangle, but with broken pixels in the camera, which is a very common problem. In a further example there may be areas of useless pixels after a period of degradation.

The example of FIG. 14 shows an active volume 1416 of 5×10 contained within a grid of 16×16. The masked portion of the grid 1415 is signalled with an 'x'. The size of the active volume may be signalled using metadata in the bytestream. The decoder will ignore any part of a node symbol that corresponds to a block which is outside the signalled active volume. Therefore those bits of the node symbols can be any value and are typically chosen by the decoder to optimise entropy. Optionally, the bits of the node symbol may not be transmitted. For example, in FIG. 14, the top right 8×8 block and bottom right 8×8 block are both outside the active volume. Therefore, the first node symbol of the bytestream (to be associated with the root of the tree) would be 1×1×. That is the second and fourth bits of the node symbol can be any value. When building the tree, the decoder will ignore the second and fourth bits as it knows they exist outside of the active volume it has been told separately. When encountering a masked bit or a bit of the node symbol that corresponds to an non-signalled or masked area, the processing of the tree will terminate for that branch, i.e. the traversal will terminate for that branch and carry on to the next node in the order.

It has been described above how the node symbols may signify sections of an array which are sparse or contain a common predetermined value. Optionally, in order to improve the encoding of previous or subsequent encoding stages, it is also considered possible for the common or predetermined values to be explicitly signalled as data symbols with a corresponding positive flag being set in the node symbol. That is, despite the area being sparse, the values may still be explicitly signalled in the bytestream with the node symbol being set accordingly in the bytestream (and tree) for the decoder to properly decode and spatially locate that value. Such selective sparsification may provide benefits where the sparse, or common, value is a cheap value to signify or where such artificial modification of the data stream may provide for improved entropy encoding in a subsequent entropy encoding stage in the encoding chain. The selective sparsification may be set automatically by analysing a predicted bytestream, machine learning, statistical analysis, or through iterative trial and error. The above description gave an example of how a sparse tree of the invention can be used in the compress of a two dimensional grid however it was also mentioned that the invention could also be applicable to the compression of a linear grid or one dimensional array, below. The examples given are of one or two dimensions. In fact, the techniques can be applied to any numbers of dimensions and with n-Trees that are not 4-Trees. For example, using a 3D variant of Morton Order combined with an octree instead of a quadtree would allow volumetric imaging. As another example, one may show one dimensional de-sparsification with quadrees but much the same could be done with binary trees i.e. 2-trees.

Figure 15:
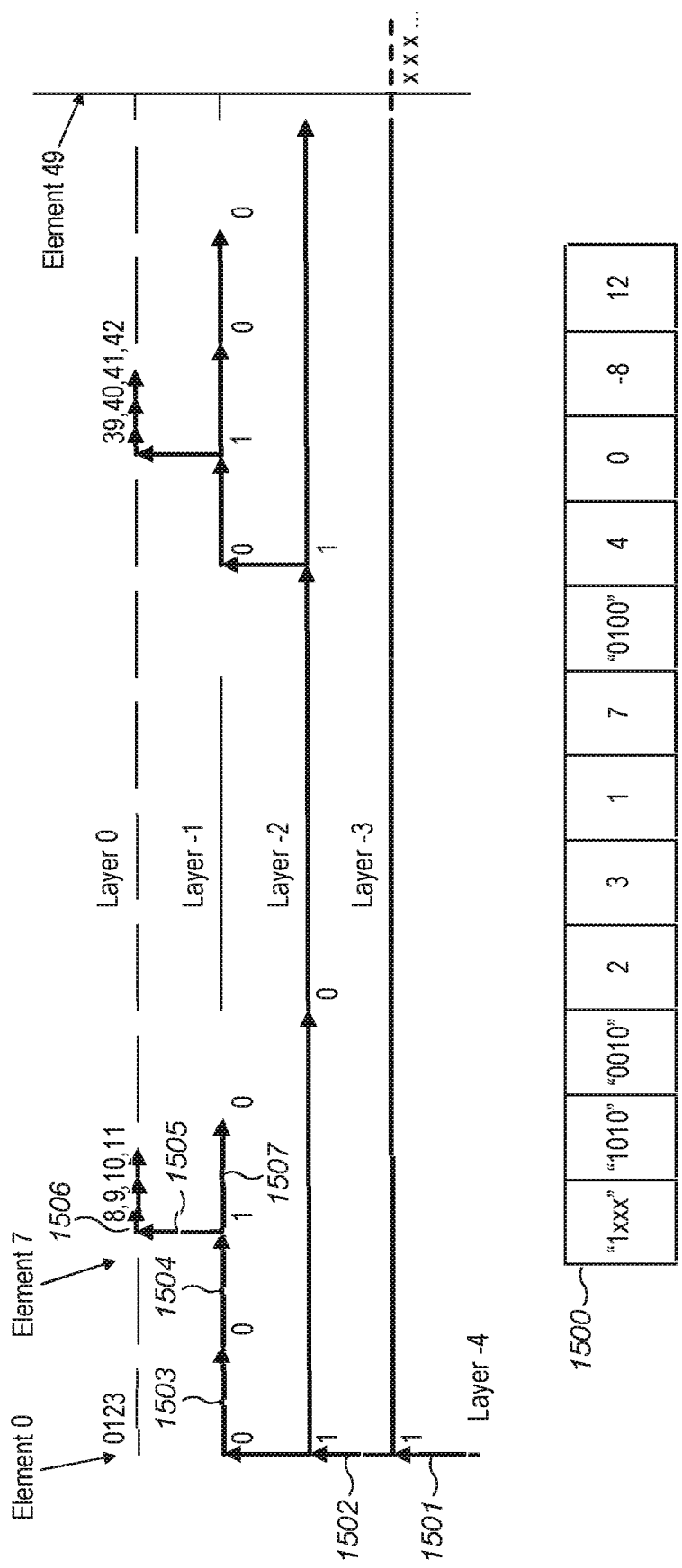
FIG. 15 illustrates a logical representation of a bytestream and a schematic flow of processing according to an embodiment of the present invention.

An example 1 D array to be decoded has 50 elements, numbered from 0. This dimension information is assumed to be given in advance. It is known in advance that the default value of every element that is not explicitly decoded by the end of the algorithm is 0. The number of elements being explicitly decoded is not known in advance, except that it is guaranteed to be at least 1. Explicitly decoded elements may be non-zero or 0. It is known in advance that the description of the data has five Layers, as shown in FIG. 15. The values in the symbols retrieved indicate how to navigate the layers of the tree. By following the annotations 0, 1 or x on the Figure, one is led to those elements in Layer 0 that are to be explicitly decoded. The meaning of these choices is:

1 means "Jump to the first node in a +1 deeper Layer" (deeper means in the direction of Layer 0)

0 means "Continue to next arrowhead in current Layer. If there is no further arrowhead, backtrack to −1 shallower Layer."

x means "Don't care if 0 or 1, but carry out the 1 actions"

Some digits of the-node symbols in FIG. 15 have been masked with an "x". This is connected with (4, 3) being smaller than (16, 16). Masked digits indicate that the corresponding child itself is inactive and automatically has zero children. The values of these masked digits play no role in decoding and can be optimized by an encoder to minimize entropy. So, starting from the root or Layer-4 and following the logical bytestream 1500, the first symbol is a 1 which means jump to the first node in the deeper layer (step 1501). The next symbol is retrieved. Here, the first bit is a 1 and so we jump to the first node in the deeper layer (step 1502). The next symbol is retrieved. The first bit is a 0 and so we continue along the same layer (step 1503). Since we are in the Layer which indicates the data values, the first four elements of the 1 D array are not explicitly signalled and are assumed to be of a predetermined value.

Again, a 0 is read next so we continue along the same layer (step 1504). The next bit is a 1 which indicates we should move to the deeper layer (step 1505). We have now reached the Layer in which we should retrieve data values. The data values are retrieved and placed at this location in the tree (step 1506). Following the traversal order we then ascend the tree once more and read the last bit of the symbol which in this case is 0 and so we continue (step 1507). Since we have reached the end of the symbol, we ascend the tree once more following the traversal order and continue the process.

Figure 16:
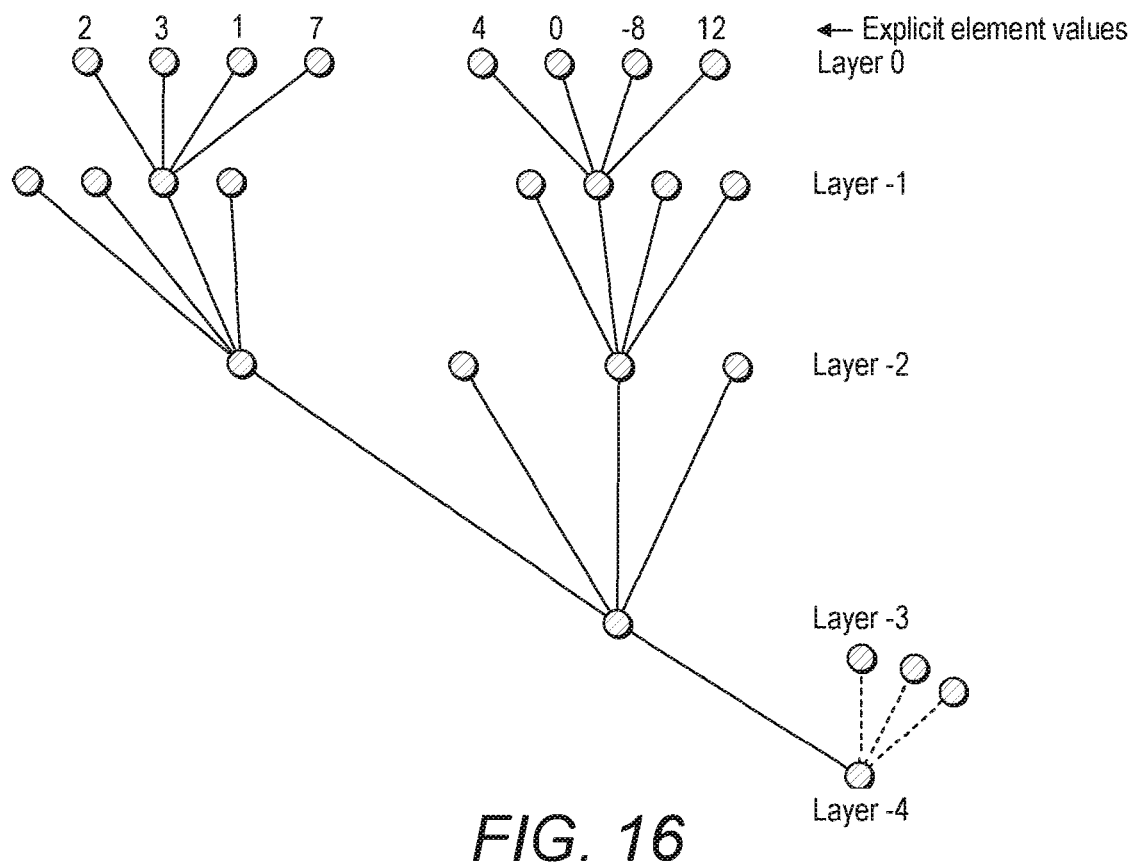
FIG. 16 illustrates an ordered tree after the processing illustrated in FIG. 15.

Once the bytestream has been followed, a tree as shown in FIG. 16 has been populated. The tree is an ordered 4-Tree, so Sibling nodes are ordered (in this figure the order is left to right) and only nodes in Layer 0 may have a Label. The Top Layer includes the explicit element values signalled in the bytestream. The three right hand nodes in Layer-3 are inactive because array length of 50 elements is less than 65. The annotation of x in the Layer-3 symbol indicates that the value of this bit is irrelevant and could be any value because it is ignored. The process is only concerned with the first 50 symbols as we know this is the length of the array. Even if all 50 elements were explicit these nodes would remain childless. This example explicitly codes elements in positions 8, 9, 10, 11 of the 1 D array, for example. The explicit elements have explicit values 2, 3, 1, 7 and 4, 0, 8, 12 respectively, as shown by the Labels on the relevant nodes.

The decoding order commences with three node symbols, followed by 4 data values, followed by another node symbol. It is not known whether the following symbol will be a node symbol or a data symbol or value until the previous node symbols have been decoded.

In general, the process of encoding the bytestream substantially mirrors the process of decoding. That is, the encoding process analyses an array, builds an ordered tree and maps the values of the array to that ordered tree. The encoding process outputs a set of interspersed node symbols and data symbols where the node symbols signify the location of the data symbols in the array and implicitly signal sparse areas of the array. During the process, a node symbol is generated and associated with a node of the tree which signifies whether there are positive values present in ever decreasing quadrants of the grid. Following a predetermined order, the encoder analyses the ever decreasing quadrants until it reaches the values present in the grid which are then output.

The following provides a short summary of an exemplary encoding technique. As with the decoding techniques above, the encoding techniques could be applied to any dimensioned data but for simplicity we will refer to a 16×16 grid, as illustrated in FIG. 1.

First, the encoder assumes that at least one non-zero value exists in the information to be encoded. If the grid is entirely sparse, it may be signalled separately to achieve compression gains. Again where we refer to non-zero this may be any consistent value.

The encoder begins by building a root of the ordered quad-tree. Once again, the quadtree is used here but any tree may be utilised as appropriate. Since we are using a quadtree, the encoder knows there will be four children.

The encoder then analyses each quadrant of the grid to identify if the quadrants are sparse. In the example of FIG. 1, the top-left quadrant contains values but all others are sparse. The encoder can thus identify that the node symbol for the root node will be [1, 0, 0, 0] signifying that three quadrants are sparse and one contains values.

It will be recalled that preferably a Morton order is used for the process. Thus the quadrants are mapped to the node symbol according to that order. The Morton order continues and analyses the top-left quadrant into four sub-quadrants.

Figure 2B:
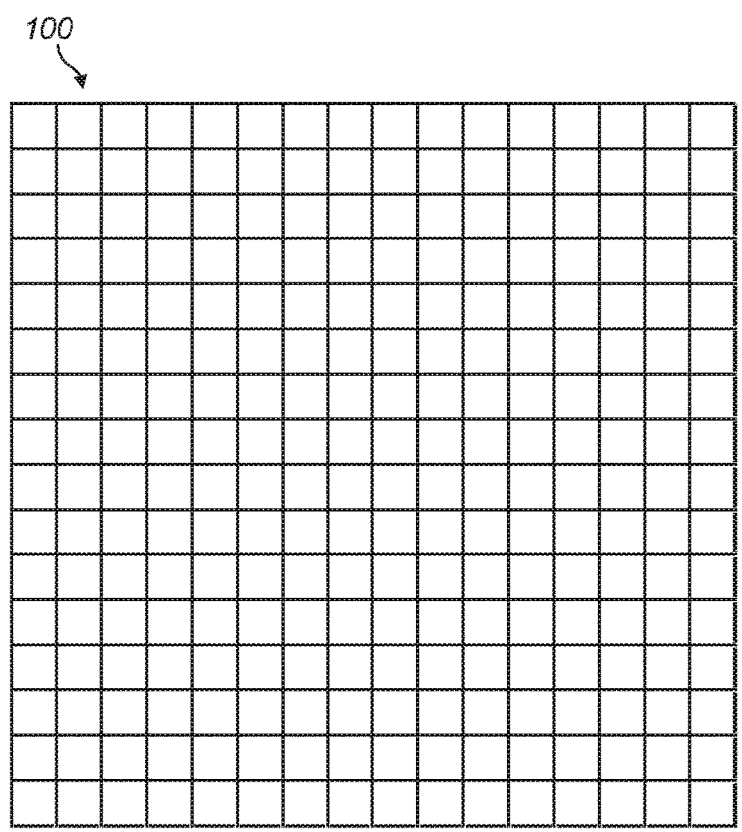

Optionally, the encoder can build the entire tree before inserting the symbols into the bytestream or can look at the entire grid and insert a symbol into the bytestream for the layer. For this example, the encoder will insert each symbol into the bytestream progressively, that is, as it goes along. Thus, the encoder sends the node symbol [1, 0, 0, 0] to the bytestream and associates the node symbol with the root of the tree. This is illustrated schematically in FIG. 2, where the tree is beginning to be built and the first symbol 204 has been inserted into the bytestream.

From the above it will be understood that each of the four sub-quadrants corresponds to a node in the next layer. This is of course following the Morton order. Accordingly the root of the tree corresponds to the 16×16 grid with each element of the node symbol associated with the root corresponding to four 8×8 quadrants. The next layer, layer-3, corresponds to the four 8×8 quadrants and each node symbol associated with the four nodes of Layer-3 corresponds to four 4×4 quadrants. The next layer, layer-2, corresponds to the sixteen 4×4 quadrants and each node symbol associated with a node in Layer-1 corresponds to four 2×2 blocks, etc. However, as we explained previously, there is no node symbol signalled for Layer-1 and thus it can be assumed this this node symbol does not exist. Indeed it is not a node symbol since a node symbol shall have a grandchild. Thus, although Layer-1 corresponds to a 2×2 block, it does not have an associated node symbol. Both the encoder and decoder know not to expect or signal this Layer.

Figure 6:
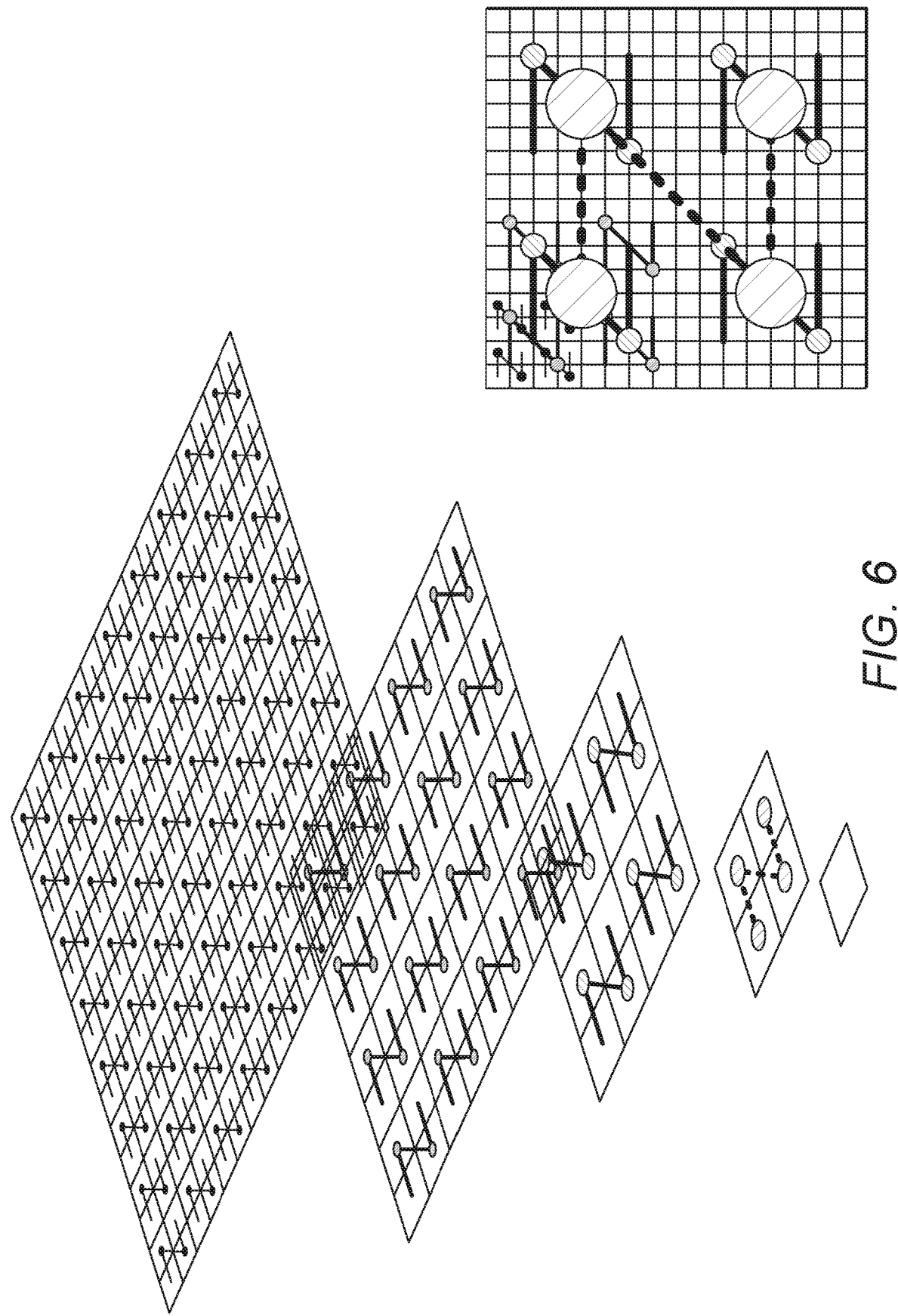

The levels of abstraction of the quadrants will be understood with reference to FIG. 6.

Thus, returning to FIG. 1 and since the node symbol associated with the root indicated that there were values in the top-left quadrant, following the depth-first pre-order traversal the 8×8 quadrant is further analysed. It can be seen that the top-left 8×8 quadrant of the grid contains values in the top-left and bottom-left 4×4 sub-quadrants only. Following the Morton order, a 0 can be placed where there is no value and 1 placed where there is a value. Thus the node symbol for this node of the tree is [1010] Following the depth-first pre-order traversal, the node symbol is associated with the first node from the root in Layer-3, as shown in the illustrated tree of FIG. 3a.

Continuing with the depth-first pre-order traversal, since there are values in the top-left 4×4 quadrant and the node symbol indicates this with a 1, the traversal continues to look at the sub-quadrants of the top-left 4×4 quadrant.

Returning to FIG. 1, it can be seen that in these four 2×2 blocks, there exists values in only the top-left block. Thus, the node symbol will be for this quadrant following the Morton order. For simplicity we refer to 2×2 quadrants as blocks and larger squares as quadrants to indicate a difference. The terms blocks and quadrants can be used interchangeably but we use the term block to signify a 2×2 quadrant as the 2×2 block contains the data symbols.

The encoder has now reached the data level (since it knows it will signal all four data values in this level of abstraction and in effect skips Layer-1) and accordingly encodes the symbols in the grid according to the predetermined order. In effect, the tree traversal assumes the values for the visited node in the penultimate layer. Thus the symbols {2, 3, 1, 0} are encoded and the tree structure will look as shown in FIG. 5a. The symbols are each mapped to the locations in the final layer of the tree. It is noted that although the last value of the 2×2 block is a zero and could be considered to contribute to sparsity, in the example implementation all values of the final layer are encoded and mapped.

Continuing with the tree traversal, the encoding process returns back to the previous layer. Here there were no values in the next quadrant and so nothing is encoded. This is signified by the 0 in the node symbol associated with that node. The traversal continues until a next positive indication is found in the node symbols. It will be recalled that there were values found in the bottom-left 4×4 quadrant corresponding to Layer-2. The four 2×2 blocks of this quadrant are now analysed. Three blocks include values and one does not. According to the predetermined ordering, the node symbol is accordingly [1, 1, 1, 0] which is associated with the visited node in Layer-2.

By now, the next steps can be understood. Following the traversal process, the data symbols of each 2×2 block are encoded sequentially. The corresponding logical representation of the bytestream 200 is shown in FIG. 13 together with the tree which has been built at this stage. At this stage all the values in the grid have been encoded and the process ends.

In implementation, it may be understood that the tree itself may vanish as soon as it is drawn, that is, the history is lost. The process of signalling the data symbols within the tree structure allows this efficient usage of memory.

It has been described above how a bytestream may be constructed and decoded to incorporate a set of interspersed node symbols and data symbols. Once the symbols have been output they may be subsequently entropy encoded. The encoded stream may be entropy decoded before the set of symbols are processed. For example, the symbols may be divided into codes which are then encoded using a Huffman encoding and decoding operation. Alternatively, the stream of symbols may be encoded and decided using an arithmetic coding operation, such as a range encoding and decoding operation. These and other similar entropy coding techniques are well known in the art.

Entropy coding is a type of lossless coding to compress digital data by representing frequently occurring patterns with few bits and rarely occurring patterns with many bits. In broad terms, entropy coding techniques take an input codeword and output a variable-length codeword using the probability of the input codeword occurring in the data set. Therefore, the most common symbols use the shortest codes. The probability information is typically stored in metadata used by the decoder to recreate the input information from the output codeword.

The following describes an improved and innovative technique for entropy coding a bytestream. Immediately above we described how the process of decoding, once performed can then be applied to a process of de-sparsification to identify sparse areas of an array and accurately locate values in the array. The described operation couples the de-sparsification and decoding steps together.

Figure 17:
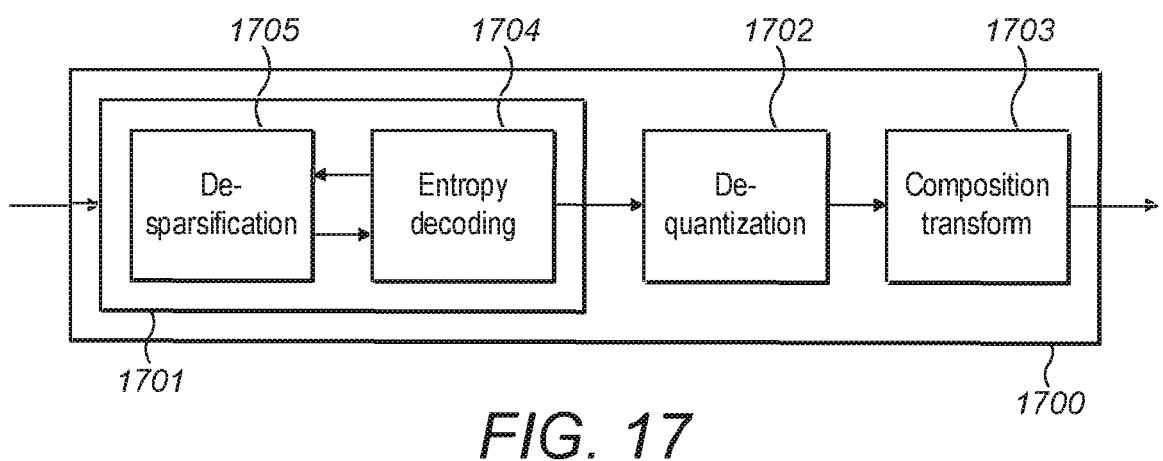
FIG. 17 illustrates an overview of coupled de-sparsification and decoding modules.

A high level overview 1700 is shown in FIG. 17. After the bytestream is decoded in a decoding operation 1701, an output plane of data undergoes a de-quantisation 1702 stage and a composition transform 1703 stage. The composition transform stage 1703 and de-quantisation stage 1702 are known in the art. For example the composition transform stage 1703 may include a directional transform of a plane as described in WO2013/171173 or a wavelet or discrete cosine transform.

It is described herein that the decoding operation 1701 may include two stages, that is, an entropy decoding stage 1704 and a de-sparsification stage 1705. The stages of the decoder are coupled together and are interrelated so as to efficiently identify the compressed information. The entropy decoding stage acts to decode a symbol from a stream of data. The de-sparsification stage acts to analyse the symbol and inform the entropy decoder what type of symbol is next to be decoded.

In preferred embodiments, the de-sparsification stage or module 1705 builds a tree as described above in the context of FIGS. 1 to 16. The de-sparsification stage receives a symbol from the entropy decoder and builds the tree. The de-sparsification stage then, from the process of building the tree informs the entropy decoder what type of symbol to expect next, i.e. a node symbol or a data symbol. By analysing the node symbols in the manner described, the de-sparsification stage can identify that the next symbol will be a node symbol or a data symbol by following the tree traversal and identifying that no data symbol is expected for a branch of the tree where the node symbol includes a flag indicating as such.

The terms de-sparsification stage, de-sparification module and de-sparsifier may be used interchangeable throughout the present description to refer to the functionality of the module. Similarly, the terms entropy decoding stage, entropy decoding module and entropy decoder may be used interchangeably to refer to the functionality of that module. It will of course be understood that the functionality may be provided by a combined module or multiple sub-modules.

At the entropy decoding stage, the module has access to multiple sets of metadata used to decode different types of symbols using the entropy decoding operation. First, the entropy decoding stage will first decode a symbol using a first set of metadata. The entropy decoding stage will then send that symbol to the de-sparsification stage. The entropy decoding stage will then wait to receive an indication of the type of symbol that is to be expected next. Based on the received indication, the entropy decoding stage will use a respective set of metadata according to the type of symbol expected in order to decode the next symbol using entropy decoding. In this way, different metadata can be used to decode a data set even when the data within the data set does not follow a predetermined pattern and the different symbol types are irregularly interspersed within the original data to be encoded or reconstructed.

It will of course be understood that instead of using one entropy encoder and multiple sets of metadata the system may instead utilise multiple entropy encoder modules for each type of symbol to be decoded. For example, the de-sparsification module may instruct a different module to perform an entropy decoding operation based on the type of symbol it expects next in the dataset.

Figure 18:
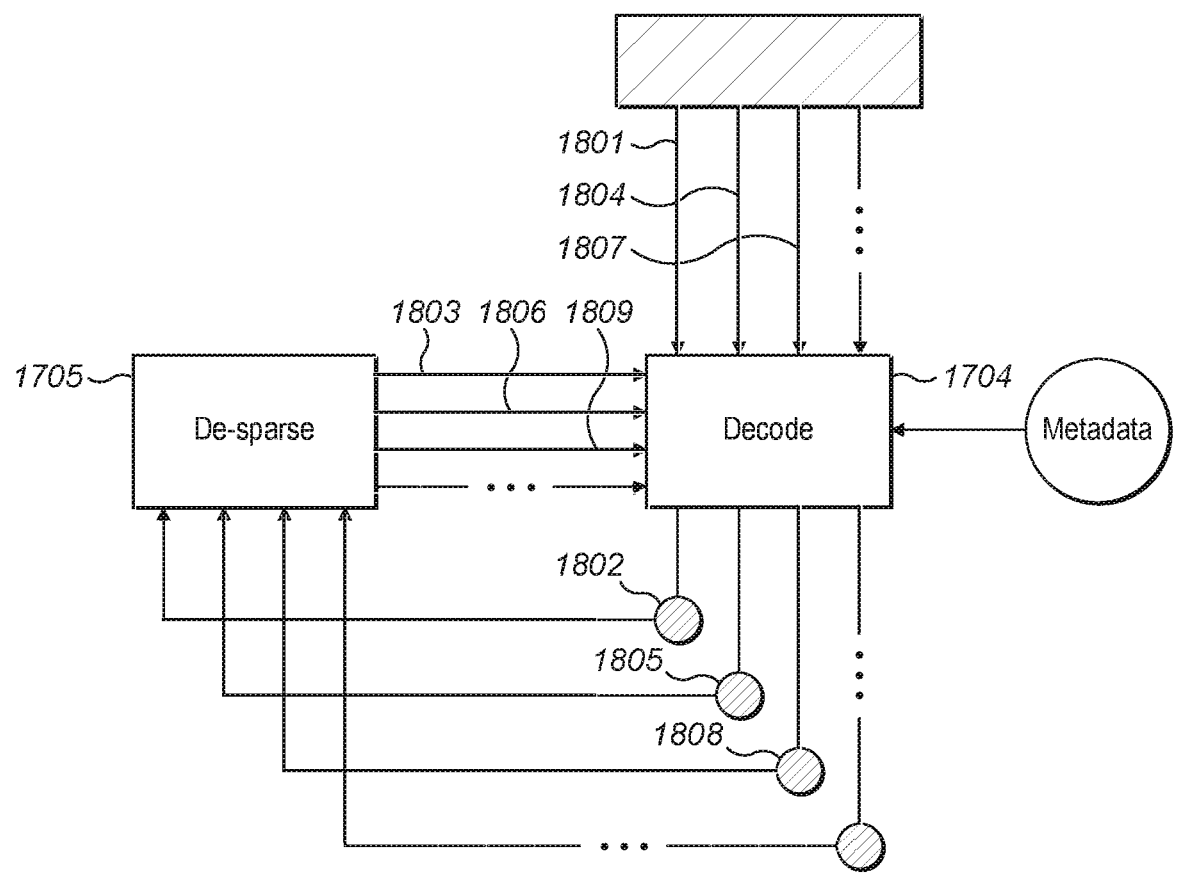
FIG. 18 illustrates an overview of coupled de-sparsification and decoding steps; and, FIG. 19 illustrates a range decoder schematically.

The process will now be described in detail in the context of FIG. 18. We start by assuming that the first symbol in the stream is of a first type. In the preferred example implementation it will be recalled from above the first type is a node symbol. In the implementation it is not relevant if the de-sparsification stage 1805 instructs the entropy decoding stage 1804 that the first symbol is of a first type of the entropy decoder inherently has a degree of intelligence or predetermination to identify the first expected type. The entropy decoding stage will retrieve metadata from a store of metadata corresponding to the first symbol type. The metadata may include decoding parameters for example and may include an indication of probability. For example if the decoding operation is a range decoder, the metadata may include a probability distribution or cumulative distribution function. The operation of a range decoder in the context of the present disclosure will be described below in the context of FIG. 19.

After identifying the first symbol (step 1801), this is passed to the de-sparsification stage (step 1802). The first symbol is used by the de-sparsification stage to determine a type of symbol expected later in the stream.

In preferred implementations, the de-sparsification stage follows the process described above. That is, the de-sparsification stage assigns the received symbol to the root of a tree and analyses the bits of the symbol to traverse the tree. For example, if the symbol is as in the described example of FIG. 2a, then the tree is traversed and the de-sparsification stage will identify that the next symbol is to be a node symbol.

The de-sparsification stage returns to the entropy decoding stage the type of symbol to be expected next (step 1803). Based on this information, the entropy decoding stage is able to decode the next symbol from the data stream according to the metadata for the received type of symbol.

Following the example described above, the next symbol will be a node symbol and the entropy decoding stage, if a range decoder, can utilise the cumulative distribution function used for the previous node symbol (step 1804). Again, this is passed to the de-sparsification stage (step 1805). Following the example, the next symbol will be a node symbol which is entropy decoded using the same cumulative distribution function. Here, we have reached the stage of FIG. 4a. The tree has been built with three visited nodes. Following the example, the de-sparsification stage assumes the next Layer is not sent in the bytestream and now expects a data symbol.

The de-sparsification stage accordingly now signals to the entropy decoding module that the expected symbol is of a different, second, type (steps 1806). The entropy coding stage thus retrieves metadata for the second type of symbol. Again, if the entropy coding operation is a range coding operation then the store of metadata will include a second, respective, cumulative distribution function. The entropy coding operation thus retrieves the next symbol from the stream using this second set of parameters, i.e. this second cumulative distribution function (steps 1807, 1808).

Returning to the example of FIG. 5a, the next three symbols will of course be data symbols as in the example process all four sibling data symbols for a block are explicitly signalled. Thus, the de-sparsification stage will signal to the entropy decoding stage than the next three symbols are of the second type (step 1809). Of course as indicated above, there may be a degree of intelligence or predetermined expectation coded into the entropy decoding stage or module. For example, when it knows a data symbol is to be retrieved it may know to retrieve four. Depending on implementation, the entropy decoding stage may of course wait for an indication of the symbol type each time it tried to identify a symbol from the stream.

In the example, the process will continue according to the traversal of the tree. That is, in the example of FIGS. 7a to 12a, the next symbol expected will be a node symbol and the de-sparsification stage will instruct the decoder to use the first set of parameters or metadata to identify the next symbol.

Now that the process has been understood, it is recalled that rather than the entropy decoding stage switching between sets of metadata, there may instead be multiple entropy decoding modules, each using one set of metadata and each retrieving a symbol from the stream of interspersed symbols of different types according to which type of symbol is to be expected next.

Figure 19:
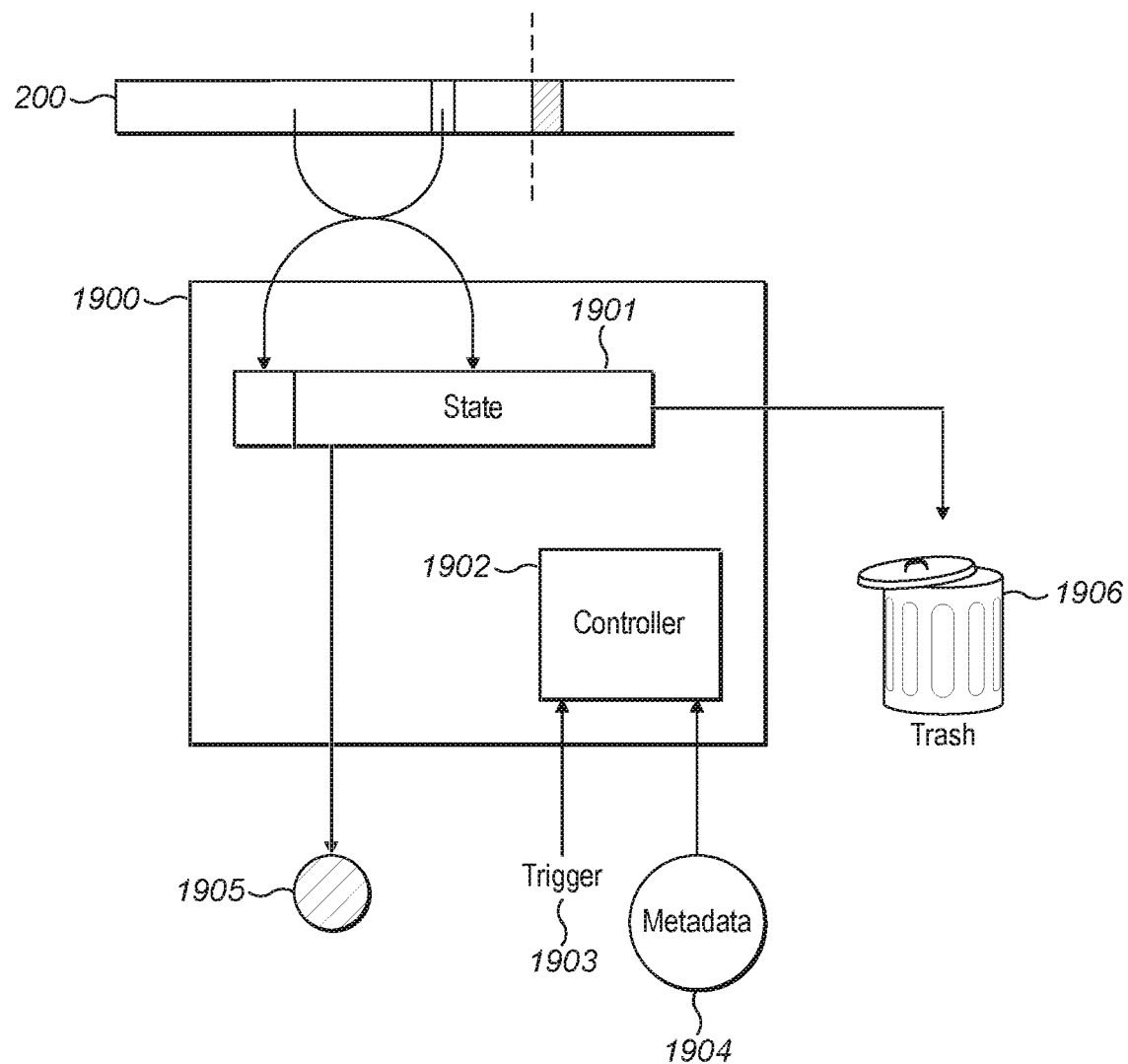

It was described above that the entropy decoding stage may be any type of entropy decoding module. For example, the entropy decoding module may be a Huffman decoding module where the symbols in the stream are of a fixed length. Preferably however the entropy decoder is a range decoder, the operation of which will now be described in the context of FIG. 19. If multiple decoding modules are used, the first type of symbols may be decoded using a first type of entropy decoder and the second type of symbols may be decoded using a second type. For example, the fixed length nodes symbols may be decoded using a Huffman decoder and the data symbols may be decoded using an arithmetic decoder, which may be beneficial if the types of symbol are of differing lengths or is one type lends itself to a fixed length operation and the other to a variable length operation. FIG. 19 illustrates a range decoding module for implementation in the present system which may perform incremental decoding. FIG. 19 illustrates a sequence 200 of bits. The range decoder 1900 takes a portion of this sequence and updates an internal state register 1901.

To begin the decoding process, the decoder must have enough information to decode the first symbol unambiguously. The decoder controller will retrieve a first set of metadata from a store of metadata 1904, the metadata including a first cumulative distribution function. From the metadata, the range decoder can identify the smaller number of bits it needs from the stream to identify the node symbol with unambiguous probability, shown with a dotted line here in the sequence 200.

The range decoder sequentially analyses increasingly larger portions of the stream until it can be confident of the probability of the symbol that has been encoded. That is, the decoder compares the increasingly larger portions of data to the cumulative distribution function by narrowing the possible symbol with every portion of data analysed. Once the symbol has unambiguously been identified, the symbol is output 1905.

The controller 1902 of the range decoder will now wait until it receives a trigger 1903 to decode the next symbol. The trigger 1903 will include the type of symbol to be decoded. From this information, the decoder will retrieve the respective metadata from the metadata store 1904 which will include a cumulative distribution function for the symbol to be retrieved next.

From the cumulative distribution function, the decoder will identify if it should update its state (or tag) and either read in more bits from the sequence 200 or shift out bits 1906 (i.e. or otherwise discard bits into trash). For example, the decoder will identify if the most significant bit of the state (or tag value) is the same or different between the upper and lower limits of the possible values and whether the amount of bits it holds in its state is sufficient to identify the smallest or most infrequent value in the distribution function. If the most significant bit is the same between the upper and lower limits of the potential symbols, that most significant bit can be discarded.

Schematically, the image of FIG. 19 shows how the state may show that the data in the stream may be retrieved from a later part of the encoded data stream and that the next identified symbol may not be the initial bits of the data stream but may be retrieved from a latter part of the data stream. Such eventuality is well known to the skilled addressee who will be familiar with range encoding techniques. FIG. 19 merely attempts to demonstrate that the range decoding technique incrementally reads a sequence of bits and from that sequence identifies a symbol based on a probability function, preferably a cumulative distribution function. The symbols may not be included within the sequence of bits in a strictly sequential manner.

While we have not described the functionality of a range decoder for brevity, we believe it is well known in the art. However, the functionality of the system is clear. The range decoder of the present disclosure is configured to use a respective cumulative distribution function according to a type of symbol expected next in the bytestream, where the bytestream includes a plurality of interspersed symbols of different types.

For example, given that the final symbol can be recognized from the previously decoded interspersed symbols, a range decoder may be able to work with just the location of the start of the stream but not the end. It is possible to define the start in terms of an offset from the start of the previous stream. Nevertheless, there are certain implementations of range decoder where reading data from the bytestream stops before the final symbol or symbols are deduced (not deduced at all, or not entirely deduced) and a final series of calculations is performed. In such a case it may be necessary to know where the stream ends, so that the handover to the final calculations can be done at the right stage in decoding. The stream length may accordingly be signalled.

As indicated above, in preferred embodiments the type of symbol to be expected in the data may be determined by mapping the first type of symbols to an ordered tree where the first type of symbols are node symbols as described above. The second type of symbols may be data symbols as described above. In the range encoding example, the data symbols may not be of a fixed width. It will be understood that the process of coupling a de-sparsification algorithm and an entropy decoding algorithm may be applied to other de-sparsification algorithms or alternatively other algorithms comprising interspersed symbols of different types.

The process of encoding the bytestream is substantially mirrored. That is, a sparsification algorithm as described above outputs a symbol to an entropy encoder, optionally together with an indication of the type of symbol being passed. The entropy encoder then encodes that symbol based on parameters or metadata for that type of symbol. The type of symbol may be determined from the symbol itself or based on an explicit signal from the sparsification module. The first type of symbol encoded represents an indication of the symbols expected later in the data set.

It has been described above how a metadata symbol can be sent as part of an encoded data set to signal features of a data structure and data elements of their data structure. An advantageous method of encoding and decoding symbols differently using an advance range decoding technique is also proposed. Different cumulative distributions functions (cdfs, i.e. statistical metadata) can be used for decoding the same type of symbol depending on the subset of data and different metadata or types of metadata can be used for decoding different types of symbol. The following is an innovative technique for encoding and decoding statistical metadata to improve the range decoding of metadata symbols. This concept has particular utility in the system proposed above but is not limited to it. The techniques have utility in any entropy decoding methodology, preferably arithmetic or range decoding methodology.

It is noted that the metadata elements of the above data structure, i.e. the node symbols are of a fixed size. There is also an element of predictability about their expected distribution and clustering inherent to their usage. The technique proposed aims to take advantage of this to reduce the overall size of the data set. Although the symbols may be typically 4-bits long the frequency with which they occur within the stream means that even a relatively small change in size can lead to significant gains across the entirety of the stream. As with the system above, replicability of the process is also an important design consideration to reduce the overall computational burden.

The present invention proposes a multi-stage arithmetic coding technique to encode and decode each node symbol. In a first stage, a histogram of a cumulative distribution function is used to determine which of a group of symbols the node symbol is likely in. From that group, the symbol is chosen based on a second set of statistics. There are numerous implementations of this second set considered but in preferred implementations, the second set is a predetermined simplified set used to quickly and easily determine which of the group is the most probable integer hidden in the desired of the encoded data set. Thus, the 4-bit code can be reduced to fewer bits in the encoded data set by using the principles of known range decoding in a new and applied way. Contrary to contemporary techniques, statistics for all 16 possibilities are not provided or utilised. Further benefits are provided over known fixed entropy encoding techniques when incorporating the techniques into a wider range decoding operation and in the context of the data structures and other aspects described herein.

Depending on the value of the node symbol, only one stage may be needed. This allows the most commonly occurring symbols to be sent using further bits and using further computational steps to decode. From the above description of node symbols it can be intuitively noted that for example the most commonly sent node symbols will be and as elements of the plane to be encoded are likely to be clustered together. Only at transition points in the plane to be encoded will other node symbols be likely. Therefore, the integer allows for the most commonly occurring symbols to be in a group of their own which thus fundamentally reducing the processing speed and compression efficiency.

In summary, a histogram format is proposed which enables a range decoding processor to decode symbols in either 1 or 2 stages. The results of the first stage shall determine if the second stage is applicable.

The following is a full detailed example of an implementation. As of course will be understood, this example is a non-limiting example which illustrates several principles of the invention and the individual specifics of how this implementation can be applied to node symbols of the type described herein is not essential.

The process begins by retrieving the statistics metadata for the node symbols. Here, the statistics metadata is a cumulative distribution function of 7 unnamed and ordered symbols. The cdf could alternatively be a probability distribution function or other format of statistical parameters. The metadata may be stored at the decoder signalled in the bytestream or otherwise signalled by the retrieval of an index or key to which of a set of different metadata should be used for this purpose.

Preferably, the first 6 values are retrieved or signalled, for example in an array or mantissa8[6] array. A 7th or final value of the cdf may be 1.0 and this may not need to be signalled or explicitly retrieved. In this example, the number 7 is specifically chosen to improve the implementation for node symbols. As we shall see below, the selection of symbols into groups is beneficial in this implementation as it provides grouping based on similar characteristics and expected grouping in the plane. However, the number of cdf values may be any amount provided it is fewer than the amount of values to be encoded.

In a preferred implementation, the header of the bytestream signals the join points of the cdf, implemented as a non-decreasing segmented histogram from zero <1.0 with zero and 1.0 of the histogram being implicit and not explicitly signalled the header of the bytestream. Should the groups of integers be dynamically selected, there may need to be more information signalled than the join points as in this implementation.

Using these cdf values, the range decoder will return a first integer from the bytesteam. This integer is not a symbol or value but is instead a group indicator or position value which leads the method toward the next step. This indicator leads the process to a series of groups of indicators which obtain the correct integer to be decoded. Thus this step can be surrounded as the range decoding process, using a table of 7 CDFs shall return the postitive pos where zero <pos <7, of one of the unnamed symbols.

As indicated, the 7 unnamed symbols, that is, the indicators, narrow the choice of node symbol, in decimal, down to a member of a group or set of integers, according to the unnamed symbol's position, pos. In this example, the groups are predetermined and are as follows, in order:

[7, 11, 13, 14]
[1, 2, 4, 8]
[5, 10]
[3, 12]
[6, 9]
[0]

Here, the groupings are pre-selected according to their likely clustering, in use, with the implementation above. In this example, each integer responds a 4-bit unsigned binary member, particularly for use in the example above. For example, 7 represents the node symbol and 11 represents [1011] Accordingly it can be seen that this group comprises all four symbols having 4 positive flags and 1 negative flag. Thus, these groups are likely to have a similar occurrence in a plane (there is a high chance of similar probability in context—that is, one branch of the quadtree is childless. In an alternative implementation, each of these groupings must be chosen dynamically and signalled separately in order to optimise efficiency however in this example the symbol groupings are pre-chosen to minimise signalling and to reduce the size of the bytestream. In sum, in these examples the integers are grouped according to similarity in the tree.

Following this example through, if the value of the group indicator, pos, is retrieved from the range decoder as 4, the integer shall be 6 or 9 in decimal, representing that the node symbol in binary shall be [0110] or [1001]

Next, the decoding process must identify an integer from the group indicator (e.g. 6 or 9 in the above example where the indicator was 4).

If either member of the final pair of the above sets is selected there shall be no need for a second stage, and 0 or 15 should be the final range decoded integer. Thus, where the group indicator indicates a group comprising only one integer, that integer is selected. When the groups are chosen as indicated above, this allows for the common node symbols [1111] to be selected using only one stage and from 6 possible symbols in the encoded data set.

In the example implementation of node symbols described above, is a reserved character and will not occur in the bytestream of these examples. However, 15 shall mean that the node symbol in binary shall be [1111] which is the most likely node symbol where the four flags indicate that there are data elements existing in the data layer for the branch of the ordered tree associated with that node symbol.

Following the example, if the group indicator points to one of the other groups, then there is a second stage. In this second stage, in the example a predetermined cdf may be used and not signalled for computational efficiency however in practice it will of course be understood that a second cdf may be signalled in the bytestream or stand and signalled by index.

In this example, where the group contains 4 integers, the cdf values shall be 0.25, 0.5, 0.75 and 1.0. Where there are 2 integers the cdf values shall be 0.5 and 1.0. Thus, once the group indicator has been identified, the process can utilise the predetermined cdf values for the group identified to return a further symbol from the bytestream. The next integer returned from the bytestream indicates which integer from the set of integers is the final decoded integer.

It will be noted for completeness that the possible integer indicators (pos2, pos3) decoded from the bytestream in this example are zero <pos2<4 where there are four integers in the group and zero <pos3<2 where there are two integers per group.

Accordingly, two symbols need to be decoded from the stream to identify most of the node symbols however to decode [1111] node symbol, i.e. only one symbol needs to be decoded (6). That is, 6 points to group 6 which contains only integer 15 which translates to [1111] in base-2.

For completeness, the following finishes the implementation example to select an integer:

If either member of the first pair of the above sets is selected there shall be a second stage, using CDF values representing 0.25, 0.5, 0.75 and 1.0. In this case, the range decoding process shall return the further position pos2 where zero <pos2<4, in this histogram. The final decoded node symbol shall return s[pos2] where s is the selected set of integers.

If either member of the second pair of the above sets is selected there shall be a second stage, using cdf values representing 0.5 and 1.0. The range decoding process shall return the further position, pos3 where zero <pos3<2, in this histogram. The final decoded node symbol shall be returned as s[pos3] where s is the selected set of integers.

The process of encoding the node symbols and creating the metadata will now be described. It will be noted that the encoding process substantially mirrors the decoding process.

To generate the statistical metadata, that is, here a cumulative distribution function, the process may count how many of each symbol fall within each group and then this total is divided by the total number of symbols. The cumulative distribution function is then the sum of all bins (or group totals) as well as this bin (i.e. group total). Thus, suppose that in the group [7, 11, 13, 14] there are 5 symbols, 1 11 symbol, and 0 13 or 14 symbols. The total probability is thus 6 divided by the total symbols. Here the probability of 14 is the same as the probability of 7 but in reality they are very different. This is K-L divergence. Accordingly, each of the integers in the same group has the same probability even if that probability may not reflect the probability.

The encoding process will receive a symbol to be encoded. A range encoded operator will be performed based on the symbol and the probability in the known manner. If the integer is in a group of multiple integers, a second integer will be encoded into the histogram according to the predetermined probability for the group (i.e. 0.25, 0.5, 0.75, 1, or 0.5, 1.0). The encoder will signal the join points of the histogram generated above in the header to enable the decoder to identify the histogram of the cumulative distribution function. In this example only, the explicit values shall be non-decreasing cumulative probabilities, and shall be less than 1.0.

A cumulative distribution function may be more efficient when compared to a histogram due to the monotone curve nature of the histogram such that each bit also not need to be encoded separately. The join points may be a form of difference encoding, that is the difference from the previous value to decrease the size of the histogram data sent.

In sum, a node symbol array of statistics may be associated with the node symbols of a tessara i.e. data structure of this application. The node symbols may take up to 16 values (being 4-bit codes) and their statistics communicated using seven bits in which the probability of the node symbols is encoded. This is an efficient way of encoding these values which would otherwise be sent un-compressed.

It will be clear to one skilled in the art how techniques described herein may be embodied within a system comprising an encoder and a decoder. At the decoder, the encoded data set may be retrieved from a data store or received from a streaming server. In such a further embodiment, one or more streaming servers) may be connected to a plurality of client devices. At the streaming server, the encoder may receive and encode a video or image stream and deliver the stream (e.g. bytestream or bitstream used interchangeably) to the client devices. Thus the stream can be decoded by a decoder to recreate the information that has been comprised. Any suitable mechanism to deliver the stream may be used, such as unicast or multicast, as would be well-known to the skilled person. Techniques described here may be suitable for the encoding, decoding and reconstruction of any dimension array of data. However, although the techniques are also applicable to linear data, they are most beneficial for image or video reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream or bitstream. Residuals are further defined in the present application, but in general residuals refer to a difference between a value of a reference array and an actual array of data. Thus, the techniques are most suitable for any plane of data.

It should be noted that techniques described in the above examples are agnostic as to the meaning or use of the decoded array. Of course, the data set may be used to reconstruct a larger dataset by combining multiple decoded data. Once recreated the data may represent any information which has been compressed, such as an image or sonogram. As will be understood from the following described examples, encoding and decoding techniques wherein a quantity of data to be compressed and transmitted or stored by way of a scheme involving encoding the data in a hierarchy of data structures from which the original data can be reconstructed are especially suitable for use with the invention.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programed GPU or a specifically designed FPGA may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The following sets out an example in which the techniques described above may have particular utility. There may be provided a method of reconstructing a received set of encoded data, wherein the set of encoded data comprises first and second component sets, the first component set corresponding to a lower image resolution than the second component set, the method comprising: for each of the first and second component sets: decoding the component set so as to obtain a decoded set, the method further comprising: upscaling the decoded first component set so as to increase the corresponding image resolution of the decoded first component set to be equal to the corresponding image resolution of the decoded second component set, and combining the decoded first and second component sets together so as to produce a reconstructed set.

Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes are available. Each resolution level corresponds to a level of quality (LoQ). This is a collective term, associated with a plane as defined elsewhere, that describes all new inputs or received component sets, and the output reconstructed image for a cycle of index-m. The reconstructed image in LoQ zero, for instance, is the output of the final cycle of pyramidal reconstruction.

Pyramidal reconstruction may be a process of reconstructing an inverted pyramid starting from the initial LoQ and using cycles by new residuals to derive higher LoQs up to the maximum quality, quality zero, at LoQ zero. A cycle may be thought of as a step in such pyramidal reconstruction, the step being identified by an index-m. The step typically comprises upsampling data output from a possible previous step, for instance, upscaling the decoded first component set, and takes new residual surfaces decoded from new surfaces, sets, as also defined in this disclosure, as further inputs in order to obtain output data to be upsampled in a possible following step. Where only first and second component set are received, the number of LoQs will be two, and no possible following step is present. However, in embodiments wherein the number of component sets, or LoQs, is three or greater, then the output data may be progressively upsampled in the following steps.

The first component set typically corresponds to the initial LoQ, which may be denoted by LoQ 1-N, where N is the number of LoQs in the plane. The value of N is typically given in a byteset header.

Typically, the upscaling of the decoded first component set comprises applying an upsampler to the output of the decoding procedure for the initial LoQ. In preferred embodiments, this involves bringing the resolution of a reconstructed picture output from the decoding of the initial LoQ component set into conformity with the resolution of the second component set, corresponding to 2-N. Typically, the upscaled output from the lower LoQ component set corresponds to a predicted image at the higher LoQ resolution. Owing to the lower-resolution initial LoQ image and the upsampling process, the predicted image typically corresponds to a smoothed or blurred picture.

Adding to this predicted picture higher-resolution details from the LoQ above provides a combined, reconstructed image set. Advantageously, in embodiments where the received component sets for one or more higher-LoQ component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using prior art techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or LoQ, upscaling that reconstructed set, and combining it with the decoded output of the component set or LoQ above, to produce a new, higher resolution reconstructed picture. It will be understood that this may be performed repeatedly, for progressively higher LoQs, depending on the total number of component sets in the received set.

In typical embodiments, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the LoQ one less than the LoQ in question. A received set of component sets in which the linear size of each corresponding image is double with respect to the image size below may facilitate more simple upscaling operations, for example. In some embodiments, the number of further component sets is two. Thus, in such embodiments, the total number of component sets in the received set is four. This corresponds to the initial LoQ being LoQ-3.

The first component set may correspond to image data, and the second and any further component sets correspond to residual image data. As noted above, the method provides particularly advantageous data rate requirement reductions for a given image size in cases where the lowest LoQ, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial LoQ needs only contain residual data in order to reintroduce the information that may have been lost in down sampling the original image to the lowest LoQ.

There may also provided a method of decoding a data set, the method comprising: de-sparsifying the set, comprising recreating sparse data in one or more parts of the set at which no sparse data was received, and maintaining the locations of received data within the set; and applying an entropy decoding operation to the de-sparsified set; wherein the step of de-sparsifying the set is performed in accordance with the entropy decoding operation.

There may also provided a method of decoding a received data set so as to obtain a decoded set, the method comprising: de-sparsifying the set, comprising recreating sparse data in one or more parts of the set at which no sparse data was received, and maintaining the locations of received data within the set; and applying an entropy decoding operation to the de-sparsified set; wherein the step of de-sparsifying the set is performed in accordance with the entropy decoding operation; de-quantizing the entropy-decoded set; and applying a directional composition transform to the de-quantized set so as to obtain a decoded set.

The method provides a way of obtaining image data, which may be residual data, upon receipt of a set containing data that has been compressed, for example, by way of decomposition, quantization, entropy-encoding, and sparsification, for instance. The sparsification step is particularly advantageous when used in connection with sets for which the original or pre-transmission data was sparse, which may typically correspond to residual image data. A residual may be a difference between elements of a first image and elements of a second image, typically co-located. Such residual image data may typically have a high degree of sparseness. This may be thought of as corresponding to an image wherein areas of detail are sparsely distributed amongst areas in which details are minimal, negligible, or absent. Such sparse data may be described as an array of data wherein the data are organised in at least a two-dimensional structure (e.g. a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byteset at a decoder.

Typically, the entropy-decoding, de-quantizing, and directional composition transform steps are performed in accordance with parameters defined by an encoder or a node from which the received set of encoded data is sent. For each LoQ, or component set, the steps serve to decode image data so as to arrive at a set which may be combined with different LoQs as per the technique disclosed above, while allowing the set for each level to be transmitted in a data-efficient manner.

There may also provided a method of reconstructing a set of encoded data according to the method disclosed above, wherein the decoding of each of the first and second component sets is performed according to the method disclosed above. Thus the advantageous decoding method of the present disclosure may be utilised for each component set or LoQ in a received set of image data and reconstructed accordingly.

Figure 20:
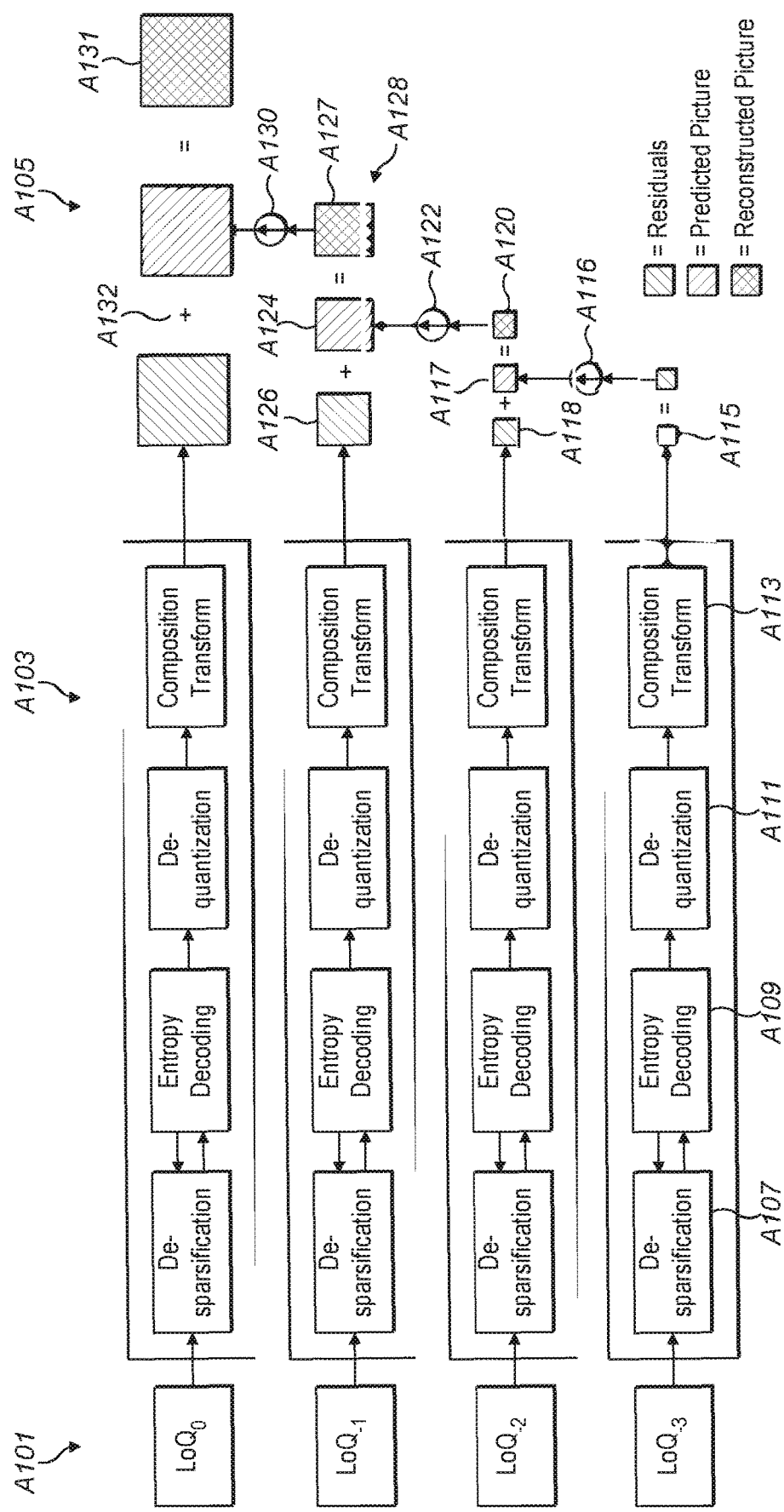
FIG. 20 illustrates a process schematically.

With reference to FIG. 20, an example is now described. A set of encoded data A101 is received, wherein the set comprises four LoQs: from LoQO, the highest resolution or level of quality, to LoQ-3, the initial LoQ. The image data carried in the LoQ-3 component set corresponds to image data, and the other component sets contain residual data for that transmitted image. While each of the levels may output data that can be considered as residuals, the residuals in the initial LoQ level, that is LoQ-3, effectively correspond to the actual reconstructed image. At stage A103 each of the component sets is processed in parallel so as to decode that encoded set.

With reference to the initial LoQ, the following decoding steps are carried out for each component set LoQ-3 to LoQO.

At step A107 the component set is de-sparsified. In this way, the de-sparsification causes a sparse two-dimensional array to be recreated from the encoded byteset received at each LoQ. Zero values grouped at locations within the two-dimensional array which were not received (owing to there being omitted from the transmitted byteset in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step A109 a range decoder, the configured parameters of which correspond to those using which the transmitted data was encoded prior to transmission, is applied to the de-sparsified set at each LoQ in order to substitute the encoded symbols within the array with pixel values. The encoded symbols in the received set are substituted for pixel values in accordance with an approximation of the pixel value distribution for the image. The use of an approximation of the distribution, that is relative frequency of each value across all pixel values in the image, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows between blocks 107 and 109 in the flow diagram.

At step A111, the array of values is de-quantized. This process is again carried out in accordance with the parameters with which the decomposed image was quantized prior to transmission.

Following de-quantization, the set is transformed at step A113 by a composition transform which comprises applying an inverse directional decomposition operation to the de-quantized array. This causes the directional filtering, according to a 2×2 operator comprising average, horizontal, vertical, and diagonal operators, to be reversed, such that the resultant array is image data for LoQ-3 and residual data for LoQ-2 LoQO.

Stage A105 illustrates the several cycles involved in the reconstruction utilising the output of the composition transform for each of the LoQ component sets A101.

A115 indicates the reconstructed image data output from the decoder A103 for the initial LoQ. In the present example, the reconstructed picture A115 has a resolution of 64×64. At A116 this reconstructed picture is upsampled so as to increase its constituent number of pixels by a factor of four, thereby a predicted picture A117 having a resolution of 128×128 is produced. At stage A120 the predicted picture A117 is added to the decoded residuals A118 from the output of the decoder at LoQ-2. The addition of these two 128× 128-size images produces a 128×128-size reconstructed image, containing the smoothed image detail from the initial LoQ enhanced by the higher-resolution detail of the residuals from LoQ-2. This resultant reconstructed picture A119 may be output or displayed if the required output resolution is that corresponding to LoQ-2. In the present example, the reconstructed picture A119 is used for a further cycle.

At step A112 the reconstructed image A119 is upsampled in the same manner as at step A116, so as to produce a 256×256-size predicted picture A124. This is then combined at step A128 with the decoded LoQ-1 output A126, thereby producing a 256×256-size reconstructed picture A127 which is an upscaled version of prediction A119 enhanced with the higher-resolution details of residuals A126. At A130 this process is repeated a final time, and the reconstructed picture A127 is upscaled to a resolution of 512×512, for combination with the LoQO residual at stage A132. Thereby a 512×512 reconstructed picture A131 is obtained.

Figure 21:
FIG. 21 illustrates a bytestream schematically.

FIG. 21 shows a schematic representation of the de-sparsification and decoding process. In row A it is schematically shown a typical set of symbols received via the bytestream when a first type of data symbols is received. The first type may be a non-zero value and the second type may be a zero value. Alternatively, the first type may be a value above a threshold and the second type may be a value below the threshold, and wherein a value equal to the threshold can belong either to the first type or to the second type depending on a chosen implementation. In particular, there are three groups of symbols (also described as metadata symbols) followed by a number of first type of data symbols (typically up to four). In general, there is provided a method of decoding a set of sparse data, the method comprising: obtaining a set of encoded data, said encoded data containing information which, when decoded, would enable reconstruction of the set of sparse data; decoding a first portion of said set of encoded data to obtain a first set of decoded data; and based on the first set of decoded data, determining how to reconstruct a first portion of the set of sparse data. The first set of decoded data may correspond to one or more metadata symbols indicating whether to reconstruct a first portion of the set of sparse data based on a second set of decoded data or based on simulating the first portion of the set of sparse data. If the one or more metadata symbols may indicate that reconstruction of the first portion of the set of sparse data should be based on a second set of decoded data, the method further comprises: decoding a second portion of said set of encoded data to obtain the second set of decoded data; and reconstructing the first portion of the set of sparse data by extracting from the second set of decoded data a first type of data symbols. The steps of decoding and reconstructing comprise: decoding a first sub-portion of said second portion to obtain a first sub-set of decoded data; based on the information associated with the first set of decoded data, determining whether the first sub-set of decoded data contains one or more metadata symbols or a first type of data symbols. In rows B to D, the bracket in dotted lines represents the first set of decoded data, the continuous line represents the second set of decoded data.

With reference to row B, if it is determined that the first sub-set of decoded data (J02) contains one or more metadata symbols, the method further comprises: decoding a second sub-portion of said second portion to obtain a second sub-set of decoded data (J03); and based at least on information associated with the first sub-set of decoded data, determining whether the second sub-set of decoded data contains one or more metadata symbols or a first type of data symbols. If it is determined that the second sub-set of decoded data contains one or more metadata symbols, the method further comprises: decoding a third sub-portion of said second portion to obtain a third sub-set of decoded data (J04-JON); and reconstructing the first portion of the set of sparse data by extracting from the third sub-set of decoded data a first type of data symbols.

With reference to row C, if it is determined that the first sub-set of decoded data (J03) contains one or more metadata symbols, the method further comprises: decoding a second sub-portion of said second portion to obtain a second sub-set of decoded data (J04-JON); and based at least on information associated with the first sub-set of decoded data, determining whether the second sub-set of decoded data contains one or more metadata symbols or a first type of data symbols. If it is determined that the second sub-set of decoded data contains a first type of data symbols, the method further comprises: decoding a second sub-portion of said second portion to obtain a second sub-set of decoded data; and reconstructing the first portion of the set of sparse data by extracting from the second sub-set of decoded data a first type of data symbols.

With reference to row D, if it is determined that the first sub-set of decoded data (J04-JON) contains a first type of data symbols, the method further comprises: reconstructing the first portion of the set of sparse data by extracting from the first sub-set of decoded data a first type of data symbols.

Rows E to H show an example of a bytestream when a second type of data symbols need to be reconstructed by the decoder—or said in another way, it is implicitly sent to the decoder. The Figures shows a series of blocks with dashed border. The dashed border boxes are trying to visualise the block of data that should have been sent to the decoder if the data set was not sparsified as described in the present application, but rather the whole data set, including the sparse part of it, was sent. Nevertheless, from a point of view of the decoder, the dashed boxes are somehow reconstructed via a process called "simulation", in other words their presence is "simulated" for the purpose of decoding and obtaining the second type of data symbols so as to reconstruct the full sparse data set.

In particular, with reference to row E there is provided a method of decoding a set of sparse data, the method comprising: obtaining a set of encoded data, said encoded data containing information which, when decoded, would enable reconstruction of the set of sparse data; decoding a first portion of said set of encoded data to obtain a first set of decoded data (J41, J51, J61, J71); and based on the first set of decoded data, determining how to reconstruct a first portion of the set of sparse data. The first set of decoded data corresponds to one or more metadata symbols indicating whether to reconstruct a first portion of the set of sparse data based on a second set of decoded data or based on simulating the first portion of the set of sparse data. If the one or more metadata symbols indicates that reconstruction of the first portion of the set of sparse data should be based on simulating the first portion of the set of sparse data, the method further comprises: simulating first portion of the set of sparse data by generating a second type of data symbols. With reference to row F, if the one or more metadata symbols indicates that reconstruction of the first portion of the set of sparse data should be based on a second set of decoded data, the method further comprises: decoding a second portion of said set of encoded data to obtain the second set of decoded data (J52), wherein the second set of decoded data corresponds to one or more metadata symbols indicating whether to reconstruct a first portion of the set of sparse data based on a third set of decoded data or based on simulating the first portion of the set of sparse data. If the one or more metadata symbols in the second set of decoded data indicates that reconstruction of the first portion of the set of sparse data should be based on simulating the first portion of the set of sparse data, the method further comprises: simulating first portion of the set of sparse data by generating a second type of data symbols.

With reference to Figure row G, if the one or more metadata symbols indicates that reconstruction of the first portion of the set of sparse data should be based on a second set of decoded data, the method further comprises: decoding a second portion of said set of encoded data to obtain the second set of decoded data (J62), wherein the second set of decoded data corresponds to one or more metadata symbols indicating whether to reconstruct a first portion of the set of sparse data based on a third set of decoded data or based on simulating the first portion of the set of sparse data. If the one or more metadata symbols indicates that reconstruction of the first portion of the set of sparse data should be based on a third set of decoded data, the method further comprises: decoding a third portion of said set of encoded data to obtain the third set of decoded data (J63), wherein the third set of decoded data corresponds to one or more metadata symbols indicating whether to reconstruct a first portion of the set of sparse data based on a fourth set of decoded data or based on simulating the first portion of the set of sparse data. If the one or more metadata symbols in the third set of decoded data indicates that reconstruction of the first portion of the set of sparse data should be based on simulating the first portion of the set of sparse data, the method further comprises: simulating first portion of the set of sparse data by generating a second type of data symbols.

With reference to row H, wherein if the one or more metadata symbols indicates that reconstruction of the first portion of the set of sparse data should be based on a second set of decoded data, the method further comprises: decoding a second portion of said set of encoded data to obtain the second set of decoded data (J72), wherein the second set of decoded data corresponds to one or more metadata symbols indicating whether to reconstruct a first portion of the set of sparse data based on a third set of decoded data or based on simulating the first portion of the set of sparse data. If the one or more metadata symbols indicates that reconstruction of the first portion of the set of sparse data should be based on a third set of decoded data, the method further comprises: decoding a third portion of said set of encoded data to obtain the third set of decoded data (J73), wherein the third set of decoded data corresponds to one or more metadata symbols indicating whether to reconstruct a first portion of the set of sparse data based on a fourth set of decoded data or based on simulating the first portion of the set of sparse data. If the one or more metadata symbols in the third set of decoded data indicates that reconstruction of the first portion of the set of sparse data should be based on a fourth set of decoded data (J74-J7N), the method further comprises: decoding a fourth portion of said set of encoded data to obtain the fourth set of decoded data; reconstructing the first portion of the set of sparse data by extracting from the fourth set of decoded data a first type of data symbols.

Further numbered statements of examples described in this document include the following statements.

B-1. A method of decoding a stream of encoded data, the method comprising:
  receiving an encoded dataset;
  identifying from the dataset an ordered set of node symbols and data symbols, wherein a node symbol is a predetermined number of elements where each element indicates if a subsequent node symbol or data symbol is to be expected in the dataset and a data symbol is a predetermined number of bits which represent an encoded value;
  constructing an ordered tree having a predetermined number of layers from the identified node symbols and data symbols by:
  retrieving a first node symbol from the set;
  associating the first node symbol with a root of the tree and associating each element of the first node symbol with a branch node of the root; and,
  traversing the tree,
  wherein if the associated element for a branch node indicates a subsequent node symbol exists in the set, traversing the tree comprises:
  retrieving a subsequent node symbol from the ordered set;
  associating the subsequent node symbol with the node; and,
  associating each element of the node symbol with a respective branch node for the node; wherein
  if the associated bit for a branch node indicates no subsequent node symbol exists in the set, terminating the traversal for that subtree; and,
  wherein if the node is a leaf in a layer furthest from the root, retrieving a data symbol from the set.

B-2. A method according to statement B.1, further comprising:
simulating the tree after terminating the traversal, where each leaf in the subtree represents a predetermined value.

B-3. A method according to statement B.1 or B.2, wherein the element is a bit.

B-4. A method according to any one of statements B.1 to B.3, further comprising:
mapping the ordered tree to a two-dimensional array.

C.1. A method of reconstructing a received set of encoded data, wherein the set of encoded data comprises first and second component sets, the first component set corresponding to a lower image resolution than the second component set, the method comprising:
  for each of the first and second component sets:
  decoding the component set so as to obtain a decoded set, the method further comprising:
  upscaling the decoded first component set so as to increase the corresponding image resolution of the decoded first component set to be equal to the corresponding image resolution of the decoded second component set, and
  combining the decoded first and second component sets together so as to produce a reconstructed set.

C.2 A method according to statement C.1, wherein the set of encoded data comprises
  one or more further component sets, wherein each of the one or more further component sets corresponds to a higher image resolution than the second component set, and wherein each of the one or more further component sets corresponds to a progressively higher image resolution,
  the method comprising, for each of the one or more further component sets, decoding the component set so as to obtain a decoded set, the method further comprising, for each of the one or more further component sets, in ascending order of corresponding image resolution:
  upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

C.3 A method according to statement C.1 or statement C.2, wherein each of the component sets corresponds to a progressively higher image resolution, wherein each progressively higher image resolution corresponds to a factor-of-four increase in the number of pixels in a corresponding image.

C.4 A method according to any of statements C.1 to C.3, wherein the number of further component sets is two.

C.5 A method according to any of statements C.1 to C.4, wherein the first component set corresponds to image data, and the second and any further component sets correspond to residual image data.

C.6 A method of decoding a data set, the method comprising:
de-sparsifying the set, comprising recreating sparse data in one or more parts of the set at which no sparse data was received, and maintaining the locations of received data within the set; and
applying an entropy decoding operation to the de-sparsified set;
wherein the step of de-sparsifying the set is performed in accordance with the entropy decoding operation.

C.7 A method of decoding a received data set so as to obtain a decoded set, the method
comprising:
decoding the set according to the method of statement C.6;
de-quantizing the entropy-decoded set; and
applying a directional composition transform to the de-quantized set so as to obtain a decoded set.

C.8 A method of reconstructing a set of encoded data according to any of statements C.1 to C.5, wherein the decoding of each of the first and second component sets is performed according to the method of statement C.7.

C.9 A method of decoding a set of sparse data, the method comprising:
obtaining a set of encoded data, said encoded data containing information which, when decoded, would enable reconstruction of the set of sparse data;
decoding a first portion of said set of encoded data to obtain a first set of decoded data; and based on the first set of decoded data, determining how to reconstruct a first portion of the set of sparse data.

C.10 The method of statement C.9, wherein the first set of decoded data corresponds to one or more metadata symbols indicating whether to reconstruct a first portion of the set of sparse data based on a second set of decoded data or based on simulating the first portion of the set of sparse data.

C.11 The method of statement C.10, wherein if the one or more metadata symbols indicates that reconstruction of the first portion of the set of sparse data should be based on a second set of decoded data, the method further comprises:
decoding a second portion of said set of encoded data to obtain the second set of decoded data; and
reconstructing the first portion of the set of sparse data by extracting from the second set of decoded data a first type of data symbols.

C.12 The method of statement C.9 or C.10, wherein if the one or more metadata symbols indicates that reconstruction of the first portion of the set of sparse data should be based on simulating the first portion of the set of sparse data, the method further comprises: simulating first portion of the set of sparse data by generating a second type of data symbols.

C.13 The method of any one of statement C.11 or C.12, wherein the steps of decoding and reconstructing comprise:
decoding a first sub-portion of said second portion to obtain a first sub-set of decoded data; based on the information associated with the first set of decoded data, determining whether the first sub-set of decoded data contains one or more metadata symbols or a first type of data symbols. C.14 The method of statement C.13, wherein if it is determined that the first sub-set of decoded data contains one or more metadata symbols, the method further comprises:
decoding a second sub-portion of said second portion to obtain a second sub-set of decoded data; and
based at least on information associated with the first sub-set of decoded data, determining whether the second sub-set of decoded data contains one or more metadata symbols or a first type of data symbols.

C.15 The method of statement C.14, wherein if it is determined that the second sub-set of decoded data contains one or more metadata symbols, the method further comprises: decoding a third sub-portion of said second portion to obtain a third sub-set of decoded data; and reconstructing the first portion of the set of sparse data by extracting from the third sub-set of decoded data a first type of data symbols.

C.16 The method of statement C.13, wherein if it is determined that the second sub-set of decoded data contains a first type of data symbols, the method further comprises:
decoding a second sub-portion of said second portion to obtain a second sub-set of decoded data; and
reconstructing the first portion of the set of sparse data by extracting from the second sub-set of decoded data a first type of data symbols.

C.17 The method of statement C.13, wherein if it is determined that the first sub-set of decoded data contains a first type of data symbols, the method further comprises:
reconstructing the first portion of the set of sparse data by extracting from the first sub-set of decoded data a first type of data symbols.

C.18 The method of statement C.10, wherein if the one or more metadata symbols indicates that reconstruction of the first portion of the set of sparse data should be based on a second set of decoded data, the method further comprises:
decoding a second portion of said set of encoded data to obtain the second set of decoded data, wherein the second set of decoded data corresponds to one or more metadata symbols indicating whether to reconstruct a first portion of the set of sparse data based on a third set of decoded data or based on simulating the first portion of the set of sparse data. C.19 The method of statement C.18, wherein if the one or more metadata symbols in the second set of decoded data indicates that reconstruction of the first portion of the set of sparse data should be based on simulating the first portion of the set of sparse data, the method further comprises:
simulating first portion of the set of sparse data by generating a second type of data symbols.

C.20 The method of statement C.19, wherein if the one or more metadata symbols indicates that reconstruction of the first portion of the set of sparse data should be based on a third set of decoded data, the method further comprises:
decoding a third portion of said set of encoded data to obtain the third set of decoded data, wherein the third set of decoded data corresponds to one or more metadata symbols indicating whether to reconstruct a first portion of the set of sparse data based on a fourth set of decoded data or based on simulating the first portion of the set of sparse data.

C.21 The method of statement C.20, wherein if the one or more metadata symbols in the third set of decoded data indicates that reconstruction of the first portion of the set of sparse data should be based on simulating the first portion of the set of sparse data, the method further comprises:

simulating first portion of the set of sparse data by generating a second type of data symbols.

C.22 The method of statement C.20, wherein if the one or more metadata symbols in the third set of decoded data indicates that reconstruction of the first portion of the set of sparse data should be based on a fourth set of decoded data, the method further comprises:

decoding a fourth portion of said set of encoded data to obtain the fourth set of decoded data; reconstructing the first portion of the set of sparse data by extracting from the fourth set of decoded data a first type of data symbols.

C.23 The method of any one of statements C.11 to C.22, wherein the first type is a non-zero value and the second type is a zero value.

C.24 The method of any one of statements C.11 to C.22, wherein the first type is a value above a threshold and the second type is a value below the threshold, and wherein a value equal to the threshold can belong either to the first type or to the second type depending on a chosen implementation. D.1 A method of decoding a received set of encoded data representing information that has been compressed, the encoded data set comprising a plurality of subsets, each subset representing a region of the information that has been compressed, the method comprising: receiving the encoded data set;

retrieving signalled size dimensions of the information that has been compressed; based on the signalled size dimensions, identifying a maximum amount of subsets expected in the data set, the subsets comprising a predetermined maximum amount of encoded data elements, and identifying an expected amount of data elements to be represented by each subset;

decoding the encoded data set to derive a set of data elements based on the expected amount of data elements represented by each subset; and, reconstructing the information that has been compressed using the derived set of data elements.

D.2 A method according to statement D.1, wherein the step of identifying an expected amount of data elements within each subset is based on an order the subsets are retrieved from the encoded data set.

D.3 A method according to statement D.1 or D.2, wherein the step of identifying an expected amount of data elements within each subset is based on a defined mapping order of the subsets to the corresponding region of the information that has been compressed.

D.4 A method according to statement D.3, wherein the step of decoding the encoded dataset comprises masking any data or metadata in the encoded data set which corresponds to a location in the information that has been compressed outside of the signalled size dimensions based on the defined mapping order of the subsets.

D.5 A method according to any of statements D.1 to D.4, wherein each subset is a data structure comprising metadata elements and data symbols.

D.6 A method according to statement D.5, further comprising:

based on the signalled size dimensions, identifying which metadata elements comprise relevant metadata and which contain dummy metadata.

D.7 A method according to statement D.6, ignoring dummy metadata. D.8 A method according to any of statements D.5 to D.7, further comprising:

based on the signalled dimensions, identifying a structure of the data structure.

D.9 A method according to any of statements D.5 to D.8, wherein each data structure is associated with a square array of data elements and wherein each metadata element corresponds to a square sub-array of the square array.

D.10 A method according to any of statements D.5 to D.9, wherein the data structure only comprises data symbols for information that has been compressed within the size dimensions, based on a defined mapping order of the data symbols to the information that has been compressed.

D.11 A method according to any of statements D.5 to D.10, wherein the signalled dimensions indicate portions of the data structure do not contain data elements.

D.12 A method according to any of statements D.1 to D.11, wherein the step of reconstructing comprises:

mapping each derived data element to a location in an array based on a defined order and the signalled size dimensions, such that derived data elements are placed only at locations within the signalled size dimensions.

D.13 An apparatus for decoding a received set of encoded data representing information that has been compressed, comprising a processor configured to carry out the method of any of statements D.1 to D.12.

D.14 A method of encoding information to be compressed into a set of encoded data, the encoded data set comprising a plurality of subsets, each subset representing a region of the information that has been compressed, the method comprising:

identifying size dimensions of the information to be compressed;

signalling the size dimensions of the information that has been compressed;

encoding data elements of the information to be compressed into the plurality of subsets, the subsets comprising a predetermined maximum amount of encoded data elements. D.15 A method according to statement D.14, wherein the step of encoding the data elements comprises inserting data or metadata in the encoded data set which corresponds to a location in the information that has been compressed outside of the signalled size dimensions.

D.16 A method according to statements D.14 or D.15, wherein each subset is a data structure comprising metadata elements and data symbols.

D.17 A method according to statement D.16, further comprising:

inserting dummy metadata elements in the data structure.

D.18 A method according to statements D.16 or D.17, wherein each data structure is associated with a square array of data elements and wherein each metadata element corresponds to a square sub-array of the square array.

D.19 A method according to any of statements D.16 to D.18, wherein the data structure only comprises data symbols for information that has been compressed within the size dimensions, based on a defined mapping order of the data symbols to the information that has been compressed.

D.20 A method according to any of statements D.14 to D.19, wherein the step of encoding comprises:

mapping each location in an array to a subset based on a defined order and the signalled size dimensions, such that derived data elements from the encoded data set are placed only at locations within the signalled size dimensions.

D.21 An apparatus for encoding information to be compressed into a set of encoded data, comprising a processor configured to carry out the method of any of statements D.14 to D.20.

The invention claimed is:

1. A method of decoding symbols from an encoded data set using an arithmetic decoding operation, the symbols each being represented by a final integer within a defined range of integers, the method comprising:
retrieving a sample of the encoded data set;
retrieving an array of first statistics metadata, wherein the first statistics metadata represents a respective probability of each of a set of group indicators occurring in the encoded data set and wherein the size of the array is less the size of the defined range;
performing an arithmetic decoding operation on the sample based on the array of statistics metadata to identify a group indicator;
from the group indicator, identifying a set of possible integers from a predetermined mapping of sets of integers to possible group indicators;
if multiple integers exist in the set of possible integers, performing a further stage of the arithmetic decoding operation on the sample using a predetermined set of second statistics metadata different from the array of first statistics metadata to identify an integer indicator;
identifying a final integer from the set of possible integers from a predetermined mapping of integers to possible integer indicators.

2. The method according to claim 1, wherein the arithmetic decoding operation is a range decoding operation.

3. The method according to claim 1, wherein the statistics metadata represents a probability distribution function.

4. The method according to claim 3, wherein the probability distribution function is a piecewise linear function.

5. The method according to claim 3, wherein the probability distribution function is a cumulative distribution function.

6. The method according to claim 5, wherein the cumulative distribution function is a non-decreasing function less than 1.0, such that 1.0 is implicit.

7. The method according to claim 5, wherein the size of the array is one fewer than the number of sets of possible integers indicated by a corresponding number of possible group indicators and wherein the limits of the cumulative distribution function are implicit.

8. The method according to any of claim 5 wherein the size of the array is 6 and 0 and 1.0 of the cumulative distribution function are implicit such that 7 sets of possible integers are indicated by 7 possible group indicators.

9. The method according to claim 1, wherein the defined range is 0 to 15 such that 16 possible integers are represented.

10. The method according to claim 1, wherein the final integer represents a bit unsigned number.

11. The method according to claim 10, wherein the bit unsigned number is used as metadata in a data structure to indicate structure of the data structure or to indicate presence of data elements in the data structure or both.

12. The method according to claim 1, wherein the sets of possible integers are grouped together as sets: [7,11,13,14], [1,2,4,8], [5,10], [3,12], [6,9], [0] and [15], each set being mapped to a corresponding group indicator.

13. The method according to claim 1, wherein the predetermined set of second statistics metadata is selected based on the identified set of possible integers.

14. The method according to claim 13, wherein the predetermined set of second statistics metadata comprises a corresponding number of values to the number of integers within the identified set of possible integers.

15. The method according to claim 13, wherein the predetermined set of second statistics metadata comprises cumulative distribution values representing 0.25, 0.5, 0.75 and 1.0 where there are four integers in the set of possible integers and wherein the predetermined set of second statistics metadata comprises 0.5 and 1.0 where there are two integers in the set of possible integers.

16. The method according to claim 1, the method further comprising performing a subsequent decoding operation based on the decoded final integer to derive a set of data elements and reconstructing information that has been compressed from the set of data elements.

17. The method according to claim 1, the method further comprising, if multiple integers do not exist in the set of possible integers, selecting the integer in the set of possible integers as the final integer.

18. A method of encoding symbols into an encoded data set using an arithmetic decoding operation, the symbols each representing by an initial integer from a defined range of integers, the method comprising:
retrieving an initial integer to be encoded;
identifying a group indicator corresponding to a set of possible integers which contains the initial integer from a plurality of sets of possible integers;
retrieving an array of first statistics metadata, wherein the first statistics metadata represents a respective probability of each of the sets of possible integers having an integer being retrieved to be encoded in the encoded data set and wherein the size of the array is less the size of the defined range;
performing an arithmetic encoding operation on the group indicator based on the array of statistics metadata to create the encoded data set;
if multiple integers exist in the set of possible integers, identifying an integer indicator which indicates a location of the initial integer in the set of possible integers and performing a further stage of the arithmetic decoding operation based on the integer indicator using predetermined set of second statistics metadata different from the array of first statistics metadata.

19. The method according to claim 18, wherein the step of retrieving an array of statistics metadata comprises identifying a probability of integers occurring in a data set to be encoded and assigning a probability to the set of possible integers based on the probability of each integer in the set occurring in the data set to be encoded.

20. An apparatus for decoding symbols from an encoded data set using an arithmetic decoding operation, comprising a processor configured to:
retrieve a sample of the encoded data set;
retrieve an array of first statistics metadata, wherein the first statistics metadata represents a respective probability of each of a set of group indicators occurring in the encoded data set and wherein the size of the array is less the size of the defined range;
perform an arithmetic decoding operation on the sample based on the array of statistics metadata to identify a group indicator;
from the group indicator, identify a set of possible integers from a predetermined mapping of sets of integers to possible group indicators;
if multiple integers exist in the set of possible integers, perform a further stage of the arithmetic decoding operation on the sample using a predetermined set of second statistics metadata different from the array of first statistics metadata to identify an integer indicator;

identify a final integer from the set of possible integers from a predetermined mapping of integers to possible integer indicators.

\* \* \* \* \*